(12) United States Patent
　　　Babaei et al.

(10) Patent No.: US 12,574,963 B2
(45) Date of Patent: *Mar. 10, 2026

---

(54) LISTEN-BEFORE-TALK PROCEDURES AND MODIFICATION OF CELL CONFIGURATION PARAMETERS

(71) Applicant: Comcast Cable Communications, LLC, Philadelphia, PA (US)

(72) Inventors: Alireza Babaei, Fairfax, VA (US); Esmael Hejazi Dinan, McLean, VA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/642,240

(22) Filed: Apr. 22, 2024

(65) Prior Publication Data

US 2024/0349334 A1　Oct. 17, 2024

Related U.S. Application Data

(63) Continuation of application No. 17/713,799, filed on Apr. 5, 2022, now Pat. No. 11,968,711, and a
(Continued)

(51) Int. Cl.
　　*H04W 74/0808*　(2024.01)
　　*H04L 41/0654*　(2022.01)
　　(Continued)

(52) U.S. Cl.
　　CPC ..... *H04W 74/0808* (2013.01); *H04L 41/0654* (2013.01); *H04L 41/0668* (2013.01);
　　(Continued)

(58) Field of Classification Search
　　CPC .......... H04W 74/0808; H04W 72/044; H04W 72/21; H04W 72/23; H04W 76/15;
　　(Continued)

(56) References Cited

U.S. PATENT DOCUMENTS 9,319,194 B2　4/2016　Dinan
9,736,795 B2　8/2017　Dinan
　　(Continued)

FOREIGN PATENT DOCUMENTS

WO　　2013/179590 A1　12/2013
WO　　2016157797 A1　10/2016
WO　　2017030487 A1　2/2017

OTHER PUBLICATIONS

3GPP TSG RAN WG1 Meeting #80bis, R1-151675, Belgrade, Serbia, Apr. 20-24, 2015, Source: Panasonic, Title: Discussion on UL transmission in LAA.
(Continued)

*Primary Examiner* — Mohammed S Chowdhury
(74) *Attorney, Agent, or Firm* — Banner & Witcoff, Ltd.

(57)　　　ABSTRACT

A wireless device may communicate with multiple base stations via multiple cells. The wireless device may indicate to at least one of the base stations a failure of a listen-before-talk (LBT) procedure. A base station may reconfigure another base station based on the failure of the LBT procedure.

35 Claims, 28 Drawing Sheets

Related U.S. Application Data continuation of application No. 17/102,079, filed on Nov. 23, 2020, now abandoned, said application No. 17/713,799 is a continuation of application No. 16/913,442, filed on Jun. 26, 2020, now Pat. No. 11,330,626, said application No. 17/102,079 is a continuation of application No. 15/801,686, filed on Nov. 2, 2017, now Pat. No. 10,848,977, said application No. 16/913,442 is a continuation of application No. 15/797,575, filed on Oct. 30, 2017, now abandoned.

(60) Provisional application No. 62/416,564, filed on Nov. 2, 2016, provisional application No. 62/414,697, filed on Oct. 29, 2016.

(51) Int. Cl.

| | |
|---|---|
| *H04L 41/0668* | (2022.01) |
| *H04L 41/0813* | (2022.01) |
| *H04L 43/16* | (2022.01) |
| *H04W 72/044* | (2023.01) |
| *H04W 72/21* | (2023.01) |
| *H04W 72/23* | (2023.01) |
| *H04W 76/15* | (2018.01) |
| *H04W 76/27* | (2018.01) |
| *H04W 88/08* | (2009.01) |

(52) U.S. Cl.
CPC .......... *H04L 41/0813* (2013.01); *H04L 43/16* (2013.01); *H04W 72/044* (2013.01); *H04W 72/21* (2023.01); *H04W 72/23* (2023.01); *H04W 76/15* (2018.02); *H04W 76/27* (2018.02); *H04W 88/08* (2013.01)

(58) Field of Classification Search
CPC . H04W 76/27; H04W 88/08; H04W 72/0413; H04W 72/14; H04W 72/1284; H04L 41/0654; H04L 41/0668; H04L 41/0813; H04L 43/16
See application file for complete search history.

(56) References Cited

U.S. PATENT DOCUMENTS

| | | | |
|---|---|---|---|
| 9,781,712 | B2 | 10/2017 | Nory et al. |
| 9,872,336 | B2 | 1/2018 | Dinan |
| 9,894,681 | B2 | 2/2018 | Dinan |
| 9,900,836 | B2 | 2/2018 | Axén et al. |
| 10,200,992 | B2 | 2/2019 | Dinan |
| 2011/0134774 | A1 | 6/2011 | Pelletier et al. |
| 2011/0243016 | A1 | 10/2011 | Zhang et al. |
| 2011/0268029 | A1 | 11/2011 | Tseng |
| 2012/0069802 | A1 | 3/2012 | Chen et al. |
| 2012/0082088 | A1 | 4/2012 | Dalsgaard et al. |
| 2012/0182879 | A1 | 7/2012 | Tamura et al. |
| 2012/0213163 | A1 | 8/2012 | Lee et al. |
| 2012/0257570 | A1 | 10/2012 | Jang et al. |
| 2012/0329461 | A1 | 12/2012 | Teyeb et al. |
| 2013/0010619 | A1 | 1/2013 | Fong et al. |
| 2013/0028198 | A1 | 1/2013 | Yamada |
| 2013/0094392 | A1 | 4/2013 | Kim et al. |
| 2013/0114398 | A1 | 5/2013 | Wang |
| 2013/0188612 | A1 | 7/2013 | Dinan |
| 2013/0195057 | A1 | 8/2013 | Dinan |
| 2013/0208587 | A1 | 8/2013 | Bala et al. |
| 2013/0215848 | A1 | 8/2013 | Kato et al. |
| 2013/0235768 | A1 | 9/2013 | Earnshaw et al. |
| 2013/0272233 | A1 | 10/2013 | Dinan |
| 2013/0279433 | A1 | 10/2013 | Dinan |
| 2013/0301446 | A1 | 11/2013 | Chen et al. |
| 2014/0016593 | A1 | 1/2014 | Park et al. |
| 2014/0036664 | A1 | 2/2014 | Han et al. |

| | | | |
|---|---|---|---|
| 2014/0050113 | A1 | 2/2014 | Rosa et al. |
| 2014/0056220 | A1 | 2/2014 | Poitau et al. |
| 2014/0161117 | A1 | 6/2014 | Sebire et al. |
| 2014/0269595 | A1 | 9/2014 | Lee et al. |
| 2015/0003418 | A1 | 1/2015 | Rosa et al. |
| 2015/0016350 | A1 | 1/2015 | Moulsley et al. |
| 2015/0036614 | A1 | 2/2015 | Lee et al. |
| 2015/0078286 | A1 | 3/2015 | Kim et al. |
| 2015/0087315 | A1 | 3/2015 | Lu et al. |
| 2015/0087316 | A1 | 3/2015 | Bostrom et al. |
| 2015/0117342 | A1 | 4/2015 | Loehr et al. |
| 2015/0124670 | A1 | 5/2015 | Park |
| 2015/0146588 | A1 | 5/2015 | Park |
| 2015/0181453 | A1 | 6/2015 | Chen et al. |
| 2015/0181590 | A1 | 6/2015 | Park |
| 2015/0189574 | A1 | 7/2015 | Ng et al. |
| 2015/0215079 | A1 | 7/2015 | Park |
| 2015/0215977 | A1 | 7/2015 | Yamazaki |
| 2015/0223213 | A1 | 8/2015 | Moon et al. |
| 2015/0245219 | A1 | 8/2015 | Wei |
| 2015/0245307 | A1 | 8/2015 | Chen et al. |
| 2015/0256303 | A1 | 9/2015 | Belghoul et al. |
| 2015/0271811 | A1 | 9/2015 | Kim et al. |
| 2015/0289179 | A1 | 10/2015 | Liu et al. |
| 2015/0312930 | A1 | 10/2015 | Han et al. |
| 2016/0044617 | A1 | 2/2016 | Vajapeyam et al. |
| 2016/0044655 | A1 | 2/2016 | Park et al. |
| 2016/0044737 | A1 | 2/2016 | Kwon |
| 2016/0066284 | A1 | 3/2016 | Kwon et al. |
| 2016/0080126 | A1 | 3/2016 | Dinan |
| 2016/0095114 | A1 | 3/2016 | Kim et al. |
| 2016/0135148 | A1 | 5/2016 | Novlan et al. |
| 2016/0143014 | A1 | 5/2016 | Mukherjee et al. |
| 2016/0150485 | A1 | 5/2016 | Yi et al. |
| 2016/0174247 | A1 | 6/2016 | Ruiz Delgado et al. |
| 2016/0192388 | A1 | 6/2016 | Ekpenyong et al. |
| 2016/0204905 | A1 | 7/2016 | Lee et al. |
| 2016/0205681 | A1 | 7/2016 | Kim et al. |
| 2016/0219604 | A1* | 7/2016 | Fujishiro ............... H04W 76/15 |
| 2016/0227417 | A1 | 8/2016 | Yerramalli et al. |
| 2016/0227428 | A1 | 8/2016 | Novlan et al. |
| 2016/0227524 | A1 | 8/2016 | Choi et al. |
| 2016/0227541 | A1 | 8/2016 | Damnjanovic et al. |
| 2016/0242153 | A1 | 8/2016 | Chen et al. |
| 2016/0262118 | A1 | 9/2016 | Kim et al. |
| 2016/0277987 | A1 | 9/2016 | Chen et al. |
| 2016/0278050 | A1 | 9/2016 | Nory et al. |
| 2016/0285716 | A1 | 9/2016 | Pelletier et al. |
| 2016/0302177 | A1 | 10/2016 | Kwon et al. |
| 2016/0302228 | A1 | 10/2016 | Kazmi et al. |
| 2016/0337112 | A1 | 11/2016 | Suzuki et al. |
| 2016/0345206 | A1 | 11/2016 | Yerramalli et al. |
| 2016/0365959 | A1 | 12/2016 | Dinan |
| 2016/0366675 | A1 | 12/2016 | Dinan |
| 2016/0366681 | A1 | 12/2016 | Dinan |
| 2016/0374082 | A1 | 12/2016 | Nguyen et al. |
| 2016/0381681 | A1 | 12/2016 | Nogami et al. |
| 2017/0013469 | A1 | 1/2017 | Larsson et al. |
| 2017/0041059 | A1 | 2/2017 | Yi et al. |
| 2017/0041805 | A1 | 2/2017 | Chandrasekhar et al. |
| 2017/0041905 | A1 | 2/2017 | Chen et al. |
| 2017/0048718 | A1 | 2/2017 | Kim et al. |
| 2017/0048880 | A1 | 2/2017 | Anderson et al. |
| 2017/0055242 | A1 | 2/2017 | Kusashima et al. |
| 2017/0055263 | A1 | 2/2017 | Tomeba et al. |
| 2017/0055293 | A1 | 2/2017 | Yang et al. |
| 2017/0086172 | A1 | 3/2017 | Dinan |
| 2017/0086194 | A1 | 3/2017 | Tavildar et al. |
| 2017/0094681 | A1 | 3/2017 | Takeda et al. |
| 2017/0099633 | A1 | 4/2017 | Axén et al. |
| 2017/0117997 | A1 | 4/2017 | Park et al. |
| 2017/0118658 | A1 | 4/2017 | Hwang et al. |
| 2017/0127414 | A1 | 5/2017 | Yi et al. |
| 2017/0135023 | A1 | 5/2017 | Jung et al. |
| 2017/0135127 | A1 | 5/2017 | Nogami et al. |
| 2017/0164361 | A1 | 6/2017 | Park |
| 2017/0181143 | A1 | 6/2017 | Kim et al. |
| 2017/0195099 | A1 | 7/2017 | Kahtava et al. |
| 2017/0195935 | A1 | 7/2017 | Xu et al. |

(56) References Cited

U.S. PATENT DOCUMENTS

| | | |
|---|---|---|
| 2017/0196020 A1 | 7/2017 | Mukherjee et al. |
| 2017/0201308 A1 | 7/2017 | Park et al. |
| 2017/0201985 A1 | 7/2017 | Wang |
| 2017/0202022 A1 | 7/2017 | Chendamarai Kannan et al. |
| 2017/0223677 A1 | 8/2017 | Dinan et al. |
| 2017/0231011 A1 | 8/2017 | Park et al. |
| 2017/0251454 A1 | 8/2017 | Yang et al. |
| 2017/0265225 A1 | 9/2017 | Takeda et al. |
| 2017/0265248 A1 | 9/2017 | Narasimha et al. |
| 2017/0280430 A1 | 9/2017 | Mn et al. |
| 2017/0311206 A1 | 10/2017 | Ryoo et al. |
| 2017/0311322 A1 | 10/2017 | Kim et al. |
| 2017/0325258 A1 | 11/2017 | Nogami et al. |
| 2017/0339580 A1 | 11/2017 | Martin et al. |
| 2017/0339607 A1 | 11/2017 | Lu et al. |
| 2017/0339717 A1* | 11/2017 | Futaki .................. H04W 76/27 |
| 2017/0339721 A1 | 11/2017 | Mukherjee et al. |
| 2017/0353912 A1 | 12/2017 | Einhaus et al. |
| 2017/0353965 A1 | 12/2017 | Zhang |
| 2017/0373914 A1 | 12/2017 | Harada et al. |
| 2018/0007708 A1 | 1/2018 | Ke et al. |
| 2018/0014291 A1 | 1/2018 | Takeda et al. |
| 2018/0034524 A1 | 2/2018 | Pao et al. |
| 2018/0041989 A1 | 2/2018 | Shimezawa et al. |
| 2018/0048498 A1 | 2/2018 | Stern-Berkowitz et al. |
| 2018/0049214 A1 | 2/2018 | Kubota et al. |
| 2018/0049221 A1 | 2/2018 | Park et al. |
| 2018/0049241 A1 | 2/2018 | Heo et al. |
| 2018/0049271 A1 | 2/2018 | Bagheri et al. |
| 2018/0077581 A1 | 3/2018 | Ahn et al. |
| 2018/0077688 A1 | 3/2018 | Yi et al. |
| 2018/0077749 A1 | 3/2018 | Yamada et al. |
| 2018/0092073 A1 | 3/2018 | Nogami et al. |
| 2018/0092118 A1 | 3/2018 | Kim et al. |
| 2018/0098334 A1 | 4/2018 | Tie et al. |
| 2018/0110045 A1 | 4/2018 | You et al. |
| 2018/0115981 A1 | 4/2018 | Kim et al. |
| 2018/0139701 A1 | 5/2018 | Wang et al. |
| 2018/0139767 A1 | 5/2018 | Lee et al. |
| 2018/0220303 A1 | 8/2018 | Futaki |
| 2018/0242264 A1 | 8/2018 | Pelletier et al. |
| 2018/0242357 A1 | 8/2018 | Khirallah et al. |
| 2018/0279403 A1 | 9/2018 | Kim |
| 2018/0288826 A1 | 10/2018 | Chiba |
| 2018/0295609 A1 | 10/2018 | Shimezawa et al. |
| 2019/0029047 A1 | 1/2019 | Zhu et al. |
| 2019/0182883 A1 | 6/2019 | He et al. |
| 2019/0289635 A1 | 9/2019 | Wang et al. |

OTHER PUBLICATIONS

3GPP TSG RAN WG1 Meeting #80bis, R1-151719, Belgrade, Serbia, Apr. 20-24, 2015, Source: ZTE, Title: Potential design for LAA UL transmission.
3GPP TSG-RAN WG1 #80bis, R1-151750, Belgrade, Serbia, Apr. 20-24, 2015, Source: NVIDIA, Title: Flexible UL-DL transmission for LAA.
3GPP TSG-RAN WG1 Meeting #80bis, R1-151841, Belgrade, Serbia, Apr. 20-24, 2015, Source: Nokia Networks Title: On the PHY options for LAA UL operation.
3GPP TSG-RAN WG1 Meeting #80bis, R1-151842, Belgrade, Serbia, Apr. 20-24, 2015, Source: Nokia Networks, Title: UL LBT and Configurable Frame Structure for UL/DL operation.
3GPP TSG RAN WG1 Meeting #80bis, R1-151958, Belgrade, Serbia, Apr. 20-24, 2015, Source: NTT DOCOMO, Inc., Title: Discussion on issues related to UL transmission in LAA.
3GPP TSG RAN WG1 meeting #80bis, R1-151973, Belgrade, Serbia, Apr. 20-24, 2015, Source: Institute for Information Industry (III), Title: On the Design of LAA Uplink Transmission.
3GPP TSG RAN WG1 Meeting #80-bis, R1-152094, Belgrade, Serbia, Apr. 20-24, 2015 Source: ETRI, Title: Discussion on the UL transmission for LAA and the potential solution thereof.

3GPP TSG RAN WG1 Meeting #81, R1-152470, Fukuoka, Japan, May 25-29, 2015 Source: Huawei, HiSilicon, Title: Frame structure for LAA DL and UL transmission operation.
3GPP TSG RAN WG1 Meeting #81, R1-152579, Fukuoka, Japan, May 25-29, 2015, Source: CATT, Title: Frequency reuse for LBE.
3GPP TSG RAN WG1 Meeting #81, R1-152580, Fukuoka, Japan, May 25-29, 2015, Source: CATT, CATR, Title: Frame structure considerations for LAA.
3GPP TSG RAN WG1 Meeting #81, R1-152649, Fukuoka, Japan, May 25-29, 2015, Source: Intel Corporation, Title: On the LAA UL: LBT, scheduling, and sub-frame structure.
3GPP TSG RAN WG1 meeting #81, R1-152737, Fukuoka, Japan, May 25-29, 2015, Source: LG Electronics, Title: Indication of DL/UL TX burst structure.
3GPP TSG RAN WG1 #81, R1-152783, May 25-29, 2015, Fukuoka, Japan, Source: Qualcomm Incorporated, Title: Adaptive Frame Structure and DL-UL configuration for LAA.
3GPP TSG RAN WG1 #81, R1-152786, May 25-29, 2015, Fukuoka, Japan Source: Qualcomm Incorporated, Title: UE procedure for receiving DL transmissions in LAA.
3GPP TSG RAN WG1 Meeting #81, R1-152817, Fukuoka, Japan, May 25-29, 2015 Source: Nokia Networks, Title: UL LBT and Configurable Frame Structure for UL/DL operation.
3GPP TSG RAN WG1 Meeting #81, R1-152872, Fukuoka, Japan, May 25-29, 2015, Source: Samsung, Title: Discussion on UL transmission for LAA.
3GPP TSG RAN WG1 Meeting #81, R1-152971, Fukuoka, Japan, May 25-29, 2015, Source: ZTE, Title: Remaining Issues on LAA UL.
3GPP TSG RAN WG1 Meeting #81, R1-152990, Fukuoka, Japan, May 25-29, 2015, Title: LBT and Frame Structure Design for LAA with DL and UL Source: Alcatel-Lucent Shanghai Bell, Alcatel Lucent.
3GPP TSG-RAN WG1 Meeting #80bis, R1-151459, Belgrade, Serbia, Apr. 20-24, 2015, Source: InterDigital Communications, Title: UL transmission for LAA.
R1-162858, 3GPP TSG RAN WG1 Meeting #84bis, Busan, Korea Apr. 11-15, 2016, Source: CMCC, Title: Further discussion on issues related to PUSCH transmission for LAA.
R1-160388, 3GPP TSG RAN WG1 Meeting #84, St Julian's, Malta, Feb. 15-19, 2016, Agenda Item: 7.3.1.1, Source: NEC, Title: Discussion on LAA UL transmission.
R1-160796, 3GPP TSG-RAN WG1 Meeting 84, Feb. 15-19, 2016, St Julian's, Malta, Source: Panasonic, Title: Uplink Subframe Structure.
R1-160946, 3GPP TSG RAN WG1 Meeting #84, St Julian's, Malta, Feb. 15-19, 2016, Source: NTT DOCOMO, Inc., Title: Discussion on PUSCH design for eLAA UL.
R1-160947, 3GPP TSG RAN WG1 Meeting #84, St Julian's, Malta, Feb. 15-19, 2016, Source: NTT DOCOMO, Inc., Title: Discussion on UL scheduling design for eLAA.
R1-160996, 3GPP TSG RAN WG1 Meeting #84, St. Julian's, Malta, Feb. 15-19, 2016, Source: Ericsson, Title: On UL Channel Access and PUSCH Design for Enhanced LAA.
R1-161079, 3GPP TSG-RAN WG1 Meeting #84, St Julian's, Malta, Feb. 15-19, 2016, Agenda Item: 7.3.1.1, Source: InterDigital Communications, Title: On UL data transmission for eLAA.
R1-162130, 3GPP TSG RAN WG1 Meeting #84bis, Busan, Korea Apr. 11-15, 2016, Agenda Item: 7.3.1.1, Source: Huawei, HiSilicon, Title: Scheduling design for eLAA.
R1-162131, 3GPP TSG RAN WG1 Meeting #84bis, Busan, Korea, Apr. 11-15, 2016, Agenda Item: 7.3.1.1, Source: Huawei, HiSilicon, Title: Discussion on CCA gap and symbol position for PUSCH and SRS for eLAA.
R1-162259, 3GPP TSG RAN WG1 Meeting #84bis, Busan, Korea Apr. 11-15, 2016, Source: CATT, Title: PUSCH design for Rel-14 eLAA.
R1-162443, 3GPP TSG RAN WG1 Meeting #84bis, Busan, Korea Apr. 11-15, 2016, Agenda Item: 7.3.1.1, Source: NEC, Title: Discussion on LAA UL partial subframe transmission.

(56) References Cited

OTHER PUBLICATIONS

R1-162604, 3GPP TSG RAN WG1 Meeting #84bis, Busan, Korea Apr. 11-15, 2016, Agenda Item: 7.3.1.1, Source: Huawei, HiSilicon, Title: Design for frame structure 3 with DL and UL subframes for eLAA.

R1-162728, 3GPP TSG RAN WG1 Meeting #84bis, Busan, Korea Apr. 11-15, 2016, Agenda Item: 7.3.1.1, Source: Huawei, HiSilicon, Title: Summary on [84-14] PUSCH frame structure in eLAA.

R1-162799, 3GPP TSG RAN WG1 Meeting #84bis, Busan, Korea, Apr. 11-15, 2016, Source: NTT DOCOMO, Inc., Title: Discussion on PUSCH design for eLAA UL.

R1-162838, 3GPP TSG RAN WG1 Meeting #84bis, Busan, Korea, Apr. 11-15, 2016, Source: Sharp, Title: Uplink subframe structure in LAA carrier.

R1-162936, 3GPP TSG RAN WG1 Meeting #84bis, Busan, Korea, Apr. 11-15, 2016, Source: MediaTek Inc., Title: eLAA PUSCH design.

R1-163141, 3GPP TSG RAN WG1 Meeting #84bis, Busan, Korea, Apr. 11-15, 2016, Source: Ericsson, Title: On UL Subframe Structure for Enhanced LAA.

R1-163165, 3GPP TSG RAN WG1 Meeting #84bis, Busan, Korea, Apr. 11-15, 2016, Agenda Item: 7.3.1.1, Source: Xinwei, Title: Discussion on Partial Subframe Utilization for PUSCH.

R1-163207, 3GPP TSG-RAN WG1 Meeting 84bis, Apr. 11-15, 2016, Busan, Korea, Source: Panasonic, Title: Uplink Subframe Structure.

Jan. 24, 2017—International Search Report and Written Opinion—PCT/US2016/057420.

Vu, Long Hoang et al., "Multi-Carrier listen Before Talk Mechanism for LTE in Unlicensed Spectrum," 2016 Annual Conference of the Korean Institute of Communication Sciences, 2016, pp. 388-389.

R1-153228, 3GPP TSG RAN WG1 Meeting #81, Fukuoka, Japan, May 25-29, 2015, Source: Huawei, HiSilicon, Title: UL transmission design for LAA.

R1-153135, 3GPP TSG RAN WG1 Meeting #81, Fukuoka, Japan, May 25-29, 2015, Source: Ericsson, Title: On Scheduling in LAA with Downlink and Uplink Transmissions.

Jul. 12, 2018—Korean Office Action—KR 2018-7010708.

3GPP TSG RAN WG1 Meeting #71 R1-124676 New Orleans, USA, Nov. 12-16, 2012 Final Report of 3GPP TSG RAN WG1 #70.

Jul. 23, 2018—Japanese Office Action—JP 2018-512586.

Aug. 3, 20190—Japanese Office Action—JP 2018-247389.

R1-164598 3GPP TSG RAN WG1 Meeting #85, Nanjing, China, May 23-27, 2016, Source: ZTE, Title: Discussion on UCI transmission on an LAA SCell.

R1-162669 3GPP TSG RAN WG1 Meeting #84bis, Busan, Korea, Apr. 11-15, 2016, Source: Samsung, Title: Discussion on enhanced random access procedure for UL LAA.

R1-164573 3GPP TSG RAN WG1 Meeting #85, Nanjing, China, May 23-27, 2016, Source: ZTE, Title: Consideration of LBT failure in LAA UL HARQ operation.

3GPP TS 36.211 V13.3.0 (Sep. 2016); Technical Specification; 3rd Generation Partnership Project; Technical Specification Group Radio Access Network; Evolved Universal Terrestrial Radio Access (E-UTRA); Physical channels and modulation (Release 13).

3GPP TS 36.212 V13.3.0 (Sep. 2016); Technical Specification; 3rd Generation Partnership Project; Technical Specification Group Radio Access Network; Evolved Universal Terrestrial Radio Access (E-UTRA); Multiplexing and channel coding (Release 13).

3GPP TS 36.213 V13.3.0 (Sep. 2016); Technical Specification; 3rd Generation Partnership Project; Technical Specification Group Radio Access Network; Evolved Universal Terrestrial Radio Access (E-UTRA); Physical layer procedures (Release 13).

3GPP TS 36.300 V13.5.0 (Sep. 2016); Technical Specification, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13).

3GPP TS 36.321 V13.2.0 (Jun. 2016); Technical Specification; 3rd Generation Partnership Project; Technical Specification Group Radio Access Network; Evolved Universal Terrestrial Radio Access (E-UTRA); Medium Access Control (MAC) protocol specification (Release 13).

3GPP TS 36.331 V13.2.0 (Jun. 2016); Technical Specification; 3rd Generation Partnership Project; Technical Specification Group Radio Access Network; Evolved Universal Terrestrial Radio Access (E-UTRA); Radio Resource Control (RRC); Protocol specification (Release 13).

IEEE 802 Interim Session; Atlanta, USA; Jan. 11-16, 2015; Title: 3GPP & unlicensed spectrum.

RP-151725; 3GPP TSG RAN Meeting #70, Sitges, Spain, Dec. 7-10, 2015; Source: ZTE, Xinwei; Title: Supporting dual connectivity in LAA.

RP-151978, 3GPP TSG RAN Meeting #70; Sitges, Spain, Dec. 7-10, 2015; revision of RP-yynnnn, Source: Ericsson, Huawei, Title: New Work Item on enhanced LAA for LTE.

RP-151979; 3GPP TSG RAN Meeting #70; Sitges, Spain, Dec. 7-10, 2015; Agenda item 14.1.1; Motivation For Enhanced Licensed Assisted Access Form LTE In Rel-14.

RP-160926; 3GPP TSG RAN Meeting #72; Busan, Korea, Jun. 13-17, 2016; Source: ZTE; Title: Discussion on further enhancement of LAA for LTE.

RP-161036; 3GPP TSG RAN Meeting #72; Busan, Korea, Mar. 13-16, 2016; Title: Motivation for New Work Item for Enhancing Utilization of CA for LTE; Source: Nokia, Alcatel-Lucent Shanghai Bell.

RP-161150; 3GPP TSG RAN Meeting #72; Busan, Korea, Jun. 13-16, 2016; Source: Qualcomm Incorporated; Title: New WI proposal on LTE standalone and dual connectivity operation in unlicensed spectrum.

RP-161701; 3GPP TSG RAN Meeting #73; New Orleans, Sep. 19-22, 2016; Source: ZTE; Title: New WI proposal Further enhancement on FeLAA.

RP-161702; 3GPP TSG RAN Meeting #73; New Orleans, USA, Sep. 19-22, 2016; Motivation for New WI Further Enhancement on FeLAA.

R1-160561, 3GPP TSG RAN WG1 Meeting #84, St Julian's, Malta, Feb. 15-19, 2016, Agenda item: 7.3.1.1, Source: Samsung, Title: Discussion on UL power control for UL LAA.

R1-152739, 3GPP TSG RAN WG1 meeting #81, Fukuoka, Japan, May 25-29, 2015, Agenda Item: 6.2.4.3, Source: LG Electronics, Title: UL power control in LAA.

R1-155472, 3GPP TSG RAN WG1 #82bis, Malmo, Sweden, Oct. 5-9, 2015, Agenda item: 7.2.3.3, Source: Samsung, Title: Impact of LAA dynamic power control.

R1-160886, 3GPP TSG RAN WG1 #84, Feb. 15-19, 2016, St. Julian's, Malta, Agenda item: 7.3.1.1, Source: Qualcomm Incorporated, Title: PUSCH power control.

R1-162476, 3GPP TSG RAN WG1 meeting #84bis, Busan, Korea, Apr. 11-15, 2016, Agenda Item: 7.3.1.6, Source: LG Electronics, Title: Power control in LAA uplink.

R1-162662, 3GPP TSG RAN WG1 Meeting #84bis, Busan, Korea Apr. 11-15, 2016, Agenda Item: 7.3.1.1 Source: Samsung, Title: Discussion on UL power control for UL LAA.

R1-163023, 3GPP TSG RAN WG1 #84bis, Apr. 11-15, 2016, Busan, Korea, Agenda item: 7.3.1.1, Source: Qualcomm Incorporated, Title: PUSCH power control.

R1-163762, 3GPP TSG RAN WG1 #84bis, Busan, Korea, Apr. 11-15, 2016, Agenda item: 7.3.1.6, WF on uplink power control in LAA.

R1-164918, 3GPP TSG-RAN WG1 Meeting #85, Nanjing, China, May 23-27, 2016, Agenda item: 6.2.1.1, Source: Nokia, Alcatel-Lucent Shanghai Bell, Title: On PUSCH Transmit Power on LAA SCells.

R1-165557, 3GPP TSG RAN WG1 #85, Nanjing, China, May 23-27, 2016, Agenda item: 6.2.1.1, WF on uplink power control in LAA.

R1-167026, 3GPP TSG-RAN WG1 Meeting #86, Gothenburg, Sweden, Aug. 22-26, 2016, Agenda item: 7.2.1.1, Source: Nokia, Alcatel-Lucent Shanghai Bell, Title: Remaining Issues on LAA SCell PUSCH Transmit Power.

(56) References Cited

OTHER PUBLICATIONS

RP-141188, 3GPP TSG RAN Meeting #65, Edinburgh, Scotland, Sep. 9-12, 2014, Source: ZTE, Title: Supporting dual connectivity in LTE-U.

Samsung, "Text Proposal for PHR in dual connectivity", May 19-23, 2014, pp. 1-7, 3GPP TSG RAN WG2 #86, R2-142275, Seoul, Korea.

Japanese Office Action mailed Jan. 30, 2018 in Japanese Patent Application No. 2017-546998.

R2-140066, 3GPP TSG RAN WG2 Meeting #85, Prague, Czech Republic, Feb. 10-14, 2014, Title: Consideration on PHR for TDD eiMTA.

3GPP TS 36.211 V12.4.0 (Dec. 2014), Technical Specification, 3rd Generation Partnership Project; Technical Specification Group Radio Access Network; Evolved Universal Terrestrial Radio Access (E-UTRA); Physical channels and modulation, 3GPP, Valbonne, France.

3GPP TS 36.212 V12.3.0 (Dec. 2014), Technical Specification, 3rd Generation Partnership Project; Technical Specification Group Radio Access Network; Evolved Universal Terrestrial Radio Access (E-UTRA); Multiplexing and channel coding, 3GPP, Valbonne, France.

3GPP TS 36.213 V12.4.0 (Dec. 2014), Technical Specification, 3rd Generation Partnership Project; Technical Specification Group Radio Access Network; Evolved Universal Terrestrial Radio Access (E-UTRA); Physical layer procedures, Valbonne, France.

3GPP TS 36.300 V12.4.0 (Dec. 2014), Technical Specification, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2, Valbonne, France.

3GPP TS 36.321 V12.4.0 (Dec. 2014), Technical Specification, 3rd Generation Partnership Project; Technical Specification Group Radio Access Network; Evolved Universal Terrestrial Radio Access (E-UTRA); Medium Access Control (MAC) protocol specification, Valbonne, France.

3GPP TS 36.331 V12.4.1 (Dec. 2014), Technical Specification, 3rd Generation Partnership Project; Technical Specification Group Radio Access Network; Evolved Universal Terrestrial Radio Access (E-UTRA); Radio Resource Control (RRC); Protocol specification, Valbonne, France.

3GPP TSG RAN meeting #67, Shanghai, China, Mar. 9-12, 2015, RP-150272, Status Report to TSG, Agenda item: 11.3.4, Title: LTE Carrier Aggregation Enhancement Beyond 5 Carriers.

3GPP TSG RAN WG1 Meeting #80 R1-150102, Athens, Greece, Feb. 9-13, 2015, Source: CATT, Title: Uplink power control to support PUCCH on SCell for Rel-13 CA.

3GPP TSG RAN WG1 Meeting #80bis R1-15xxxx, Belgrade, Serbia, Apr. 20-24, 2015, Source: MCC Support, Title: Draft Report of 3GPP TSG RAN WG1 #80 v0.2.0, Athens, Greece, Feb. 9-13, 2015.

3GPP TSG RAN WG2 Meeting #89 R2-150169, Athens, Greece, Feb. 9-13, 2015, Source: Intel Corporation, Title: Considerations for PUCCH on SCell in carrier aggregation.

3GPP TSG-RAN WG1 #80 R1-150085, Athens, Greece, Feb. 9-13, 2015, Source: Intel Corporation, Title: Support of PUCCH on SCell for CA.

3GPP TSG-RAN WG1#80 R1-150321, Athens, Greece, Feb. 9-13, 2015, Source: Ericsson, Title: PUCCH on SCell or carrier aggregation.

3GPP TSG-RAN WG2 #89 R2-150112, Feb. 9-13, 2015, Athens, Greece, Source: NTT DOCOMO, Inc., Title: Discussion on PUCCH on SCell.

3GPP TSG-RAN WG2 #89 Tdoc R2-150389, Athens, Greece, Feb. 9-13, 2015, Source: Ericsson, Title: PUCCH on SCell.

3GPP TSG-RAN WG2 Meeting #80 R1-150167, Athens, Greece, Feb. 9-13, 2015, Source: Alcatel-Lucent, Alcatel-Lucent Shanghai Bell, Title: PUCCH on SCell for CA enhancement.

3GPP TSG-RAN WG2 Meeting #89 R2-150527, Athens, Greece, Feb. 9-13, 2015, Source: Qualcomm Incorporated, Title: General principles for the support of PUCCH on SCell.

3GPP TSG-RAN WG2 Meeting #89 R2-150151, Athens, Greece, Feb. 9-13, 2015, Source: ZTE, Title: Discussion on the impact for the support of PUCCH on SCell, Agenda item: 7.2.

3GPP TSG-RAN WG2 Meeting #89 R2-150406, Athens, Greece, Feb. 9-13, 2015, Source: Alcatel-Lucent, Alcatel-Lucent Shanghai Bell, Title: Considerations on PUCCH on SCell.

3GPP TSG-RAN WG2 Meeting #89 R2-150410, Athens, Greece, Feb. 9-13, 2015, Agenda item: 7.2, Source: Nokia Corporation, Nokia Networks, Title: PHR for SCell with PUCCH, WID/SID: LTE_CA_enh_b5g-Core—Release 13.

3GPP TSG RAN WG1 Meeting #80 R1-150291, Athens, Greece, Feb. 9-13, 2015, Agenda item: 7.2.2.1, Source: NEC, Title: Initial considerations on SCell PUCCH for CA.

3GPP TSG RAN WG1 #80, Athens, Greece, Feb. 9-13, 2015, R1-150926, Title: WF on target scenarios for UCI feedback design, Source: Ericsson, CATT.

3GPP TSG RAN WG1 Meeting #80 R1-150101, Athens, Greece, Feb. 9-13, 2015, Source: CATT, Title: PUCCH on SCell for Rel-13 CA.

3GPP TSG RAN WG1 Meeting #80 R1-150103, Athens, Greece, Feb. 9-13, 2015, Source: CATT, Title: Enhancements to support carrier aggregation with up to 32 component carriers.

3GPP TSG RAN WG1 Meeting #80 R1-150106, Athens, Greece, Feb. 9-13, 2015, Source: CATT, Title: Periodic CSI feedback for Rel-13 CA.

3GPP TSG RAN WG1 Meeting #80 R1-150135, Athens, Greece, Feb. 9-13, 2015, Source: ZTE, Title: Further CA enhancement to support PUCCH on SCell.

3GPP TSG RAN WG1 Meeting #80 R1-150168, Athens, Greece, Feb. 9-13, 2015, Source: Alcatel-Lucent Shanghai Bell, Alcatel-Lucent, Title: CA enhancement to support up to 32 carrier aggregation.

3GPP TSG RAN WG1 Meeting #80 R1-150171, Athens, Greece, Feb. 9-13, 2015, Agenda item: 7.2.2.2.2, Source: Alcatel-Lucent Shanghai Bell, Alcatel-Lucent, Title: Enhancements to UL control signalling for up to 32 component carriers.

3GPP TSG RAN WG1 Meeting #80 R1-150207, Athens, Greece, Feb. 9-13, 2015, Agenda Item: 7.2.2.2.1, Source: LG Electronics, Title: Necessary mechanisms and enhancements to support CA of up to 32 carriers.

3GPP TSG RAN WG1 Meeting #80 R1-150276, Athens, Greece, Feb. 9-13, 2015, Source: Sharp, Title: Considerations on PUCCH for Rel-13 CA.

3GPP TSG RAN WG1 Meeting #80 R1-150294, Athens, Greece, Feb. 9-13, 2015, Agenda item: 7.2.2.2.3, Source: NEC, Title: Discussion on UL control signaling enhancements.

3GPP TSG RAN WG1 Meeting #80 R1-150390, Athens, Greece, Feb. 9-13, 2015, Agenda Item: 7.2.2.2.1, Source: Huawei, HiSilicon, Title: On CA enhancements supporting up to 32 component .carriers.

3GPP TSG RAN WG1 Meeting #80 R1-150412, Athens, Greece, Feb. 9-13, 2015, Agenda Item: 7.2.2.2.3, Source: Huawei, HiSilicon, Title: CSI feedback enhancement for carrier aggregation enhancement beyond 5 carriers.

3GPP TSG RAN WG1 Meeting #80 R1-150489, Athens, Greece, Nov. 17-21, 2014, Source: ITL Inc., Title: Uplink control signaling enhancements for b5C CA.

3GPP TSG RAN WG1 Meeting #80 R1-150509, Athens, Greece, Feb. 9-13, 2015, Source: NTT DOCOMO, NC., Title: PUCCH on SCell for UEs supporting UL-CA.

3GPP TSG RAN WG1 Meeting #80 R1-150510, Athens, Greece, Feb. 9-13, 2015, Source: NTT DOCOMO, Nc., Title: Initial views on CA enhancements to support up to 32 component carriers.

3GPP TSG RAN WG1 Meeting #80 R1-150699, Athens, Greece, Feb. 9-13, 2015, Agenda item: 7.2.2.2.2, Source: Alcatel-Lucent Shanghai Bell, Alcatel-Lucent, Title: Enhancements to UL control signalling for up to 32 component carriers.

(56)          References Cited

OTHER PUBLICATIONS

3GPP TSG RAN WG1 Meeting #80 R1-150825, Athens, Feb. 9-13, 2015, Title: Observations on Necessary Enhancements to UL control signaling, Source: Nokia Networks, Nokia Corporation, NTT DOCOMO.
3GPP TSG-RAN WG1 #80 R1-150086, Athens, Greece, Feb. 9-13, 2015, Source: Intel Corporation, Title: Discussion on CA enhancement for release 13.
3GPP TSG-RAN WG1 #80 R1-150537, Athens, Greece, Feb. 9-13, 2015, Agenda Item: 7.2.2.2.1, Source: InterDigital Communications, Title: Enabling LTE carrier aggregation of up to 32 component carriers.
3GPP TSG-RAN WG1 Meeting #80 R1-150454, Athens, Greece, Feb. 9-13, 2015, Agenda item: 7.2.2.2.3, Source: Nokia Networks, Nokia Corporation, Title: PUCCH Enhancements for Carrier Aggregation Enhancement Beyond 5 Carriers.
3GPP TSG-RAN WG1 Meeting #80 R1-150455, Athens, Greece, Feb. 9-13, 2015, Agenda item: 7.2.2.2.3, Source: Nokia Networks, Nokia Corporation, Title: CSI reporting for Carrier Aggregation Enhancement Beyond 5 Carriers.
3GPP TSG-RAN WG1#80 R1-150324, Athens, Greece, Feb. 9-13, 2015, Source: Ericsson, Title: UL control signaling enhancements for up to 32 CCs.
3GPP TSG-RAN WG2 Meeting#89 R2-150134, Feb. 9-13, 2015, Athens, Greece, Source: Institute for Information Industry (III), Title: Partition UGI feedback.
3GPP TSG RAN WG2 #89 bis R2-151304, 20.4. to 24.5.2015, Bratislava, Slovakia, Source: ITRI, Title: Discussion on SR on PUCCH SCell.
3GPP TSG RAN WG2 #89bis R2-151637, Apr. 20 to 24, 2015, Bratislava, Slovakia, Source: Samsung, Title: SR support for CA enhancements.
3GPP TSG RAN WG2 #90 R2-152712, May 25 to 29, 2015, Fukuoka, Japan, Source: Samsung, Title: How to support SR in PUCCH SCell.
3GPP TSG RAN WG2 Meeting #89bis R2-151430, Bratislava, Slovakia, Apr. 20-24, 2015, Source: NEC, Title: SR on PUCCH SCell.
3GPP TSG RAN WG2 Meeting #89bis R2-151104, Bratislava, Slovakia, Apr. 20-24, 2015, Source: Intel Corporation, Title: Control plane aspects of support PUCCH on SCell.
3GPP TSG RAN WG2 Meeting #89bis R2-151342, Bratislava, Slovakia, Apr. 20-24, 2015, Source: CATT, Title: D-SR on PUCCH SCell.
3GPP TSG RAN WG2 Meeting #90 R2-152277, Fukuoka, Japan, May 25-29, 2015, Source: CATT, Title: D-SR on PUCCH SCell.
3GPP TSG RAN WG2 Meeting #90 R2-152512, Fukuoka, Japan, May 25-29, 2015, Source: NEC, Title: Potential issues of SR on PUCCH SCell.
3GPP TSG RAN2 Meeting #90 R2-152524, Fukuoka, Japan, May 25-29, 2015, Source: NEC, Title: Overlapping of D-SR resources.
3GPP TSG-RAN WG2 #89bis R2-151495, Bratislava, Slovakia, Apr. 20-24, 2015, Source: HTC, Title: PUCCH SCell management.
3GPP TSG-RAN WG2 #89bis Tdoc R2-151488, Bratislava, Slovakia, Apr. 20-24, 2015, Source: Ericsson, Title: SR on PUCCH SCell.
3GPP TSG-RAN WG2 #90 R2-152418, Fukuoka, Japan, May 25-29, 2015, Source: HTC, Title: Managing PUCCH resources on a deactivated PUCCH SCell.
3GPP TSG-RAN WG2 #90 Tdoc R2-152530, Fukuoka, Japan, May 25-29, 2015, Source: Ericsson, Title: SR on PUCCH SCell.
3GPP TSG-RAN WG2 Meeting #89bis R2-151211, Bratislava, Slovakia, Apr. 20-24, 2015, Source: Nokia Networks, Title: SR on SCell.
3GPP TSG-RAN WG2 Meeting #89bis R2-151324, Bratislava, Slovakia, Apr. 20-24, 2015, Source: Huawei, HiSilicon, Title: Leftover issues for PUCCH on SCell.
3GPP TSG-RAN WG2 Meeting #89bis R2-151469, Bratislava, Slovakia, Apr. 20-24, 2015, Source: Alcatel-Lucent Shanghai Bell, Alcatel-Lucent, Title: SR transmissions on SCell PUCCH.
3GPP TSG-RAN WG2 Meeting #90 R2-152273, Fukuoka, Japan, May 25-29, 2015, Source: Huawei, HiSilicon, Title: Issues for SR on PUCCH SCell.
3GPP TSG-RAN WG2 Meeting #90 R2-152302, Fukuoka, Japan, May 25-29, 2015, Source: Nokia Networks, Title: SR on PUCCH SCell.
3GPP TSG-RAN WG2 Meeting #90 R2-152310, Fukuoka, Japan, May 25-29, 2015, Source: Nokia Networks, Title: PUCCH SCell pre-activation.
3GPP TSG-RAN WG2 Meeting #90 R2-152366, Fukuoka, Japan, May 25-May 29, 2015, Source: LG Electronics Inc., Title: SR for CA enhancement.
3GPP TSG-RAN WG2 Meeting #90 R2-152742, Fukuoka, Japan, May 25-29, 2015, Source: Qualcomm Incorporated, Title: Dual SR Procedures.
3GPP TSG-RAN2 #89bis Meeting R2-151252, Bratislava, Slovakia, Apr. 20-24, 2015, Source: MediaTek Inc., Title: Remaining issues for PUCCH on SCell.
3GPP TSG-RAN2 #90 Meeting R2-152138, Fukuoka, Japan, May 25-29, 2015, Source: MediaTek Inc., Title: Remaining UP issues for PUCCH on SCell.
3GPP TSG RAN WG1 Meeting #80 R1-150067, Athens, Greece, Feb. 9-13, 2015, Source: Huawei, HiSilicon, Title: Support of PUCCH on SCell based on dual connectivity mechanism.
R1-156047, 3GPP TSG RAN WG1 Meeting #82bis, Malmo, Sweden, Oct. 5-9, 2015, Source: Ericsson, Title: On Support of Multiple DL Data Transmission Starting Points.
R1-156043, 3GPP TSG RAN WG1 Meeting #82bis, Malmo, Sweden, Oct. 5-9, 2015, Source: Ericsson, Title: On Dynamic DL/UL Scheduling.
R1-155902, 3GPP TSG RAN WG1 Meeting #82bis, Malmo, Sweden, Oct. 5-9, 2015, Source: NTT DOCOMO, Inc., Title: Discussion on discontinuous transmission and scheduling design for LAA DL.
R1-155781, 3GPP TSG RAN WG1#82bis, Oct. 5-9, 2015, Malmo, Sweden, Source: Motorola Mobility, Title: PDSCH Transmission options for LAA.
R1-155629, 3GPP TSG RAN WG1 Meeting #82bis, Malmo, Sweden, Oct. 5-9, 2015, Source: Alcatel-Lucent, Alcatel-Lucent Shanghai Bell, Title: PDSCH and DCI Transmissions in LAA.
R1-155570, 3GPP TSG RAN WG1 Meeting #82bis, Malmo, Sweden, Oct. 5-9, 2015, Source: Sharp, Title: Scheduling methods for LAA SCell.
R1-155569, 3GPP TSG RAN WG1 Meeting #82bis, Malmo, Sweden, Oct. 5-9, 2015, Source: Sharp, Title: Subframe structure for LAA discontinuous transmission.
R1-155531, 3GPP TSG RAN WG1 Meeting #82bis, Malmo, Sweden, Oct. 5-9, 2015, Source: Kyocera, Title: DL Transmission Design for partial subframe.
R1-155529, 3GPP TSG-RAN WG1 Meeting #82bis, Malmo, Sweden, Oct. 5-9, 2015, Source: InterDigital Communications, Title: On LAA scheduling.
R1-155474, 3GPP TSG RAN WG1 #82bis, Malmo, Sweden, Oct. 5-9, 2015, Source: Samsung, Title: Partial subframe for LAA.
R1-155468, 3GPP TSG RAN WG1 #82bis, Malmo, Sweden, Oct. 5-9, 2015, Source: Samsung, Title: LAA transmission burst structure and signaling.
R1-155389, 3GPP TSG RAN WG1 meeting #82bis, Malmo, Sweden, Oct. 5-9, 2015, Source: LG Electronics, Title: DL transmission structure in LAA.
R1-155316, 3GPP TSG RAN WG1 Meeting #82bis, Malmo, Sweden, Oct. 5-9, 2015, Source: Intel Corporation, Title: DL sub-frame structure and (e)PDCCH.
R1-155103, 3GPP TSG RAN WG1 Meeting #82bis, Malmo, Sweden, Oct. 5-9, 2015, Source: Huawei, HiSilicon, Title: Candidate starting/ending positions of partial subframe and corresponding indication for LAA.
R1-154150, 3GPP TSG RAN WG1 #82, Beijing, China, Aug. 24-28, 2015, Source: Samsung, Title: Partial subframe for LAA.
R1-153787, 3GPP TSG RAN WG1 Meeting #82, Beijing, China, Aug. 24-28, 2015, Source: Huawei, HiSilicon, Title: Candidate starting positions of partial subframe and corresponding RS pattern for LAA.

(56) References Cited

OTHER PUBLICATIONS

R1-153786, 3GPP TSG RAN WG1 Meeting #82, Beijing, China, Aug. 24-28, 2015, Source: Huawei, HiSilicon, Title: Indication of DL transmission burst duration for LAA.

3GPP TS 36.213 V12.5.0 (Mar. 2015), Technical Specification, 3rd Generation Partnership Project; Technical Specification Group Radio Access Network; Evolved Universal Terrestrial Radio Access (E-UTRA); Physical layer procedures (Release 12).

3GPP TR 36.889 V1.0.1 (Jun. 2015), Technical Report, 3rd Generation Partnership Project; Technical Specification Group Radio Access Network; Study on Licensed-Assisted Access to Unlicensed Spectrum; (Release 13).

3GPP TSG RAN WG1 Meeting #83 R1-157531, Anaheim, USA, Nov. 16-20, 2015, Source: Ericsson, Title: On Energy Detection Threshold for LAA.

3GPP TS 36.211 V13.0.0 (Dec. 2015), Technical Specification, 3rd Generation Partnership Project; Technical Specification Group Radio Access Network; Evolved Universal Terrestrial Radio Access (E-UTRA); Physical channels and modulation (Release 13).

3GPP TS 36.212 V13.0.0 (Dec. 2015), Technical Specification, 3rd Generation Partnership Project; Technical Specification Group Radio Access Network; Evolved Universal Terrestrial Radio Access (E-UTRA); Multiplexing and channel coding, (Release 13).

3GPP TS 36.213 V13.0.1 (Jan. 2016), Release 13, Technical Specification (TS).

3GPP TS 36.300 V13.2.0 (Dec. 2015), Technical Specification, 3rd Generation Partnership Project; Technical Specification Group Radio Access Network; Evolved Universal Terrestrial Radio Access (E-UTRA) and Evolved Universal Terrestrial Radio Access Network, (E-UTRAN); Overall description; Stage 2 (Release 13).

3GPP TS 36.321 V13.0.0 (Dec. 2015), Technical Specification, 3rd Generation Partnership Project; Technical Specification Group Radio Access Network; Evolved Universal Terrestrial Radio Access (E-UTRA); Medium Access Control (MAC) protocol specification, (Release 13).

3GPP TS 36.331 V13.0.0 (Dec. 2015), Technical Specification, 3rd Generation Partnership Project; Technical Specification Group Radio Access Network; Evolved Universal Terrestrial Radio Access (E-UTRA); Radio Resource Control (RRC); Protocol specification (Release 13).

3GPP TSG RAN WG1 #82, R1-154139, Beijing, China, Aug. 24-28, 2015, Title: CCA threshold and transmission power for LAA.

3GPP TSG RAN WG1 #82bis R1-155460, Malmo, Sweden, Oct. 5-9, 2015, Source: Samsung, Title: LAA energy detection adaptation.

3GPP TSG RAN WG1 #82bis, R1-155721, Oct. 5-9, 2015, Malmo, Sweden, Agenda item: 7.2.3.1, Source: Qualcomm Incorporated Title: Adaptive ED threshold setting.

3GPP TSG RAN WG1 #82bis, R1-155722, Oct. 5-9, 2015, Malmo, Sweden, Agenda item: 7.2.3.1, Source: Qualcomm Incorporated Title: Remaining details of UL LBT operation.

3GPP TSG RAN WG1 #82bis, R1-155724, Oct. 5-9, 2015, Malmo, Sweden, Agenda item: 7.2.3.1, Source: Qualcomm Incorporated, Title: Multi-carrier LBT operation.

3GPP TSG RAN WG1 #83 R1-156489, Nov. 15-22, 2015, Anaheim, USA, Agenda item: 6.2.3.1, Source: Cisco Systems, Title: Views on Energy Detection Threshold Adaptation.

3GPP TSG RAN WG1 #83 R1-156490, Nov. 15-22, 2015, Anaheim, USA, Agenda item: 6.2.3.1, Source: Cisco Systems, Title: Views on Multi-Channel Access for LAA.

3GPP TSG RAN WG1 #83 R1-156763, Anaheim, California, US, Nov. 15-22, 2015, Agenda item: 6.2.3.1, Source: Samsung, Title: LAA Multi-Channel LBT.

3GPP TSG RAN WG1 #83 R1-157036, Nov. 14-22, 2015, Anaheim, USA, Agenda item: 6.2.3.1, Source: Qualcomm Incorporated, Title: Adaptive ED threshold setting.

3GPP TSG RAN WG1 #83 R1-157039, Nov. 14-22, 2015, Anaheim, USA, Agenda item: 6.2.3.1, Source: Qualcomm Incorporated, Title: Multicarrier LBT operation.

3GPP TSG RAN WG1 82bis Meeting, R1-155096, Malmo, Sweden, Oct. 5-9, 2015, Title: Evaluations for energy detection threshold.

3GPP TSG RAN WG1 82bis Meeting, R1-155097, Malmo, Sweden, Oct. 5-9, 2015, Title: Adaptation rules of energy detection threshold.

3GPP TSG RAN WG1 83 Meeting R1-156914, Anaheim, USA, Nov. 15-22, 2015, Agenda Item: 6.2.3.1, Source: Huawei, HiSilicon, Title: Remaining LBT parameters for LAA DL.

3GPP TSG RAN WG1 83 Meeting, R1-156437, Anaheim, USA, Nov. 15-22, 2015, Agenda Item: 6.2.3.1, Source: Huawei, HiSilicon, Title: Adaptation rules of energy detection threshold.

3GPP TSG RAN WG1 Meeting #81, R1-152581, Fukuoka, Japan, May 25-29, 2015, Source: CATT, Title: Discontinuous transmission for LAA.

3GPP TSG RAN WG1 Meeting #81, R1-152816, Fukuoka, Japan, May 25-29, 2015, Source: Nokia Networks, Title: On the remaining PHY issues for LAA UL operation.

3GPP TSG RAN WG1 Meeting #81, R1-152970, Fukuoka, Japan, May 25-29, 2015, Source: ZTE, Title: Overview on LAA UL.

3GPP TSG RAN WG1 Meeting #82b R1-156981, Anaheim, CA, Nov. 15-22, 2015, Agenda item: 6.2.3.1, Source: CableLabs, Title: Limitations of Multi-carrier Allocation Scheduling.

3GPP TSG RAN WG1 Meeting #82bis, R1-155592, Malmö, Sweden, Oct. 5-9, 2015, Agenda item: 7.2.3.1, Source: HTC, Title: Discussion on Adaptation Rules of the Maximum Energy Detection Threshold in LAA Coexistence.

3GPP TSG RAN WG1 Meeting #82bis, R1-155310, Malmö, Sweden, Oct. 5-9, 2015, Agenda Item: 7.2.3.1, Title: Energy detection threshold for LAA.

3GPP TSG RAN WG1 meeting #82bis, R1-155385, Malmö, Sweden, Oct. 5-9, 2015, Title: Energy detection threshold in LAA.

3GPP TSG RAN WG1 Meeting #82bis, R1-155626, Malmö, Sweden, Oct. 5-9, 2015, Agenda item: 7.2.3.1, Source: Alcatel-Lucent Shanghai Bell, Alcatel-Lucent, Title: Multi-carrier LBT operation for LAA.

3GPP TSG RAN WG1 Meeting #82bis, R1-155816, Malmö, Sweden, Oct. 5-9, 2015, Agenda Item: 7.2.3.1, Source: Lenovo, Title: Multi-carrier LBT operation for LAA.

3GPP TSG RAN WG1 Meeting #82bis, R1-155898, Malmö, Sweden, Oct. 5-9, 2015, Source: NTT DOCOMO, Inc., Title: Views on LBT for multiple carriers.

3GPP TSG RAN WG1 Meeting #82bis, R1-156033, Malmö, Sweden, Oct. 5-9, 2015, Source: Ericsson, Title: On Channel Access Solutions for LAA Multi-Carrier Transmission.

3GPP TSG RAN WG1 Meeting #82bis, R1-156037, Malmö, Sweden, Oct. 5-9, 2015, Source: Ericsson, Title: On Adaptation of the Energy Detection Threshold for LAA.

3GPP TSG RAN WG1 Meeting #83 R1-156510, Anaheim, USA, Nov. 15-22, 2015, Agenda item: 6.2.3.1, Source: Intel Corporation, Title: Remaining Details on LBT.

3GPP TSG RAN WG1 Meeting #81 R1-153295, Fukuoka, Japan, May 25-29, 2015, Source: Institute for Information Industry (III), Title: Discussion on Dynamic Selection of SR PUCCH Resources.

3GPP TSG RAN WG2 Meeting #89 R2-150264, Athens, Greece, Feb. 9-13, 2015, Source: CATT, Title: Discussion on the functionality of PUCCH SCell.

3GPP TSG RAN WG2 Meeting RAN2#89, Athens, Greece, Feb. 9-13, 2015, R2-150403, Agenda Item: 7.2, Source: NEC, Title: PUCCH on SCell.

3GPP TSG-RAN WG2 Meeting #89 R2-150129, Athens, Greece, Feb. 9-13, 2015, Agenda Item: 7.2, Source: Nokia Networks, Nokia Corporation, Title: SR on SCell, WID/SID: LTE_CA_enh_b5C-Core Release 13.

3GPP TSG RAN WG2 Meeting #89 R2-150278, Athens, Greece, Feb. 9-Feb. 13, 2015, Source: Microsoft Corporation, Title: SCell PUCCH for CA.

3GPP TSG-RAN WG2 Meeting #89 R2-150372, Athens, Greece, Feb. 9-13, 2015, Source: Huawei, HiSilicon, Title: Introduce PUCCH on SCell for CA beyond 5 carriers.

3GPP TSG-RAN WG2 Meeting #90 R2-152513, Fukuoka, Japan, May 25-29, 2015, Title: SR on PUCCH-SCell, Source to WG: Ericsson.

(56)             References Cited

OTHER PUBLICATIONS

3GPP TSG-RAN2 Meeting #64bis, Ljubljana, Slovenia, Jan. 12-16, 2009, R2-090659, Title: S PRC Parameters for MAG and RLG, Source to WG: Nokia Siemens Networks, Nokia Corporation, Source to TSG: R2, Work item code: LTE-L23.

3GPP TSG-RAN2#72 meeting Tdoc XR2-106513, Jacksonville, U.S. Nov. 15-19, 2010, Agenda Item: 7.1.4.3, Source: Samsung, Title: SR handling in CA.

Jan. 24, 2018—Japanese Office Action—JP 2017-546843.

Apr. 5, 2018—Korean Office Action—KR 2017-7025399.

3GPP TS 36.133 V12.6.0 (Dec. 2014), Technical Specification, 3rd Generation Partnership Project; Technical Specification Group Radio Access Network; Evolved Universal Terrestrial Radio Access (E-UTRA); Requirements for support of radio resource management, Valbonne, France.

3GPP TSG RAN WG2 Meeting #89 R2-150150, Athens, Greece, Feb. 9-13, 2015, Source: ZTE, Title: Activation/Deactivation for SCell carrying PUCCH.

3GPP TSG RAN WG2 Meeting #89 R2-150263, Athens, Greece, Feb. 9-13, 2015, Source: CATT, Title: Introduction of PUCCH Cell Group.

3GPP TSG-RAN WG2 #87, Aug. 18-22, 2014, Dresden, Germany, R2-143073, Update of R2-141967, Source: NTT DOCOMO, Inc, Title: Support of PUCCH on SCell for CA-RAN2 aspects.

3GPP TSG-RAN WG2 Meeting #72bis, Dublin, Ireland, Jan. 17-21, 2011, R2-110113, Agenda item: 7.1.4, Source: Huawei, Title: CQI Reporting at Activation.

3GPP TSG-RAN WG2 Meeting #87, Aug. 18-22, 2014, Dresden, Germany, R2-143117, Agenda Item: 6.1.2, Source: Samsung, Title: Discussion on PHR triggering due to SCell activation.

3GPP TSG-RAN WG2 Meeting #89 R2-150186, Athens, Greece, Feb. 9-13, 2015, Source: Nokia Corporation, Nokia Networks, Title: PUCCH SCell RLM and activation/deactivation.

3GPP TSG-RAN WG2 Meeting #89 R2-150277, Athens, Greece, Feb. 9-13, 2015, Source: KT Corp., Title: Activation/deactivation of SCell carrying PUCCH.

3GPP TSG-RAN WG2 Meeting#89 R2-150238, Athens, Greece, Feb. 9-13, 2015, Agenda Item: 7.2, Source: Fujitsu, Title: Discussion on the PUCCH support on SCell.

3GPP TSG-RAN WG4 Meeting #68, Barcelona, Spain, Aug. 19-23, 2013, R4-134045, Agenda item: 5.2.3, Source: NSN, Nokia Corporation, Title: Remaining issues on SCell Activation Delay Requirements.

3GPP TSG-RAN1#63bis meeting R1-110069, Dublin, Ireland, Jan. 17-21, 2011, Agenda Item: 6.2.1, Source: Samsung, Title: CSI reporting and SRS timing upon SCell activation/deactivation.

3GPP TSG-RAN1#64 meeting R1-110721, Taipei, Taiwan, Feb. 21-25, 2011, Agenda item: 4, Source: Samsung, Title: CQi reporting at SCell activation.

3GPP TSG-RAN WG2 Meeting #89 R2-150380, Athens, Greece, Feb. 9-Feb. 13, 2015, Source: LG Electronics Inc., Title: Potential issues in MAC for CA enhancement.

3GPP TSG RAN WG1 #80 R1-150358, Athens, Greece, Feb. 9-13, 2015, Agenda item: 7.2.2.2.1, Source: Samsung, Title: Necessary mechanisms for supporting CA with up to 32 CCs.

3GPP TSG RAN WG1 #80 R1-150359, Athens, Greece, Feb. 9-13, 2015, Agenda item: 7.2.2.2.2, Source: Samsung, Title: Enhancements to DL control signaling for CA with up to 32 CCs.

3GPP TSG RAN WG1 Meeting #80 R1-150104, Athens, Greece, Feb. 9-13, 2015, Source: CATT, Title: Enhancements to DL control signaling for Rel-13 CA.

3GPP TSG RAN WG1 Meeting #80 R1-150137, Athens, Greece, Feb. 9-13, 2015, Source: ZTE, Title: PDCCH/EPDCCH enhancements for Carrier Aggregation.

3GPP TSG RAN WG1 Meeting #80 R1-150169, Athens, Greece, Feb. 9-13, 2015, Agenda item: 7.2.2.2.2, Source: Alcatel-Lucent Shanghai Bell, Alcatel-Lucent, Title: Enhancements to DL control signalling for up to 32 component carriers.

3GPP TSG RAN WG1 Meeting #80 R1-150170, Athens, Greece, Feb. 9-13, 2015, Source: Alcatel-Lucent Shanghai Bell, Alcatel-Lucent, Title: DL PHICH enhancement to support up to 32 carriers aggregation.

3GPP TSG RAN WG1 Meeting #80 R1-150277, Athens, Greece, Feb. 9-13, 2015, Source: Sharp, Title: Considerations on DL Control Signaling for Rel-13 CA.

3GPP TSG RAN WG1 Meeting #80 R1-150293, Athens, Greece, Feb. 9-13, 2015, Agenda item: 7.2.2.2.2, Source: NEC, Title: Discussion on DL control signaling enhancements.

3GPP TSG RAN WG1 Meeting #80 R1-150315, Athens, Greece, Feb. 9-13, 2015, Source: Panasonic, Title: identified DL aspects for CA beyond 5 carriers.

3GPP TSG RAN WG1 Meeting #80 R1-150437, Athens, Greece, Feb. 9-13, 2015, Source: CMCC, Title: Design principle to support CA up to 32 carriers.

3GPP TSG RAN wg1 Meeting #80 R1-150523, Athens, Greece, Feb. 9-13, 2015, Agenda item: 7.2.2.2.2, Source: HTC, Title: DL control signaling for CA up to 32 CCs.

3GPP TSG RAN WG1 Meeting #80 R1-150593, Athens, Greece, Feb. 9-13, 2015, Source: NTT DOCOMO, Inc., Title: Necessary enhancements to enable LTE CA of up to 32CCs for DL and UL.

3GPP TSG RAN WG1 Meeting #80 R1-150824, Athens, Feb. 9-13, 2015, Title: Observations on Necessary Enhancements to DL control signaling, Source: Nokia Corporation, Nokia Networks, NTT DOCOMO.

3GPP TSG RAN WG2 Meeting #89 R2-150038, Athens, Greece, Feb. 9-13, 2015, Title: LS on RAN1 agreements on PUCCH on SCell for CA, Release: Rel-13, Work Item: LTE_CA_enh_b5C-Core, Source: TSG RAN WG1.

3GPP TSG-RAN WG1 Meeting #80 R1-150495, Athens, Greece, Feb. 9-13, 2015, Agenda item: 7.2.2.2.2, Source: Nokia Corporation, Nokia Networks, Title: On DL control signalling for up to 32 component carriers.

3GPP TSG-RAN WG1#80 R1-150323, Athens, Greece, Feb. 9-13, 2015, Source: Ericsson, Title: DL control signaling enhancements for up to 32 CCs.

3GPP TSG-RAN WG2 meeting #89 R2-150149, Athens, Greece, Feb. 9-13, 2015, Source: ZTE, Title: The principle of grouping PUCCH cell.

3GPP TSG-RAN2 #89 Meeting R2-150289, Athens, Greece, Feb. 9-13, 2015, Source: MediaTek Inc., Title: Cross-carrier scheduling for CA enhancement beyond 5CCs.

3GPP TSG-RAN2 #89 Meeting R2-150290, Athens, Greece, Feb. 9-13, 2015, Source: MediaTek Inc., Title: PUCCH on SCell for CA enhancement beyond 5CCs.

3GPP TSG RAN WG1 #80 R1-150357, Athens, Greece, Feb. 9-13, 2015, Agenda item: 7.2.2.1, Source: Samsung, Title: PUCCH Transmission on SCell for CA.

3GPP TSG RAN WG1 #80 R1-150361, Athens, Greece, Feb. 9-13, 2015, Agenda item: 7.2.2.2.3, Source: Samsung, Title: CSI Transmission for Enhanced CA.

3GPP TSG RAN WG1 #80 R1-150468, Feb. 9-Feb. 13, 2015, Athens, Greece, Agenda item: 7.2.2.1, Source: Qualcomm Incorporated, Title: PUCCH on SCell.

3GPP TSG RAN WG1 #80 R1-150473, Feb. 9-Feb. 13, 2015, Athens, Greece, Agenda item: 7.2.2.2.3, Source: Qualcomm Incorporated, Title: CSI feedback for up to 32 component carriers.

3GPP TSG RAN WG1 #80 R1-150742, Feb. 9-Feb. 13, 2015, Athens, Greece, Agenda item: 7.2.2.2.3, Source: Qualcomm Incorporated, Title: Harq Ack for up to 32 DL Carriers.

3GPP TSG RAN WG1 #80 R1-150823, Athens, Greece, Feb. 9-13, 2015, Title: WF on PUCCH on SCell for CA, Source: NTT DOCOMO, NEC, Sharp, Softbank Mobile, Intel, Ericsson, KDDI.

3GPP TSG RAN WG1 #80, Athens, Greece, Feb. 9-13, 2015, R1-150822, Title: Way Forward on PUCCH on SCell for CA, Source: Ericsson, NEC, Sharp, NTT DOCOMO, ZTE.

R1-164572 3GPP TSG RAN WG1 Meeting #85, Nanjing, China, May 23-27, 2016, Source: ZTE, Title: HARQ for UL LAA.

3GPP TS 36.211 V14.0.0 (Sep. 2016); Technical Specification; 3rd Generation Partnership Project; Technical Specification Group Radio Access Network; Evolved Universal Terrestrial Radio Access (E-UTRA); Physical channels and modulation (Release 14).

(56) References Cited

OTHER PUBLICATIONS

3GPP TS 36.212 V14.0.0 (Sep. 2016); Technical Specification; 3rd Generation Partnership Project; Technical Specification Group Radio Access Network; Evolved Universal Terrestrial Radio Access (E-UTRA); Multiplexing and channel coding (Release 14).

3GPP TS 36.213 V14.0.0 (Sep. 2016); Technical Specification; 3rd Generation Partnership Project; Technical Specification Group Radio Access Network; Evolved Universal Terrestrial Radio Access (E-UTRA); Physical layer procedures (Release 14).

3GPP TS 36.300 V14.0.0 (Sep. 2016); Technical Specification, 3rd Generation Partnership Project; Technical Specification Group Radio Access Network; Evolved Universal Terrestrial Radio Access (E-UTRA) and Evolved Universal Terrestrial Radio Access Netowork (E-UTRAN); Overall description; Stage 2 (Release 14).

3GPP TS 36.321 V14.0.0 (Sep. 2016); Technical Specification; 3rd Generation Partnership Project; Technical Specification Group Radio Access Network; Evolved Universal Terrestrial Radio Access (E-UTRA); Medium Access Control (MAC) protocol specification (Release 14).

3GPP TS 36.331 V14.0.0 (Sep. 2016); Technical Specification; 3rd Generation Partnership Project; Technical Specification Group Radio Access Network; Evolved Universal Terrestrial Radio Access (E-UTRA); Radio Resource Control (RRC); Protocol specification (Release 14).

IEEE 802 Interim Session, Atlanta, USA, Jan. 11-16, 2015, Source: Dino Flore, Qualcomm Technologies Inc., Title: 3GPP & Unlicensed Spectrum.

R1-160358 3GPP TSG RAN WG1 Meeting #84, St. Julian's, Malta, Feb. 15-19, 2016, Source: CATT, Title: Support of PRACH for LAA Scell.

R1-160564 3GPP TSG RAN WG1 Meeting #84, St. Julian's, Malta, Feb. 15-19, 2016, Source: Samsung, Title: Discussion on RA procedure for UL LAA.

R1-160565 3GPP TSG RAN WG1 Meeting #84, St. Julian's, Malta, Feb. 15-19, 2016, Source: Samsung, Title: Discussion on PRACH for UL LAA.

R1-160625 3GPP TSG RAN WG1 Meeting #84, St. Julian's, Malta, Feb. 15-19, 2016, Source: LG Electronics, Title: Random Access in LAA.

R1-160797 3GPP TSG RAN WG1 Meeting #84, St. Julian's, Malta, Feb. 15-19, 2016, Source: Panasonic, Title: PRACH on Unlicensed Carriers.

R1-160883 3GPP TSG RAN WG1 Meeting #84, St. Julian's, Malta, Feb. 15-19, 2016, Source: Qualcomm Incorporated, Title: Random Access Channel Design.

R1-160950 3GPP TSG RAN WG1 Meeting #84, St. Julian's, Malta, Feb. 15-19, 2016, Source: NTT DOCOMO, Inc., Title: Discussion on PRACH for eLAA UL.

R1-160961 3GPP TSG RAN WG1 Meeting #84, St. Julian's, Malta, Feb. 15-19, 2016, Source: Coolpad, Title: Discussion on PUSCH and PRACH for eLAA.

R1-160975 3GPP TSG RAN WG1 Meeting #84, St. Julian's, Malta, Feb. 15-19, 2016, Source: MediaTek Inc., Title: Considerations on PRACH for LAA.

R1-160999 3GPP TSG RAN WG1 Meeting #84, St. Julian's, Malta, Feb. 15-19, 2016, Source: Ericsson, Title: PRACH Design for Enhanced LAA.

R1-162132 3GPP TSG RAN WG1 Meeting #84bis, Busan, Korea, Apr. 11-15, 2016, Source: Huawei, HiSilicon, Title: PRACH for eLAA.

R1-162145 3GPP TSG RAN WG1 Meeting #84bis, Busan, Korea, Apr. 11-15, 2016, Source: Huawei, HiSilicon, Title: Overview of Radio Access Mechanism for 5G.

R1-162263 3GPP TSG RAN WG1 Meeting #84bis, Busan, Korea, Apr. 11-15, 2016, Source: CATT, Title: Support of PRACH for Rel-14 eLAA.

R1-162326 3GPP TSG RAN WG1 Meeting #84bis, Busan, Korea, Apr. 11-15, 2016, Source: ZTE Microelectronics Technology, Nubia Technology, Title: PRACH Design for LAA.

R1-162358 3GPP TSG RAN WG1 Meeting #84bis, Busan, Korea, Apr. 11-15, 2016, Source: Intel Corporation, Title: PRACH Design for eLAA.

R1-162470 3GPP TSG RAN WG1 Meeting #84bis, Busan, Korea, Apr. 11-15, 2016, Source: LG Electronics, Title: Random access preamble in LAA.

R1-162471 3GPP TSG RAN WG1 Meeting #84bis, Busan, Korea, Apr. 11-15, 2016, Source: LG Electronics, Title: Random access procedure in LAA.

R1-162527 3GPP TSG RAN WG1 Meeting #84bis, Busan, Korea, Apr. 11-15, 2016, Source: HTC, Title: Discussion on PRACH design for LAA.

R1-162619 3GPP TSG RAN WG1 Meeting #84bis, Busan, Korea, Apr. 11-15, 2016, Source: Huawei, HiSilicon, Title: PRACH enhancement in high speed scenario.

R1-162668 3GPP TSG RAN WG1 Meeting #84bis, Busan, Korea, Apr. 11-15, 2016, Source: Samsung, Title: PRACH Transmission Aspects.

R1-162803 3GPP TSG RAN WG1 Meeting #84bis, Busan, Korea, Apr. 11-15, 2016, Source: NTT DOCOMO, Inc., Title: Discussion on PRACH for eLAA ULL.

R1-162919 3GPP TSG RAN WG1 Meeting #84bis, Busan, Korea, Apr. 11-15, 2016, Source: Nokia, Alcatel-Lucent Shanghai Bell, Title: Discussion on PRACH design for eLAA.

R1-162940 3GPP TSG RAN WG1 Meeting #84bis, Busan, Korea, Apr. 11-15, 2016, Source: MediaTek Inc., Title: PRACH design in eLAA.

R1-162995 3GPP TSG RAN WG1 Meeting #84bis, Busan, Korea, Apr. 11-15, 2016, Source: Coolpad, Title: Discussion on PRACH for eLAA.

R1-163026 3GPP TSG RAN WG1 Meeting #84bis, Busan, Korea, Apr. 11-15, 2016, Source: Qualcomm Incorporated, Title: PRACH design details.

R1-163821 3GPP TSG RAN WG1 Meeting #84bis, Busan, Korea, Apr. 11-15, 2016, Source: Ericsson, Title: On Performance of PRACH for Enhanced LAA.

R2-162231 3GPP TSG RAN WG2 Meeting #93bis, Dubrovnik, Croatia, Apr. 11-15, 2016, Source: IAESI, Thales, Fairspectrum, Title: High level view of 5G access architecture.

R2-162300 3GPP TSG RAN WG2 Meeting #93bis, Dubrovnik, Croatia, Apr. 11-15, 2016, Source: Samsung, Title: Preliminary View on Initial Access in 5G.

R2-162367 3GPP TSG RAN WG2 Meeting #93bis, Dubrovnik, Croatia, Apr. 11-15, 2016, Source: Samsung, Title: Preliminary View on Initial Access in 5G.

R2-162393 3GPP TSG RAN WG2 Meeting #93bis, Dubrovnik, Croatia, Apr. 11-15, 2016, Source: Samsung, Title: Random Access for eLAA.

R2-162428 3GPP TSG RAN WG2 Meeting #93bis, Dubrovnik, Croatia, Apr. 11-15, 2016, Source: Huawei, HiSilicon, Title: Considerations on RACH for LAA SCell.

R2-162471 3GPP TSG RAN WG2 Meeting #93bis, Dubrovnik, Croatia, Apr. 11-15, 2016, Source: Intel Corporation, Title: RACH procedure for UL LAA.

R2-162745 3GPP TSG RAN WG2 Meeting #93bis, Dubrovnik, Croatia, Apr. 11-15, 2016, Source: Ericsson, Title: Impact on Random Access due to LBT.

R2-162763 3GPP TSG RAN WG2 Meeting #93bis, Dubrovnik, Croatia, Apr. 11-15, 2016, Source: Ericsson, Title: Initial Considerations on NR system access.

R2-162895 3GPP TSG RAN WG2 Meeting #93bis, Dubrovnik, Croatia, Apr. 11-15, 2016, Source: LG Electronics, Inc., Title: Random access aspect in LAA.

R2-162911 3GPP TSG RAN WG2 Meeting #93bis, Dubrovnik, Croatia, Apr. 11-15, 2016, Source: Qualcomm Incorporated, Title: RACH Procedure for Enhanced LAA.

3GPP TSG-RAN WG2 Meeting #84; R2-134141, Source: China Mobile; Title: Signalling Flow Aspects for SeNB's Serving Cell Addition, Modification and Release3Gpp; San Francisco, USA, Nov. 11-15, 2013. (Year:2013).

3GPP TSG RAN WG2 Meeting #85; R2-140188; Source: CATT; Title: SCG Handover; Prague, Czech Republic, Feb. 10-14, 2014. (Year:2014).

(56) References Cited

OTHER PUBLICATIONS

R1-155629, 3GPP TSG RAN WG1 Meeting #82bis, Malmo, Sweden, Oct. 5-9, 2015, Source: Alcatel-Lucent, Alcatel-Lucent Shanghai Bell, Title: POSCH and DCI Transmissions in LAA.

R2-153779, 3GPP TSG-RAN WG2#91, Beijing, China, Aug. 24-28, 2015, Source: Samsung, Title: LAA SCell Aclivation and Deactivation.

3GPP TSG RAN WG1 Meeting #83 R1-156574, Anaheim, USA, Nov. 15-22, 2015, Source: CATT, Title: Remaining details of DL LBT for LAA.

3GPP TSG RAN WG1 Meeting #83 R1-156576, Anaheim, USA, Nov. 15-22, 2015, Source: CATT, Title: DL LBT for LAA multi-carrier transmission.

3GPP TSG RAN WG1 Meeting #83 R1-156762, Anaheim, USA, Nov. 15-22, 2015, Agenda Item: 6.2.3.1, Source: Samsung, Title: ED threshold adaptation for LAA.

3GPP TSG RAN WG1 Meeting #83 R1-156768, Anaheim, USA, Nov. 15-22, 2015, Agenda item: 6.2.3.1, Source: Samsung, Title: Discussion on LBT for UL transmission.

3GPP TSG RAN WG1 meeting #83 R1-156857, Anaheim, USA, Nov. 15-22, 2015, Agenda Item: 6.2.3.1, Source: LG Electronics, Title: Multi-carrier DL TX in LAA.

3GPP TSG RAN WG1 Meeting #83 R1-157014, Anaheim, USA, Nov. 15-22, 2015, Title: Multi-carrier LBT operation for LAA, Source: Alcatel-Lucent Shanghai Bell, Alcatel-Lucent.

3GPP TSG RAN WG1 Meeting #83 R1-157172, Anaheim, USA, Nov. 15-22, 2015, Agenda Item: 6.2.3.1, Source: Intel Corporation, Title: On the LAA ED threshold.

3GPP TSG RAN WG1 Meeting #83 R1-157255, Anaheim, USA, Nov. 16-20, 2015, Source: Ericsson, Title: On Energy Detection Threshold for LAA.

3GPP TSG RAN WG1 Meeting #83 R1-157258, Anaheim, USA, Nov. 16-20, 2015, Source: Ericsson, Title: On Channel Access Solutions for LAA Multi-Carrier Transmission.

3GPP TSG RAN WG1 Meeting #83 R1-157281, Anaheim, USA, Nov. 15-22, 2015, Agenda item: 6.2.3.1, Source: HTC, Title: Discussion on Adaptation Rules of the Maximum Energy Detection Threshold in LAA Coexistence.

3GPP TSG RAN WG1 Meeting #83 R1-157330, Anaheim, USA, Nov. 15-22, 2015, Source: WILUS Inc., Title: Consideration on Multicarrier LBT for LAA.

3GPP TSG RAN WG1 Meeting 83 R1-156702, Anaheim, USA, Nov. 16-20, 2015, Source: SONY, Title: LAA energy detection adaptation rules.

3GPP TSG RAN WG1, Meeting #82bis, R1-155386, Malmö, Sweden, Oct. 5-9, 2015, Title: UL LBT design in LAA.

3GPP TSG-RAN WG1 Meeting #82bis, R1-155914, Malmö, Sweden, Oct. 5-9, 2015, Agenda item: 7.2.3.1, Source: Institute for Information Industry (III) Title: Considerations on Energy Detection Threshold Adaptation.

3GPP TSG-RAN WG1 Meeting #83 R1-157009, Anaheim, USA, Nov. 15-22, 2015, Agenda item: 6.2.3.1, Source: Broadcom Corporation, Title: Further Discussion on LAA DL Multi-channel LBT.

3GPP TSG-RAN WG1 Meeting #83 R1-157306, Anaheim, USA, Nov. 15-22, 2015, Agenda item: 6.2.3.1, Source: Nokia Networks, Title: Multi-carrier LBT for DL LAA.

R1-143396, 3GPP TSG RAN WG1 Meeting #78, Dresden, Germany, Aug. 18-22, 2014, Source: Ericsson, Title: Summary of email discussion [77-08]:Small cell on/off transition lime reduction.

R1-152869, 3GPP TSG RAN WG1 #81, Fukuoka, Japan, May 25-29, 2015, Source: Samsung, Title: Discussion on carrier selection for LAA.

R1-153230, 3GPP TSG RAN WG1 Meeting #81, Fukuoka, Japan, May 25-29, 2015, Source: Huawei, HiSilicon, Title: Design of fast carrier switching for LAA.

R1-153646, 3GPP TSG RAN WG1 Meeting #81, Fukuoka, Japan, May 25-29, 2015, Source: Huawei, HiSilicon, Title: Draft text proposal on fast carrier selection/switching for LAA.

R1-153788, 3GPP TSG RAN WG1 Meeting #82, Beijing, China, Aug. 24-28, 2015, Source: Huawei, HiSilicon, Title: Support for UE synchronization on a LAA SCell.

R1-154020, 3GPP TSG RAN WG1 Meeting #82, Beijing, China, Aug. 24-28, 2015, Source: Panasonic, Title: AGC and lime/frequency synchronization for transmission burst.

R1-154149, 3GPP TSG RAN WG1 #82, Beijing, China, Aug. 24-28, 2015, Source: Samsung, Title: LAA fast carrier selection.

R1-154267, 3GPP TSG RAN WG1 meeting #82, Beijing, China, Aug. 24-28, 2015, Source: LG Electronics, Title: DL synchronization and AGC issues in LAA.

R1-154324, 3GPP TSG RAN WG1 Meeting #82, Beijing, China, Aug. 24-28, 2015, Source: Huawei, HiSilicon, Title: Support for carrier selection/switching in CA enhancement.

R1-154326, 3GPP TSG RAN WG1 Meeting #82, Beijing, China, Aug. 24-28, 2015, Source: Huawei, HiSilicon, Title: L1 indication for UE support of fast carrier selection.

R1-154347, 3GPP TSG RAN WG1 Meeting #82, Beijing, China, Aug. 24-28, 2015, Source: Huawei, HiSilicon, Title: Carrier configuration for UE support of carrier selection.

R1-154593, 3GPP TSG RAN WG1#82, Aug. 24-28, 2015, Beijing, China, Source: Motorola Mobility, Title: Activation/Deactivation procedures for LAA SCells.

R1-154635, 3GPP TSG RAN WG1 Meeting #82, Beijing, China, Aug. 24-28, 2015, Source: Ericsson, Title: Carrier Selection for LAA.

R1-154974, 3GPP TSG RAN WG1 Meeting #82, Beijing, China, Aug. 24-28, 2015, Title: WF on LAA cell selection and synchronization.

R2-152226, 3GPP TSG-RAN WG2#90, Fukuoka, Japan, May 25-29, 2015, Source: Samsung Title: LAA SCell Activation and Deactivation.

R2-152347, 3GPP TSG-RAN WG2 meeting #90, Fukuoka, Japan, May 25-29, 2015, Source: ZTE, Title: Initial Thoughts on (De)activation for LAA SCell.

R2-152362, revision of R2-151652, 3GPP TSG-RAN WG2 Meeting #90, Fukuoka, Japan, May 25-May 29, 2015, Source: LG Electronics Inc., Title: Consideration on DL MAC for unlicensed band.

R2-153163, revision of R2-152362, 3GPP TSG-RAN WG2 Meeting #91 Beijing, China, Aug. 24-Aug. 28, 2015, Source: LG Electronics Inc., Title: Consideration on DL MAC for unlicensed band.

R2-153313, 3GPP TSG-RAN WG2 Meeting #91, Beijing, China, Aug. 24-28, 2015, Source: Huawei, HiSilicon, Title: Supported functionalities and parameters for LAA cell.

R2-153431, 3GPP TSG RAN WG2 #91, Beijing, China, Aug. 24-28, 2015, Source: ETRI, Title: Discussion on Activation/Deactivation for LAA.

R2-153523, 3GPP TSG-RAN WG2#91, Beijing, China, Aug. 24-28, 2015, Source: ZTE, Title: Further Thoughts on (De)activation of LAA SCell.

R2-153569, 3GPP TSG-RAN WG2 #91, Aug. 24-28, 2015, Beijing, China, Source: NTT DOCOMO, Inc., Title: Discussion on deactivation for LAA.

R2-153779, 3GPP TSG-RAN WG2#91, Beijing, China, Aug. 24-28, 2015, Source: Samsung, Title: LAA SCell Activation and Deactivation.

R2-153799, 3GPP TSG-RAN WG2 Meeting #91, Beijing, China, Aug. 24-28, 2015, Source: KT Corp., Title: Discussion on LAA SCell Activation and Deactivation.

R1-151297, 3GPP TSG RAN WG1 Meeting #80bis, Belgrade, Serbia, Apr. 20-24, 2015, Source: Huawei, HiSilicon, Title: Evaluation results of LAA fast carrier scheduling.

R1-153071, 3GPP TSG RAN WG1 Meeting #81, Fukuoka, Japan, May 25-29, 2015, Source: Ericsson, Title: Carrier Selection for CA enhancement.

R1-154009, 3GPP TSG RAN WG1 Meeting #82, Beijing, China, Aug. 24-28, 2015, Source: Kyocera, Title: DL Transmission Design for LAA.

R1-154146, 3GPP TSG RAN WG1 #82, Beijing, China, Aug. 24-28, 2015, Source: Samsung, Title: LAA synchronization.

(56)        References Cited

OTHER PUBLICATIONS

R1-154327, 3GPP TSG RAN WG1 82 Meeting, Beijing, China, Aug. 24-28, 2015, Source: Huawei, HiSilicon, Title: UE support of carrier selection for LAA.

3GPP TSG RAN WG1 Meeting #80bis, R1-151302, Belgrade, Serbia, Apr. 20-24, 2015, Source: Huawei, HiSilicon, Title: Support of UL transmission for LAA.

3GPP TSG RAN WG1 #80bis, R1-151404, Apr. 20-24, 2015, Belgrade, Serbia, Source: Qualcomm Incorporated, Title: Adaptive Frame Structure and DL-UL configuration for LAA.

3GPP TSG RAN WG1 Meeting #80bis, R1-151464, Belgrade, Serbia, Apr. 20-24, 2015, Source: Kyocera, Title: LAA UL Design.

3GPP TSG RAN WG1 meeting #80bis, R1-151516, Belgrade, Serbia, Apr. 20-24, 2015, Source: LG Electronics, Title: LBT operation for LAA UL.

3GPP TSG RAN WG1 Meeting #80bis, R1-151627, Belgrade, Serbia, Apr. 20-24, 2015, Source: Samsung, Title: Discussion on UL transmission for LAA.

* cited by examiner

FIG. 5A Example uplink physical channel

FIG. 5B Example uplink modulation

FIG. 5C Example downlink physical channel

FIG. 5D Example downlink modulation

Dual-Connectivity at eNB

Dual-Connectivity- two MAC entities at UE side

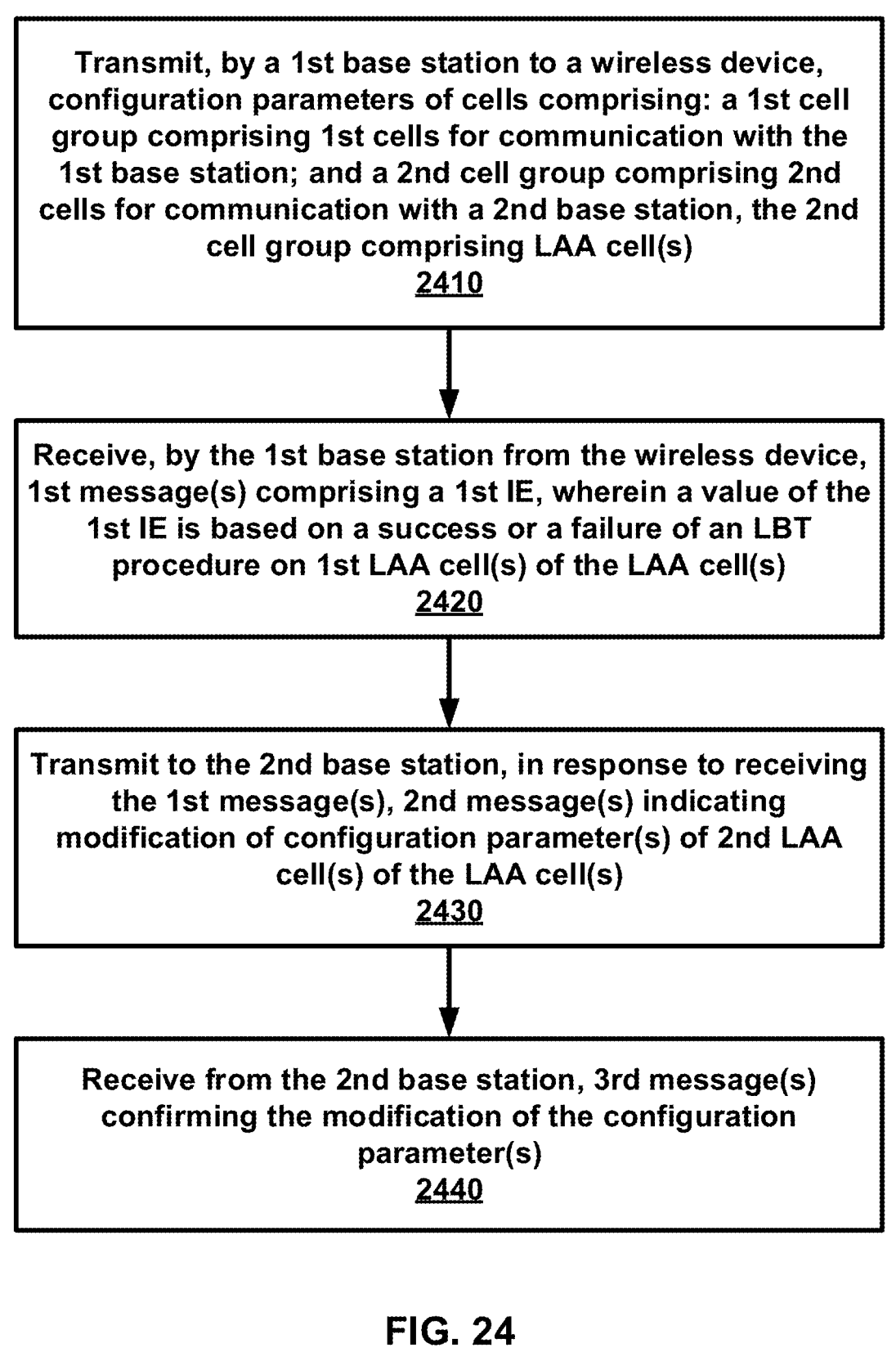

Transmit, by a 1st base station to a wireless device, configuration parameters of cells comprising: a 1st cell group comprising 1st cells for communication with the 1st base station; and a 2nd cell group comprising 2nd cells for communication with a 2nd base station, the 2nd cell group comprising LAA cell(s)
2410

Receive, by the 1st base station from the wireless device, 1st message(s) comprising a 1st IE, wherein a value of the 1st IE is based on a success or a failure of an LBT procedure on 1st LAA cell(s) of the LAA cell(s)
2420

Transmit to the 2nd base station, in response to receiving the 1st message(s), 2nd message(s) indicating modification of configuration parameter(s) of 2nd LAA cell(s) of the LAA cell(s)
2430

Receive from the 2nd base station, 3rd message(s) confirming the modification of the configuration parameter(s)
2440

FIG. 24

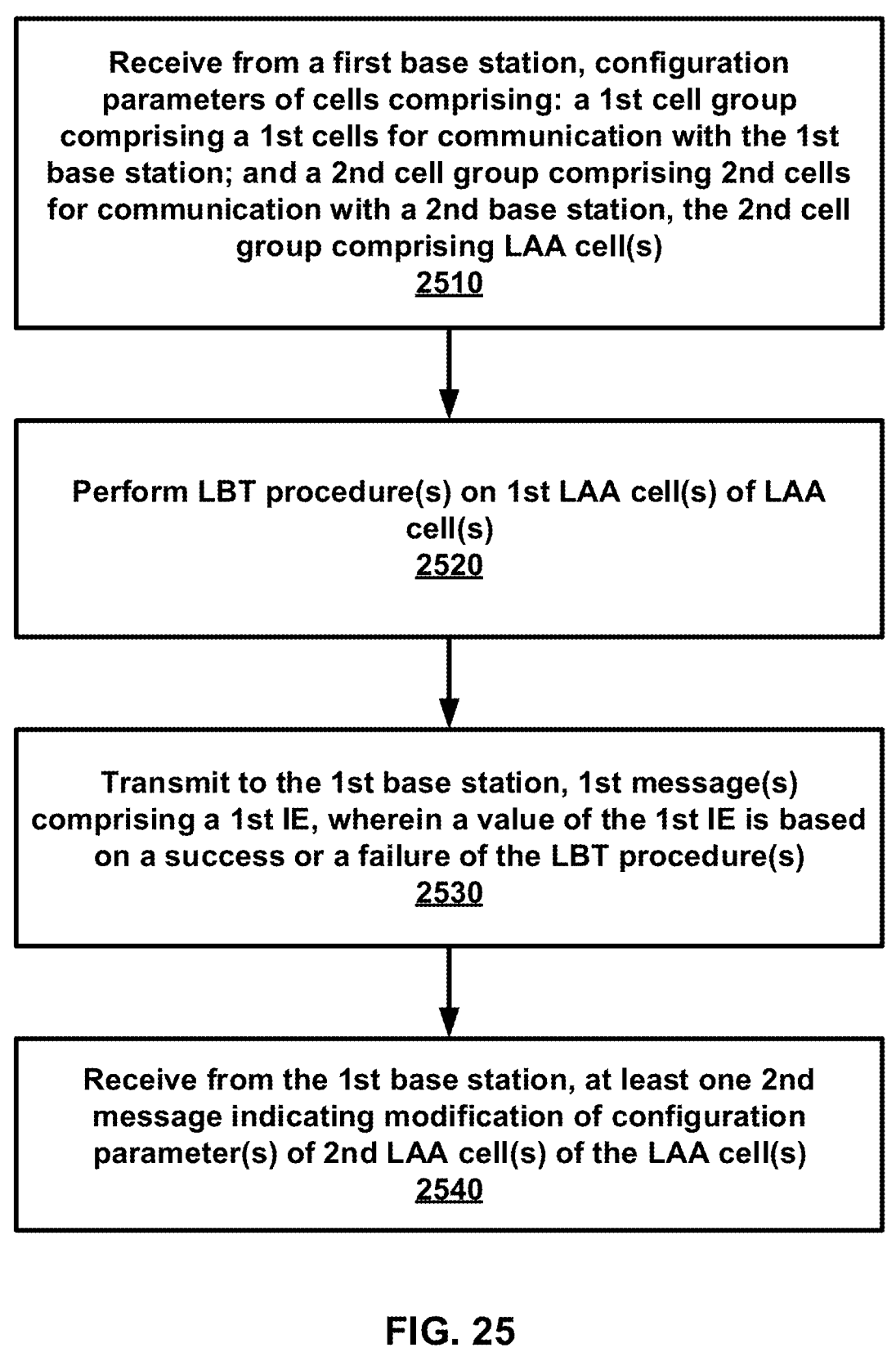

Receive from a first base station, configuration parameters of cells comprising: a 1st cell group comprising a 1st cells for communication with the 1st base station; and a 2nd cell group comprising 2nd cells for communication with a 2nd base station, the 2nd cell group comprising LAA cell(s)
2510

Perform LBT procedure(s) on 1st LAA cell(s) of LAA cell(s)
2520

Transmit to the 1st base station, 1st message(s) comprising a 1st IE, wherein a value of the 1st IE is based on a success or a failure of the LBT procedure(s)
2530

Receive from the 1st base station, at least one 2nd message indicating modification of configuration parameter(s) of 2nd LAA cell(s) of the LAA cell(s)
2540

FIG. 25

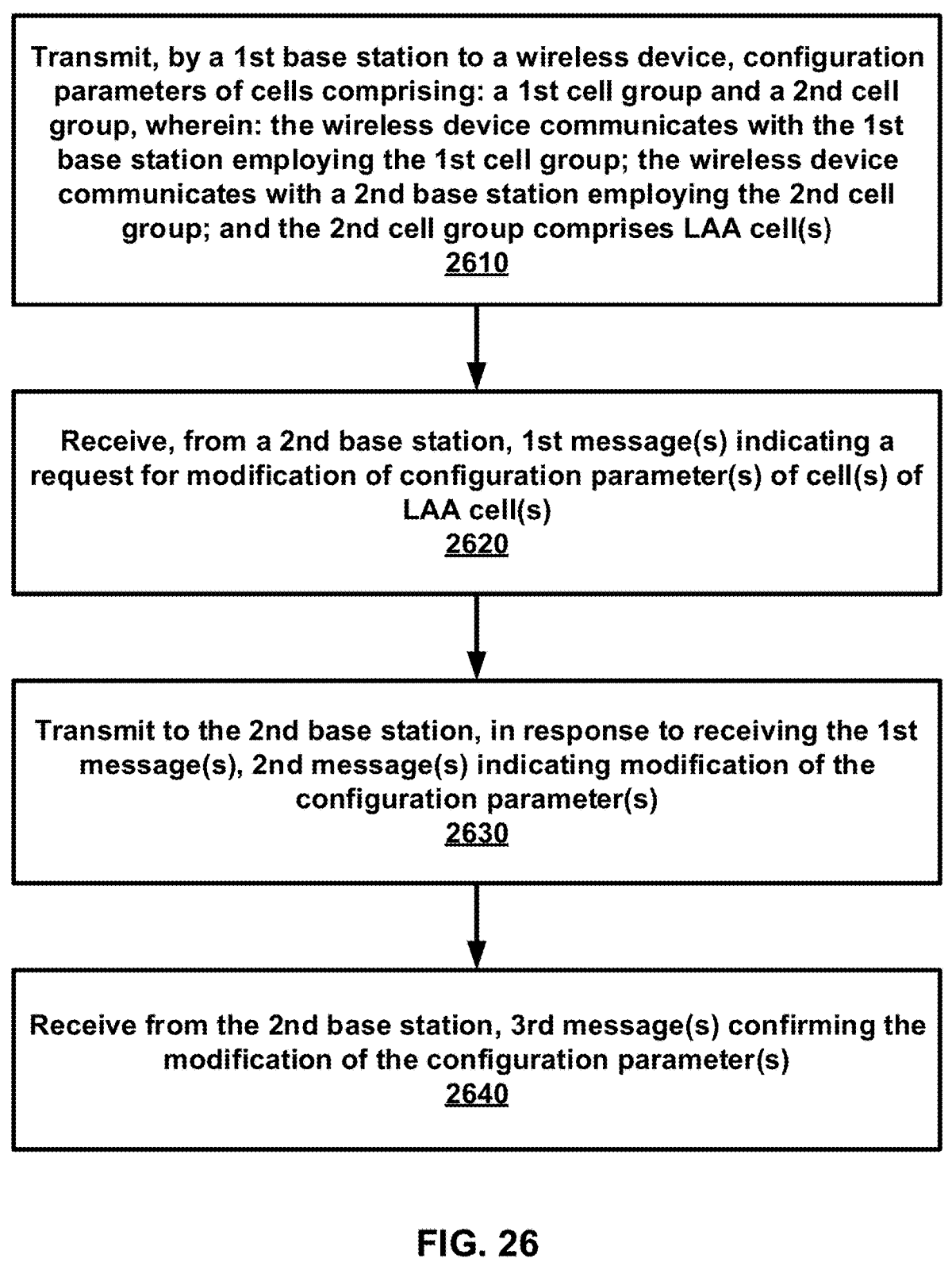

Transmit, by a 1st base station to a wireless device, configuration parameters of cells comprising: a 1st cell group and a 2nd cell group, wherein: the wireless device communicates with the 1st base station employing the 1st cell group; the wireless device communicates with a 2nd base station employing the 2nd cell group; and the 2nd cell group comprises LAA cell(s)
2610

Receive, from a 2nd base station, 1st message(s) indicating a request for modification of configuration parameter(s) of cell(s) of LAA cell(s)
2620

Transmit to the 2nd base station, in response to receiving the 1st message(s), 2nd message(s) indicating modification of the configuration parameter(s)
2630

Receive from the 2nd base station, 3rd message(s) confirming the modification of the configuration parameter(s)
2640

FIG. 26

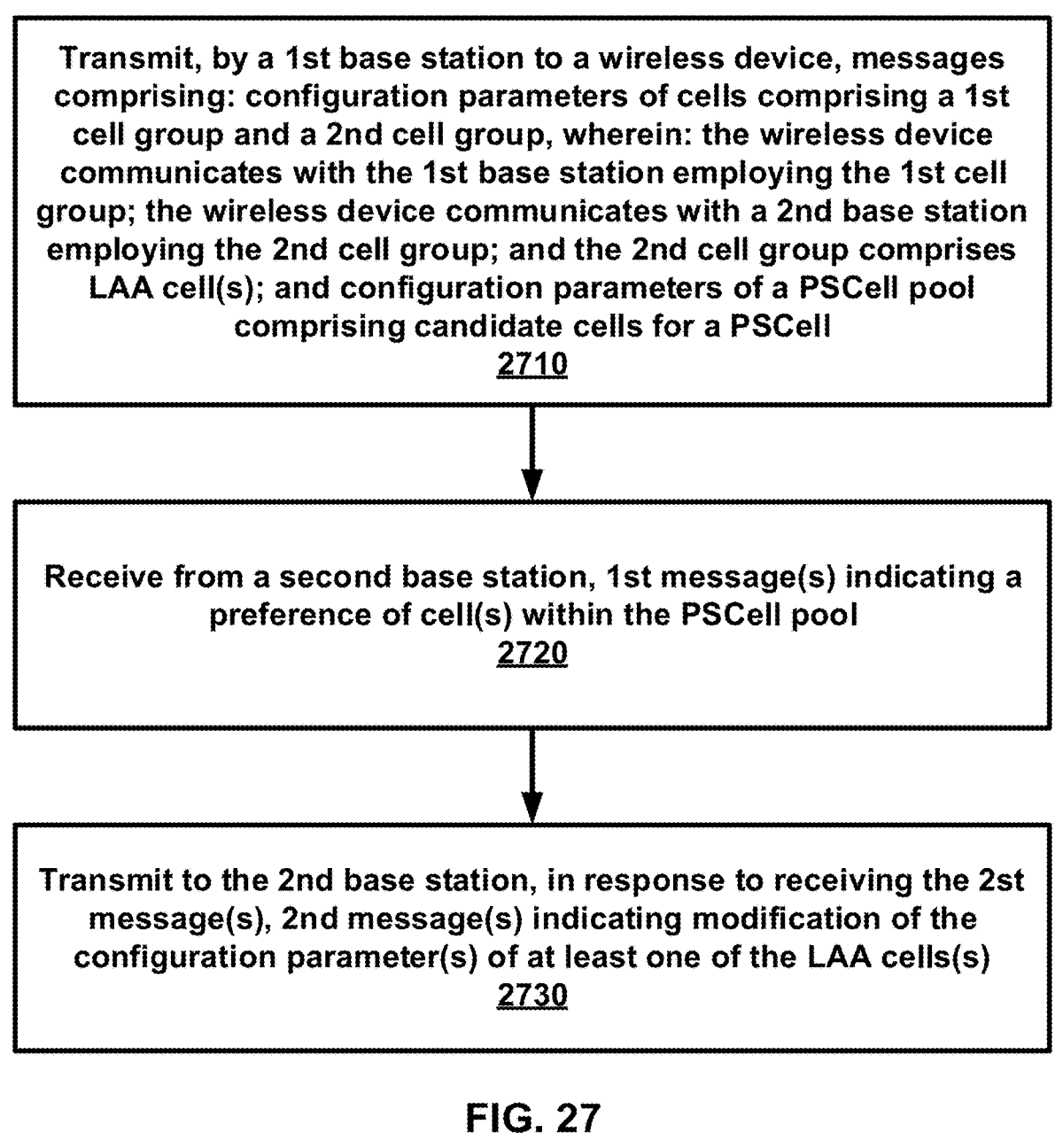

Transmit, by a 1st base station to a wireless device, messages comprising: configuration parameters of cells comprising a 1st cell group and a 2nd cell group, wherein: the wireless device communicates with the 1st base station employing the 1st cell group; the wireless device communicates with a 2nd base station employing the 2nd cell group; and the 2nd cell group comprises LAA cell(s); and configuration parameters of a PSCell pool comprising candidate cells for a PSCell
2710

Receive from a second base station, 1st message(s) indicating a preference of cell(s) within the PSCell pool
2720

Transmit to the 2nd base station, in response to receiving the 2st message(s), 2nd message(s) indicating modification of the configuration parameter(s) of at least one of the LAA cells(s)
2730

FIG. 27

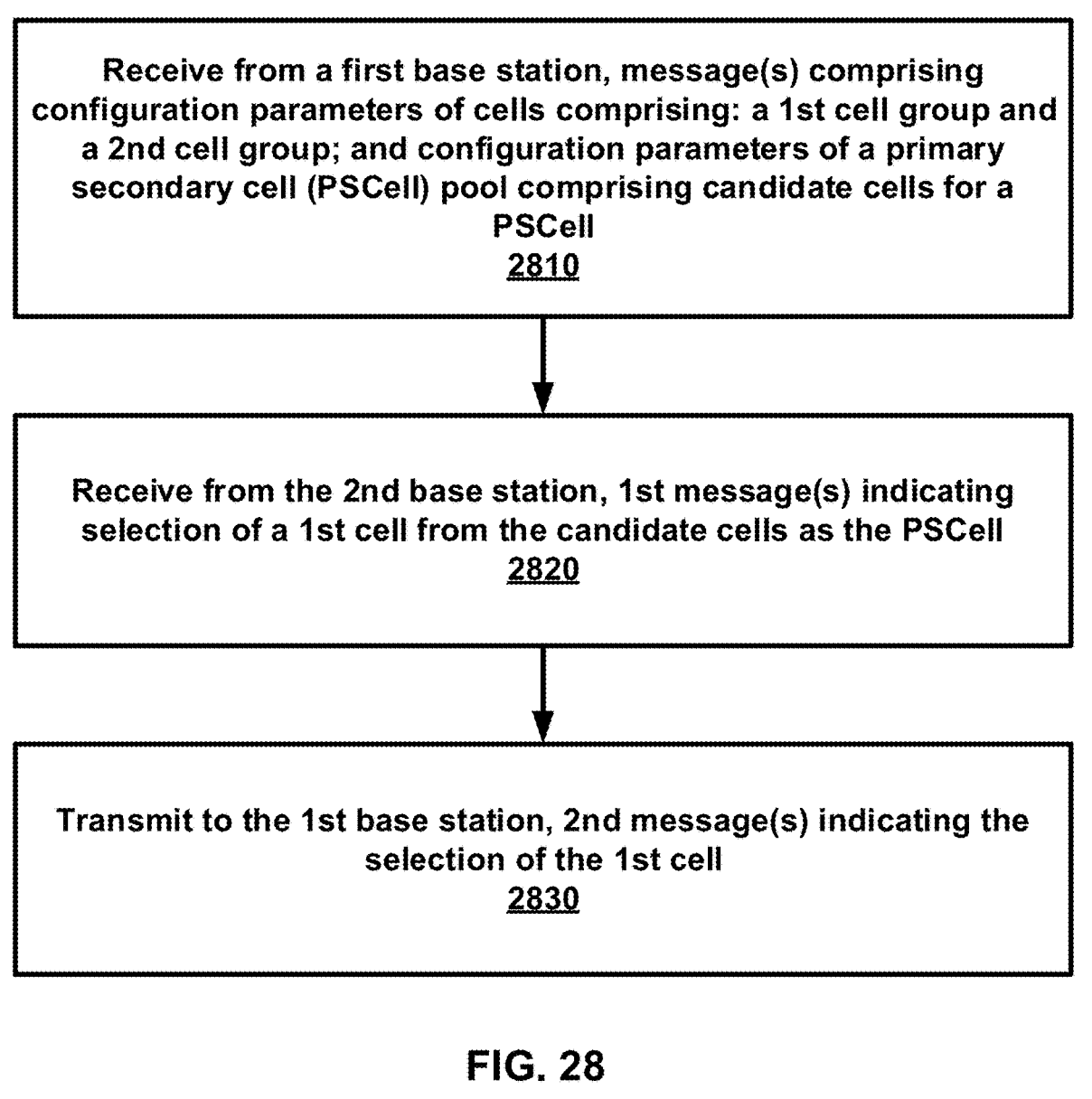

Receive from a first base station, message(s) comprising configuration parameters of cells comprising: a 1st cell group and a 2nd cell group; and configuration parameters of a primary secondary cell (PSCell) pool comprising candidate cells for a PSCell
2810

Receive from the 2nd base station, 1st message(s) indicating selection of a 1st cell from the candidate cells as the PSCell
2820

Transmit to the 1st base station, 2nd message(s) indicating the selection of the 1st cell
2830

FIG. 28

LISTEN-BEFORE-TALK PROCEDURES AND MODIFICATION OF CELL CONFIGURATION PARAMETERS

CROSS-REFERENCE TO RELATED APPLICATIONS

This application is a continuation of U.S. application Ser. No. 17/102,079, filed Nov. 23, 2020, which is a continuation of U.S. application Ser. No. 15/801,686, filed Nov. 2, 2017 and now U.S. Pat. No. 10,848,977, which claims the benefit of U.S. Provisional Application No. 62/416,564, filed Nov. 2, 2016. This application is also a continuation of U.S. application Ser. No. 17/713,799, filed Apr. 5, 2022 and now U.S. Pat. No. 11,968,711, which is a continuation of U.S. application Ser. No. 16/913,442, filed Jun. 26, 2020 and now U.S. Pat. No. 11,330,626, which is a continuation of U.S. application Ser. No. 15/797,575, filed Oct. 30, 2017, which claims the benefit of U.S. Provisional Application No. 62/414,697, filed Oct. 29, 2016. Each of the above-referenced applications are hereby incorporated by reference in their entirety.

BRIEF DESCRIPTION OF THE SEVERAL VIEWS OF THE DRAWINGS

Examples of several of the various embodiments of the present disclosure are described herein with reference to the drawings.

FIG. 24 is an example flow diagram as per an aspect of an embodiment of the present disclosure.

FIG. 25 is an example flow diagram as per an aspect of an embodiment of the present disclosure.

FIG. 26 is an example flow diagram as per an aspect of an embodiment of the present disclosure.

FIG. 27 is an example flow diagram as per an aspect of an embodiment of the present disclosure.

FIG. 28 is an example flow diagram as per an aspect of an embodiment of the present disclosure.

DETAILED DESCRIPTION OF EMBODIMENTS

Figure 1:
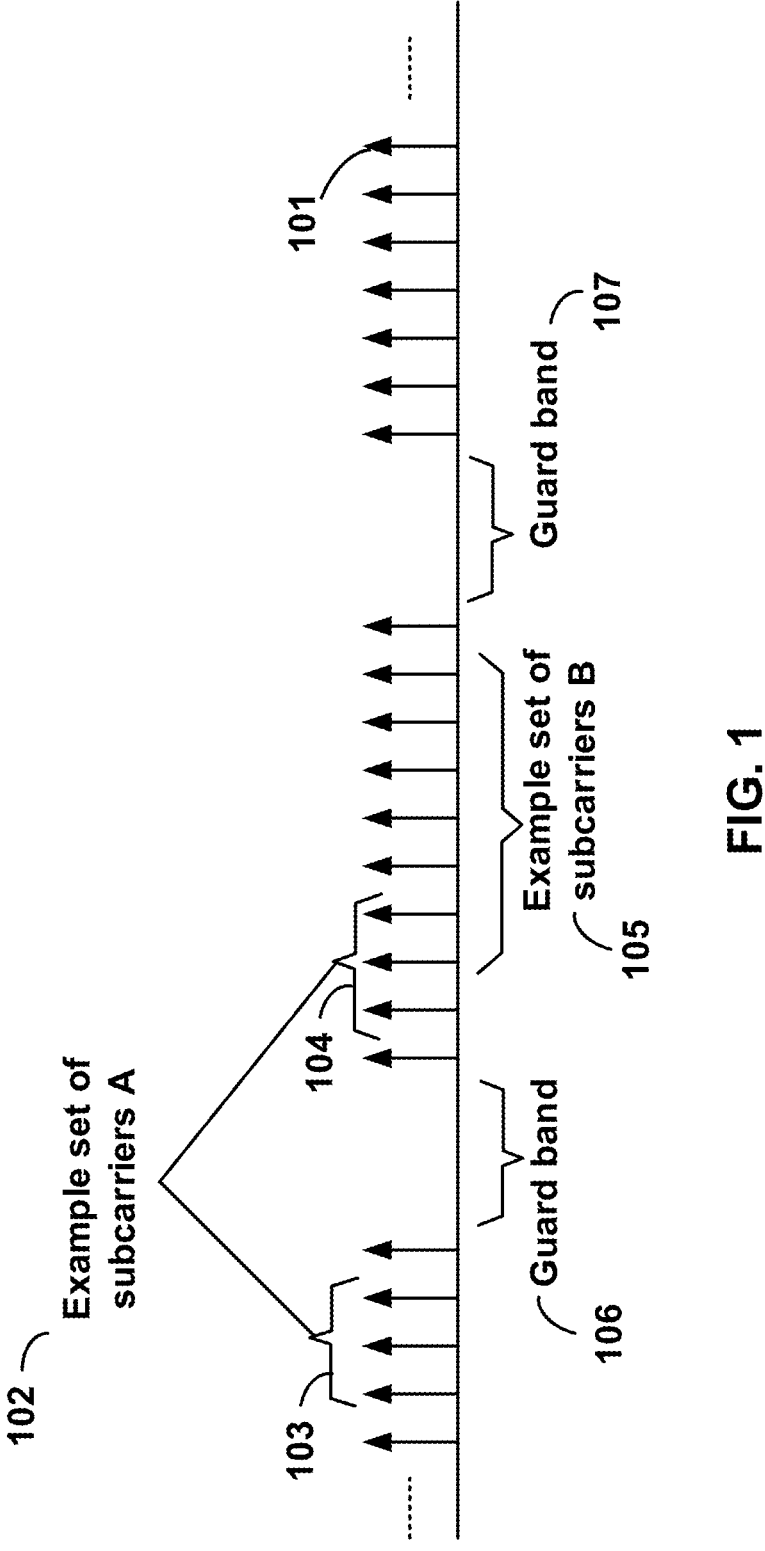
FIG. 1 is a diagram depicting example sets of OFDM subcarriers as per an aspect of an embodiment of the present disclosure.

Example embodiments of the present disclosure enable operation of carrier aggregation. Embodiments of the technology disclosed herein may be employed in the technical field of multicarrier communication systems.

The following Acronyms are used throughout the present disclosure:

ASIC application-specific integrated circuit
BPSK binary phase shift keying
CA carrier aggregation
CSI channel state information
CDMA code division multiple access
CSS common search space
CPLD complex programmable logic devices
CC component carrier
DL downlink
DCI downlink control information
DC dual connectivity
EPC evolved packet core
E-UTRAN evolved-universal terrestrial radio access network
FPGA field programmable gate arrays
FDD frequency division multiplexing
HDL hardware description languages
HARQ hybrid automatic repeat request
IE information element
LAA licensed assisted access
LTE long term evolution MCG master cell group
MeNB master evolved node B
MIB master information block
MAC media access control
MAC media access control
MME mobility management entity
NAS non-access stratum
OFDM orthogonal frequency division multiplexing
PDCP packet data convergence protocol
PDU packet data unit
PHY physical
PDCCH physical downlink control channel
PHICH physical HARQ indicator channel
PUCCH physical uplink control channel
PUSCH physical uplink shared channel
PCell primary cell
PCell primary cell
PCC primary component carrier
PSCell primary secondary cell
pTAG primary timing advance group
QAM quadrature amplitude modulation
QPSK quadrature phase shift keying
RBG Resource Block Groups
RLC radio link control
RRC radio resource control
RA random access
RB resource blocks
SCC secondary component carrier
SCell secondary cell
Scell secondary cells
SCG secondary cell group
SeNB secondary evolved node B
STAGs secondary timing advance group
SDU service data unit
S-GW serving gateway
SRB signaling radio bearer
SC-OFDM single carrier-OFDM
SFN system frame number
SIB system information block
TAI tracking area identifier
TAT time alignment timer
TDD time division duplexing
TDMA time division multiple access
TA timing advance
TAG timing advance group
TB transport block
UL uplink
UE user equipment
VHDL VHSIC hardware description language Example embodiments of the disclosure may be implemented using various physical layer modulation and transmission mechanisms. Example transmission mechanisms may include, but are not limited to: CDMA, OFDM, TDMA, Wavelet technologies, and/or the like. Hybrid transmission mechanisms such as TDMA/CDMA, and OFDM/CDMA may also be employed. Various modulation schemes may be applied for signal transmission in the physical layer. Examples of modulation schemes include, but are not limited to: phase, amplitude, code, a combination of these, and/or the like. An example radio transmission method may implement QAM using BPSK, QPSK, 16-QAM, 64-QAM, 256-QAM, and/or the like. Physical radio transmission may be enhanced by dynamically or semi-dynamically changing the modulation and coding scheme depending on transmission requirements and radio conditions.

FIG. 1 is a diagram depicting example sets of OFDM subcarriers as per an aspect of an embodiment of the present disclosure. As illustrated in this example, arrow(s) in the diagram may depict a subcarrier in a multicarrier OFDM system. The OFDM system may use technology such as OFDM technology, DFTS-OFDM, SC-OFDM technology, or the like. For example, arrow 101 shows a subcarrier transmitting information symbols. FIG. 1 is for illustration purposes, and a typical multicarrier OFDM system may include more subcarriers in a carrier. For example, the number of subcarriers in a carrier may be in the range of 10 to 10,000 subcarriers. FIG. 1 shows two guard bands 106 and 107 in a transmission band. As illustrated in FIG. 1, guard band 106 is between subcarriers 103 and subcarriers 104. The example set of subcarriers A 102 includes subcarriers 103 and subcarriers 104. FIG. 1 also illustrates an example set of subcarriers B 105. As illustrated, there is no guard band between any two subcarriers in the example set of subcarriers B 105. Carriers in a multicarrier OFDM communication system may be contiguous carriers, non-contiguous carriers, or a combination of both contiguous and non-contiguous carriers.

Figure 2:
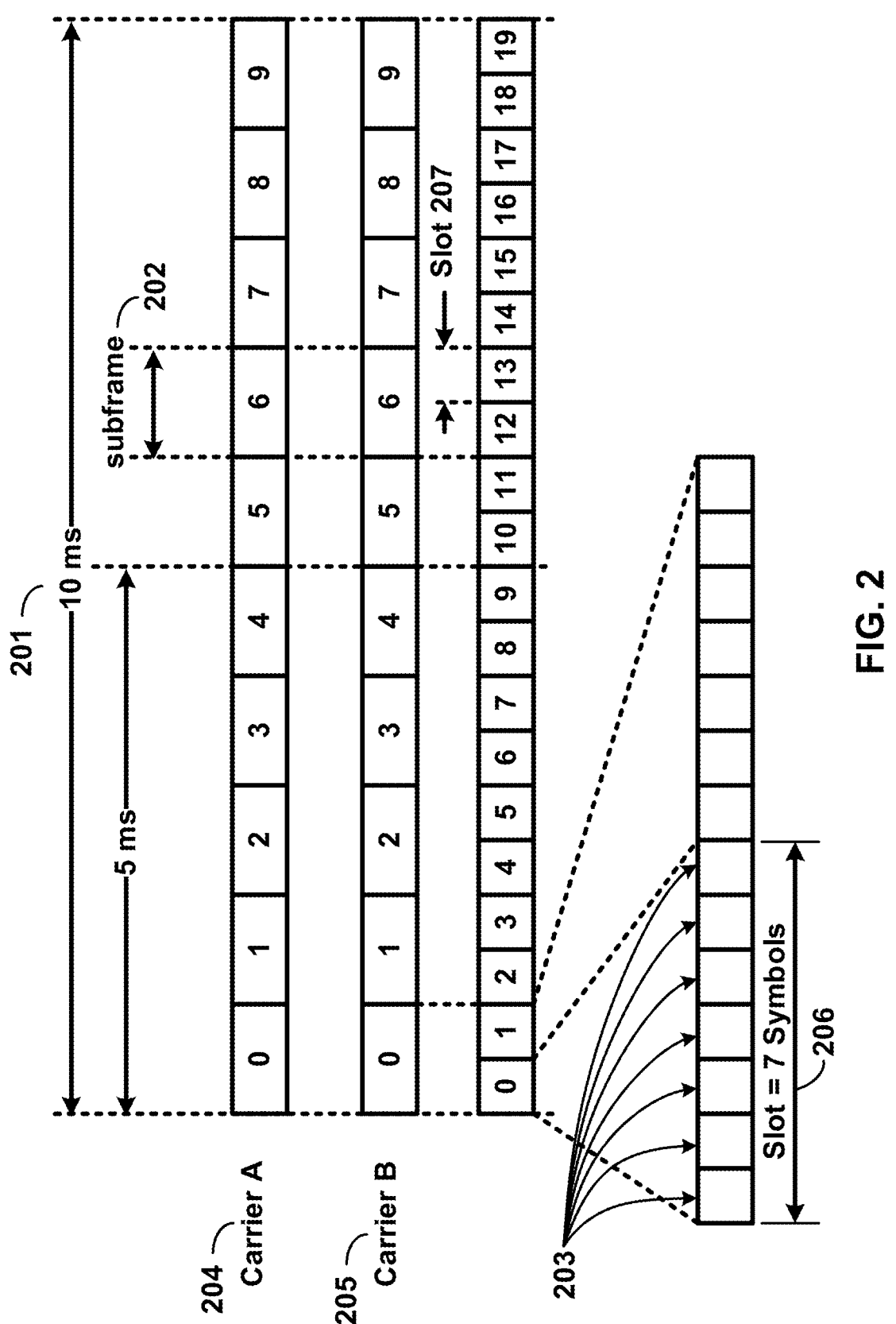
FIG. 2 is a diagram depicting an example transmission time and reception time for two carriers in a carrier group as per an aspect of an embodiment of the present disclosure.

FIG. 2 is a diagram depicting an example transmission time and reception time for two carriers as per an aspect of an embodiment of the present disclosure. A multicarrier OFDM communication system may include one or more carriers, for example, ranging from 1 to 10 carriers. Carrier A 204 and carrier B 205 may have the same or different timing structures. Although FIG. 2 shows two synchronized carriers, carrier A 204 and carrier B 205 may or may not be synchronized with each other. Different radio frame structures may be supported for FDD and TDD duplex mechanisms. FIG. 2 shows an example FDD frame timing. Downlink and uplink transmissions may be organized into radio frames 201. In this example, the radio frame duration is 10 msec. Other frame durations, for example, in the range of 1 to 100 msec may also be supported. In this example, each 10 ms radio frame 201 may be divided into ten equally sized subframes 202. Other subframe durations such as 0.5 msec, 1 msec, 2 msec, and 5 msec may also be supported. Subframe(s) may consist of two or more slots (for example, slots 206 and 207). For the example of FDD, 10 subframes may be available for downlink transmission and 10 subframes may be available for uplink transmissions in each 10 ms interval. Uplink and downlink transmissions may be separated in the frequency domain. Slot(s) may include a plurality of OFDM symbols 203. The number of OFDM symbols 203 in a slot 206 may depend on the cyclic prefix length and subcarrier spacing.

Figure 3:
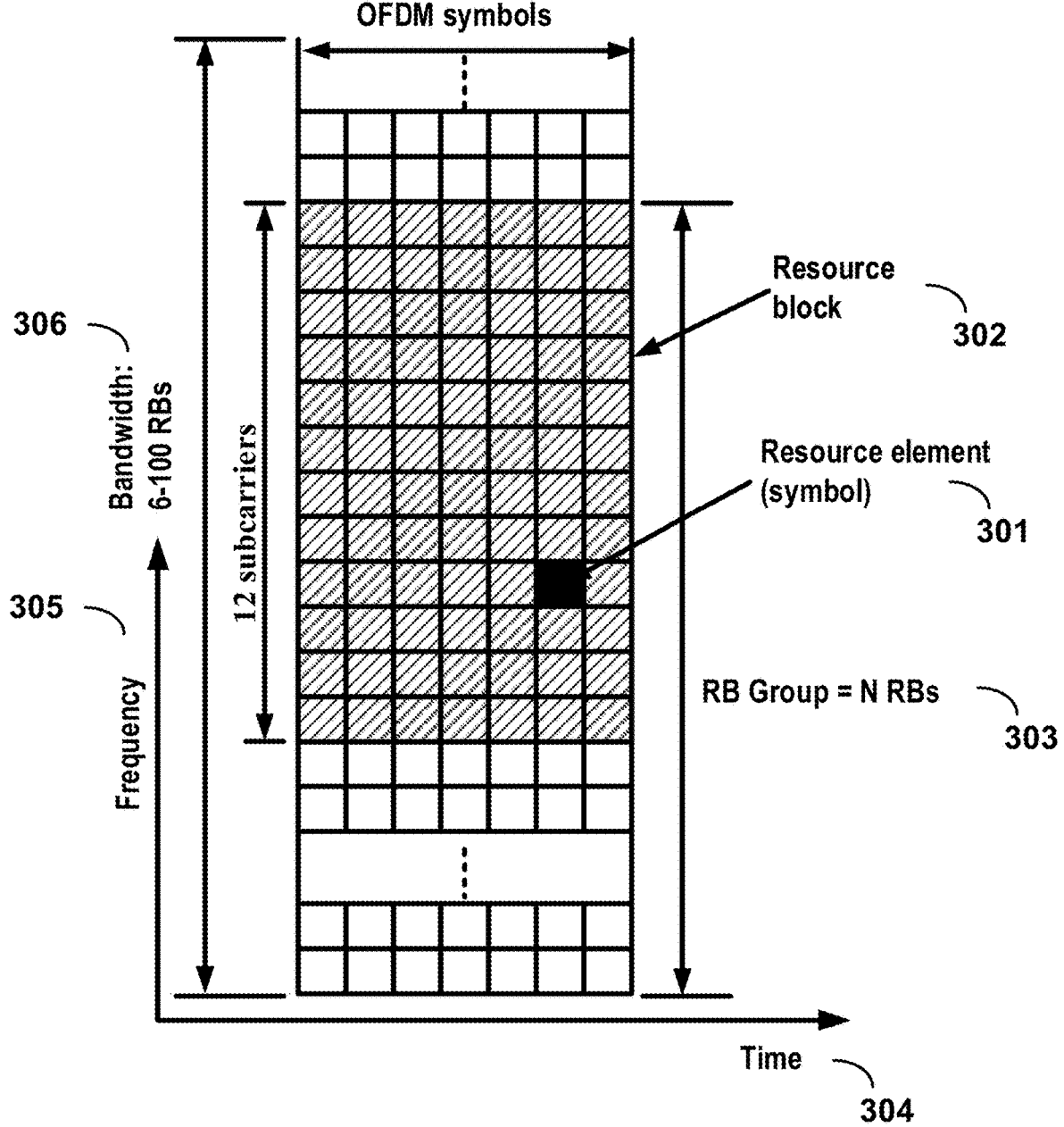
FIG. 3 is an example diagram depicting OFDM radio resources as per an aspect of an embodiment of the present disclosure.

FIG. 3 is a diagram depicting OFDM radio resources as per an aspect of an embodiment of the present disclosure. The resource grid structure in time 304 and frequency 305 is illustrated in FIG. 3. The quantity of downlink subcarriers or RBs (in this example 6 to 100 RBs) may depend, at least in part, on the downlink transmission bandwidth 306 configured in the cell. The smallest radio resource unit may be called a resource element (e.g. 301). Resource elements may be grouped into resource blocks (e.g. 302). Resource blocks may be grouped into larger radio resources called Resource Block Groups (RBG) (e.g. 303). The transmitted signal in slot 206 may be described by one or several resource grids of a plurality of subcarriers and a plurality of OFDM symbols. Resource blocks may be used to describe the mapping of certain physical channels to resource elements. Other pre-defined groupings of physical resource elements may be implemented in the system depending on the radio technology. For example, 24 subcarriers may be grouped as a radio block for a duration of 5 msec. In an illustrative example, a resource block may correspond to one slot in the time domain and 180 kHz in the frequency domain (for 15 KHz subcarrier bandwidth and 12 subcarriers).

FIG. 5A, FIG. 5B, FIG. 5C and FIG. 5D are example diagrams for uplink and downlink signal transmission as per an aspect of an embodiment of the present disclosure. FIG. 5A shows an example uplink physical channel. The baseband signal representing the physical uplink shared channel may perform the following processes. These functions are illustrated as examples and it is anticipated that other mechanisms may be implemented in various embodiments. The functions may comprise scrambling, modulation of scrambled bits to generate complex-valued symbols, mapping of the complex-valued modulation symbols onto one or several transmission layers, transform precoding to generate complex-valued symbols, precoding of the complex-valued symbols, mapping of precoded complex-valued symbols to resource elements, generation of complex-valued time-domain DFTS-OFDM/SC-FDMA signal for each antenna port, and/or the like.

Example modulation and up-conversion to the carrier frequency of the complex-valued DFTS-OFDM/SC-FDMA baseband signal for each antenna port and/or the complex-valued PRACH baseband signal is shown in FIG. 5B. Filtering may be employed prior to transmission.

An example structure for Downlink Transmissions is shown in FIG. 5C. The baseband signal representing a downlink physical channel may perform the following processes. These functions are illustrated as examples and it is anticipated that other mechanisms may be implemented in various embodiments. The functions include scrambling of coded bits in each of the codewords to be transmitted on a physical channel; modulation of scrambled bits to generate complex-valued modulation symbols; mapping of the complex-valued modulation symbols onto one or several transmission layers; precoding of the complex-valued modulation symbols on each layer for transmission on the antenna ports; mapping of complex-valued modulation symbols for each antenna port to resource elements; generation of complex-valued time-domain OFDM signal for each antenna port, and/or the like.

Example modulation and up-conversion to the carrier frequency of the complex-valued OFDM baseband signal for each antenna port is shown in FIG. 5D. Filtering may be employed prior to transmission.

Figure 4:
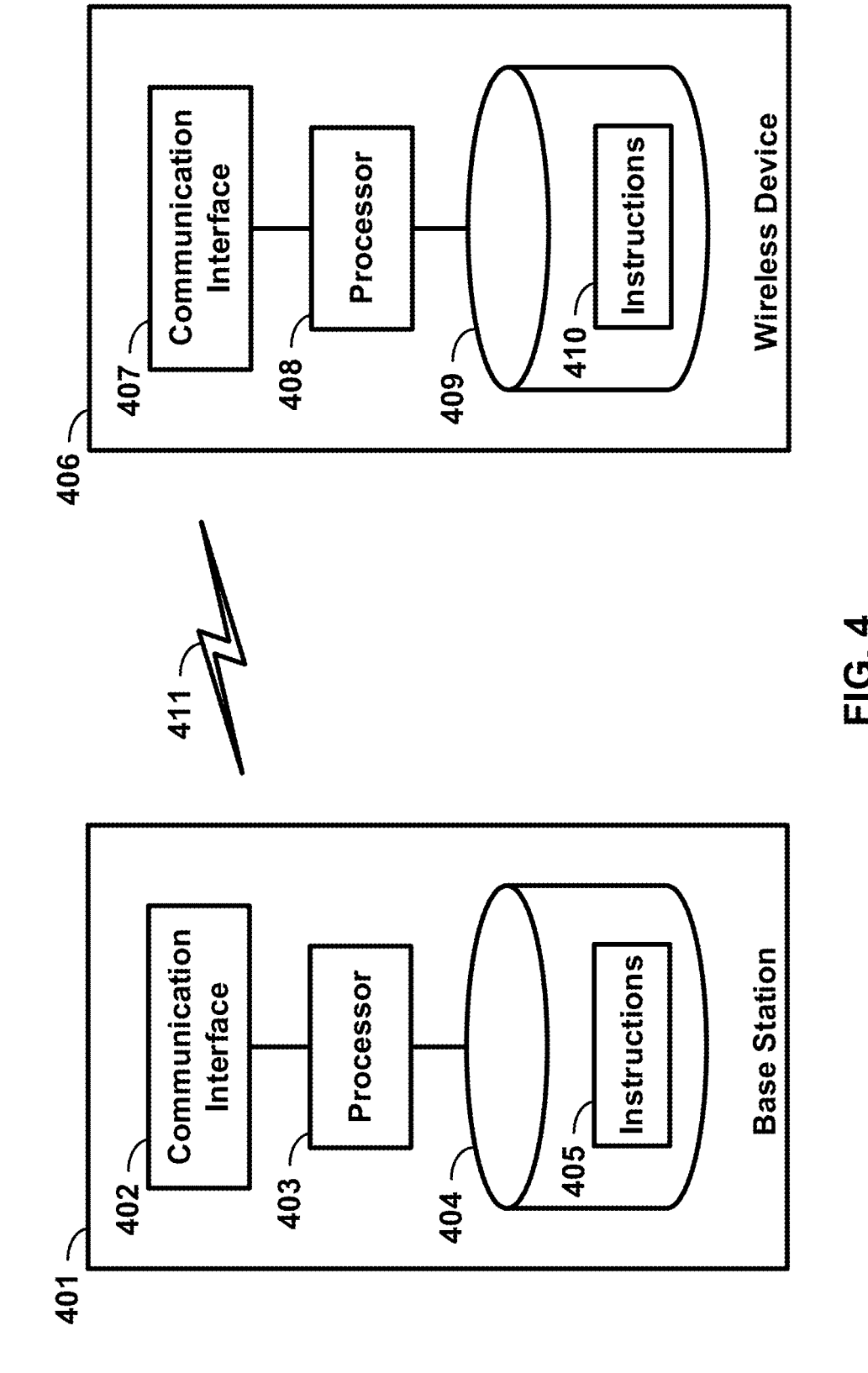
FIG. 4 is an example block diagram of a base station and a wireless device as per an aspect of an embodiment of the present disclosure.

FIG. 4 is an example block diagram of a base station 401 and a wireless device 406, as per an aspect of an embodiment of the present disclosure. A communication network 400 may include at least one base station 401 and at least one wireless device 406. The base station 401 may include at least one communication interface 402, at least one processor 403, and at least one set of program code instructions 405 stored in non-transitory memory 404 and executable by the at least one processor 403. The wireless device 406 may include at least one communication interface 407, at least one processor 408, and at least one set of program code instructions 410 stored in non-transitory memory 409 and executable by the at least one processor 408. Communication interface 402 in base station 401 may be configured to engage in communication with communication interface 407 in wireless device 406 via a communication path that includes at least one wireless link 411. Wireless link 411 may be a bi-directional link. Communication interface 407 in wireless device 406 may also be configured to engage in a communication with communication interface 402 in base station 401. Base station 401 and wireless device 406 may be configured to send and receive data over wireless link 411 using multiple frequency carriers. According to aspects of an embodiments, transceiver(s) may be employed. A transceiver is a device that includes both a transmitter and receiver. Transceivers may be employed in devices such as wireless devices, base stations, relay nodes, and/or the like. Example embodiments for radio technology implemented in communication interface 402, 407 and wireless link 411 are illustrated are FIG. 1, FIG. 2, FIG. 3, FIG. 5, and associated text.

An interface may be a hardware interface, a firmware interface, a software interface, and/or a combination thereof. The hardware interface may include connectors, wires, electronic devices such as drivers, amplifiers, and/or the like. A software interface may include code stored in a memory device to implement protocol(s), protocol layers, communication drivers, device drivers, combinations thereof, and/or the like. A firmware interface may include a combination of embedded hardware and code stored in and/or in communication with a memory device to implement connections, electronic device operations, protocol(s), protocol layers, communication drivers, device drivers, hardware operations, combinations thereof, and/or the like.

The term configured may relate to the capacity of a device whether the device is in an operational or non-operational state. Configured may also refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics in the device, whether the device is in an operational or non-operational state.

According to various aspects of an embodiment, an LTE network may include a multitude of base stations, providing a user plane PDCP/RLC/MAC/PHY and control plane (RRC) protocol terminations towards the wireless device. The base station(s) may be interconnected with other base station(s) (for example, interconnected employing an X2 interface). Base stations may also be connected employing, for example, an S1 interface to an EPC. For example, base stations may be interconnected to the MME employing the S1-MME interface and to the S-G) employing the S1-U interface. The S1 interface may support a many-to-many relation between MMEs/Serving Gateways and base stations. A base station may include many sectors for example: 1, 2, 3, 4, or 6 sectors. A base station may include many cells, for example, ranging from 1 to 50 cells or more. A cell may be categorized, for example, as a primary cell or secondary cell. At RRC connection establishment/re-establishment/handover, one serving cell may provide the NAS (non-access stratum) mobility information (e.g. TAI), and at RRC connection re-establishment/handover, one serving cell may provide the security input. This cell may be referred to as the Primary Cell (PCell). In the downlink, the carrier corresponding to the PCell may be the Downlink Primary Component Carrier (DL PCC), while in the uplink, the carrier corresponding to the PCell may be the Uplink Primary Component Carrier (UL PCC). Depending on wireless device capabilities, Secondary Cells (SCells) may be configured to form together with the PCell a set of serving cells. In the downlink, the carrier corresponding to an SCell may be a Downlink Secondary Component Carrier (DL SCC), while in the uplink, it may be an Uplink Secondary Component Carrier (UL SCC). An SCell may or may not have an uplink carrier.

A cell, comprising a downlink carrier and optionally an uplink carrier, may be assigned a physical cell ID and a cell index. A carrier (downlink or uplink) may belong to only one cell. The cell ID or Cell index may also identify the downlink carrier or uplink carrier of the cell (depending on the context it is used). In the specification, cell ID may be equally referred to a carrier ID, and cell index may be referred to carrier index. In implementation, the physical cell ID or cell index may be assigned to a cell. A cell ID may be determined using a synchronization signal transmitted on a downlink carrier. A cell index may be determined using RRC messages. For example, when the specification refers to a first physical cell ID for a first downlink carrier, the specification may mean the first physical cell ID is for a cell comprising the first downlink carrier. The same concept may apply, for example, to carrier activation. When the specification indicates that a first carrier is activated, the specification may also mean that the cell comprising the first carrier is activated.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices may support multiple technologies, and/or multiple releases of the same technology. Wireless devices may have some specific capability(ies) depending on its wireless device category and/or capability(ies). A base station may comprise multiple sectors. When this disclosure refers to a base station communicating with a plurality of wireless devices, this disclosure may refer to a subset of the total wireless devices in a coverage area. This disclosure may refer to, for example, a plurality of wireless devices of a given LTE release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of wireless devices in a coverage area that may not comply with the disclosed methods, for example, because those wireless devices perform based on older releases of LTE technology.

Figure 6:
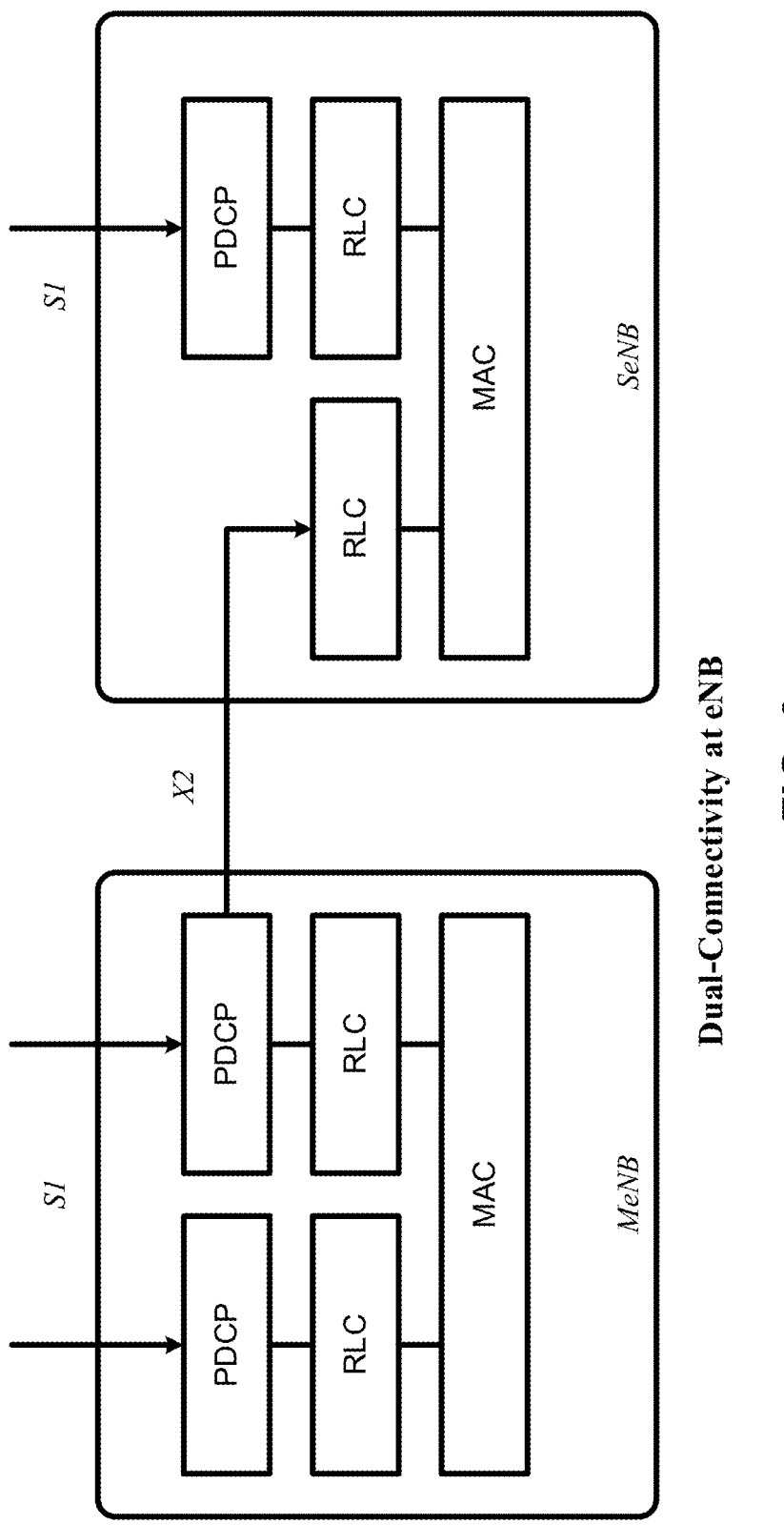
FIG. 6 is an example diagram for a protocol structure with CA and DC as per an aspect of an embodiment of the present disclosure.
Figure 7:
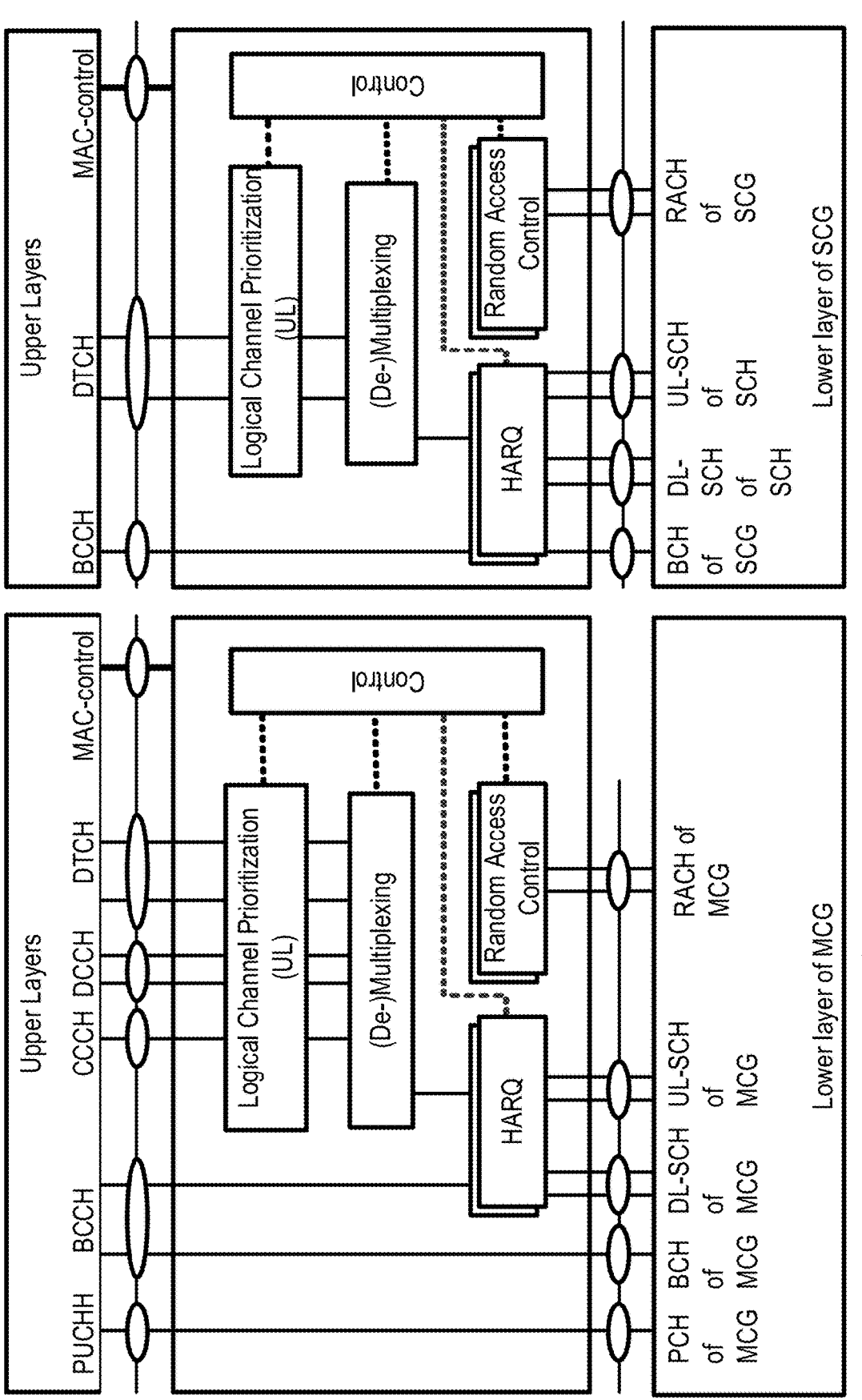
FIG. 7 is an example diagram for a protocol structure with CA and DC as per an aspect of an embodiment of the present disclosure.

FIG. 6 and FIG. 7 are example diagrams for protocol structure with CA and DC as per an aspect of an embodiment of the present disclosure. E-UTRAN may support Dual Connectivity (DC) operation whereby a multiple RX/TX UE in RRC_CONNECTED may be configured to utilize radio resources provided by two schedulers located in two eNBs connected via a non-ideal backhaul over the X2 interface. eNBs involved in DC for a certain UE may assume two different roles: an eNB may either act as an MeNB or as an SeNB. In DC a UE may be connected to one MeNB and one SeNB. Mechanisms implemented in DC may be extended to cover more than two eNBs. FIG. 7 illustrates one example structure for the UE side MAC entities when a Master Cell Group (MCG) and a Secondary Cell Group (SCG) are configured, and it may not restrict implementation. Media Broadcast Multicast Service (MBMS) reception is not shown in this figure for simplicity.

In DC, the radio protocol architecture that a particular bearer uses may depend on how the bearer is setup. Three alternatives may exist, an MCG bearer, an SCG bearer and a split bearer as shown in FIG. 6. RRC may be located in MeNB and SRBs may be configured as a MCG bearer type and may use the radio resources of the MeNB. DC may also be described as having at least one bearer configured to use radio resources provided by the SeNB. DC may or may not be configured/implemented in example embodiments of the disclosure.

In the case of DC, the UE may be configured with two MAC entities: one MAC entity for MeNB, and one MAC entity for SeNB. In DC, the configured set of serving cells for a UE may comprise two subsets: the Master Cell Group (MCG) containing the serving cells of the MeNB, and the Secondary Cell Group (SCG) containing the serving cells of the SeNB. For a SCG, one or more of the following may be applied. At least one cell in the SCG may have a configured UL CC and one of them, named PSCell (or PCell of SCG, or sometimes called PCell), may be configured with PUCCH resources. When the SCG is configured, there may be at least one SCG bearer or one Split bearer. Upon detection of a physical layer problem or a random access problem on a PSCell, or the maximum number of RLC retransmissions has been reached associated with the SCG, or upon detection of an access problem on a PSCell during a SCG addition or a SCG change: a RRC connection re-establishment procedure may not be triggered, UL transmissions towards cells of the SCG may be stopped, and a MeNB may be informed by the UE of a SCG failure type. For split bearer, the DL data transfer over the MeNB may be maintained. The RLC AM bearer may be configured for the split bearer. Like a PCell, a PSCell may not be de-activated. A PSCell may be changed with a SCG change (for example, with a security key change and a RACH procedure), and/or neither a direct bearer type change between a Split bearer and a SCG bearer nor simultaneous configuration of a SCG and a Split bearer may be supported.

With respect to the interaction between a MeNB and a SeNB, one or more of the following principles may be applied. The MeNB may maintain the RRM measurement configuration of the UE and may, (for example, based on received measurement reports or traffic conditions or bearer types), decide to ask a SeNB to provide additional resources (serving cells) for a UE. Upon receiving a request from the MeNB, a SeNB may create a container that may result in the configuration of additional serving cells for the UE (or decide that it has no resource available to do so). For UE capability coordination, the MeNB may provide (part of) the AS configuration and the UE capabilities to the SeNB. The MeNB and the SeNB may exchange information about a UE configuration by employing RRC containers (inter-node messages) carried in X2 messages. The SeNB may initiate a reconfiguration of its existing serving cells (for example, a PUCCH towards the SeNB). The SeNB may decide which cell is the PSCell within the SCG. The MeNB may not change the content of the RRC configuration provided by the SeNB. In the case of a SCG addition and a SCG SCell addition, the MeNB may provide the latest measurement results for the SCG cell(s). Both a MeNB and a SeNB may know the SFN and subframe offset of each other by OAM, (for example, for the purpose of DRX alignment and identification of a measurement gap). In an example, when adding a new SCG SCell, dedicated RRC signaling may be used for sending required system information of the cell as for CA, except for the SFN acquired from a MIB of the PSCell of a SCG.

In an example, serving cells may be grouped in a TA group (TAG). Serving cells in one TAG may use the same timing reference. For a given TAG, user equipment (UE) may use at least one downlink carrier as a timing reference. For a given TAG, a UE may synchronize uplink subframe and frame transmission timing of uplink carriers belonging to the same TAG. In an example, serving cells having an uplink to which the same TA applies may correspond to serving cells hosted by the same receiver. A UE supporting multiple TAs may support two or more TA groups. One TA group may contain the PCell and may be called a primary TAG (pTAG). In a multiple TAG configuration, at least one TA group may not contain the PCell and may be called a secondary TAG (sTAG). In an example, carriers within the same TA group may use the same TA value and/or the same timing reference. When DC is configured, cells belonging to a cell group (MCG or SCG) may be grouped into multiple TAGs including a pTAG and one or more sTAGs.

Figure 8:
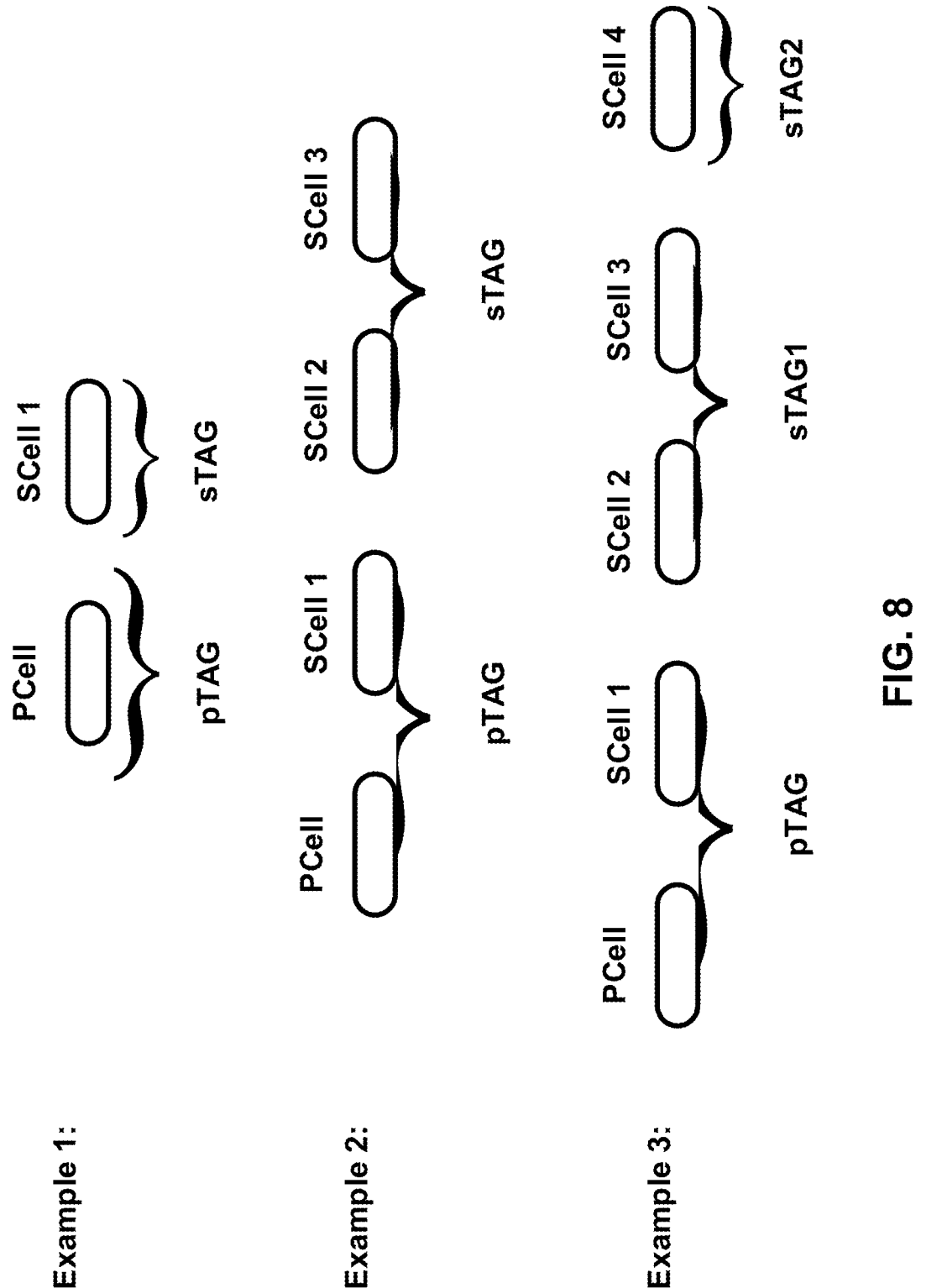
FIG. 8 shows example TAG configurations as per an aspect of an embodiment of the present disclosure.

FIG. 8 shows example TAG configurations as per an aspect of an embodiment of the present disclosure. In Example 1, pTAG comprises a PCell, and an sTAG comprises SCell1. In Example 2, a pTAG comprises a PCell and SCell1, and an sTAG comprises SCell2 and SCell3. In Example 3, pTAG comprises PCell and SCell1, and an sTAG1 includes SCell2 and SCell3, and sTAG2 comprises SCell4. Up to four TAGs may be supported in a cell group (MCG or SCG) and other example TAG configurations may also be provided. In various examples in this disclosure, example mechanisms are described for a pTAG and an sTAG. Some of the example mechanisms may be applied to configurations with multiple sTAGs.

In an example, an eNB may initiate an RA procedure via a PDCCH order for an activated SCell. This PDCCH order may be sent on a scheduling cell of this SCell. When cross carrier scheduling is configured for a cell, the scheduling cell may be different than the cell that is employed for preamble transmission, and the PDCCH order may include an SCell index. At least a non-contention based RA procedure may be supported for SCell(s) assigned to sTAG(s).

Figure 9:
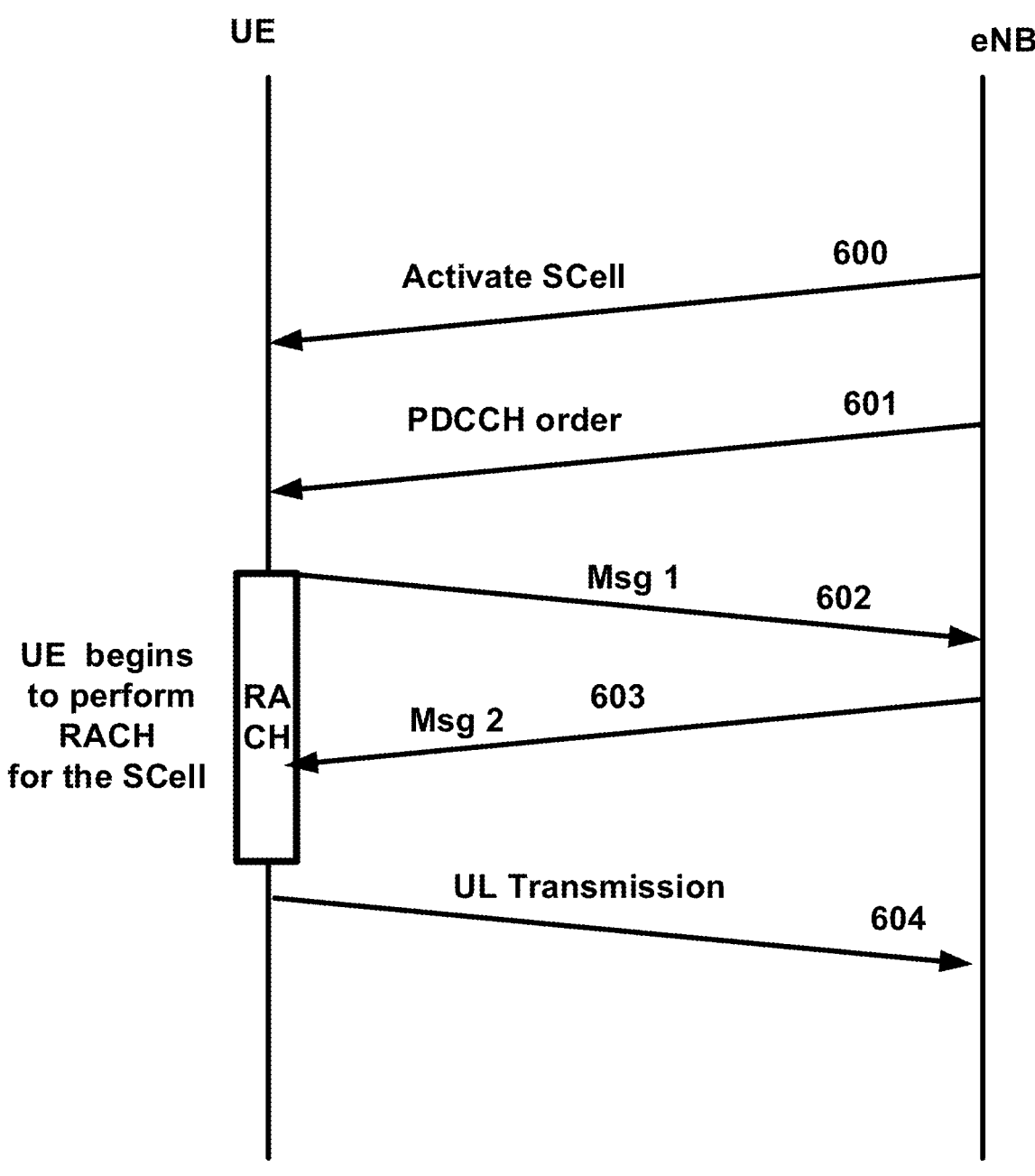
FIG. 9 is an example message flow in a random access process in a secondary TAG as per an aspect of an embodiment of the present disclosure.

FIG. 9 is an example message flow in a random access process in a secondary TAG as per an aspect of an embodiment of the present disclosure. An eNB transmits an activation command 600 to activate an SCell. A preamble 602 (Msg1) may be sent by a UE in response to a PDCCH order 601 on an SCell belonging to an sTAG. In an example embodiment, preamble transmission for SCells may be controlled by the network using PDCCH format 1A. Msg2 message 603 (RAR: random access response) in response to the preamble transmission on the SCell may be addressed to RA-RNTI in a PCell common search space (CSS). Uplink packets 604 may be transmitted on the SCell in which preamble was transmitted.

According to an embodiment, initial timing alignment may be achieved through a random access procedure. This may involve a UE transmitting a random access preamble and an eNB responding with an initial TA command NTA (amount of timing advance) within a random access response window. The start of the random access preamble may be aligned with the start of a corresponding uplink subframe at the UE assuming NTA=0. The eNB may estimate the uplink timing from the random access preamble transmitted by the UE. The TA command may be derived by the eNB based on the estimation of the difference between the desired UL timing and the actual UL timing. The UE may determine the initial uplink transmission timing relative to the corresponding downlink of the sTAG on which the preamble is transmitted.

The mapping of a serving cell to a TAG may be configured by a serving eNB with RRC signaling. The mechanism for TAG configuration and reconfiguration may be based on RRC signaling. According to various aspects of an embodiment, when an eNB performs an SCell addition configuration, the related TAG configuration may be configured for the SCell. In an example embodiment, an eNB may modify the TAG configuration of an SCell by removing (releasing) the SCell and adding (configuring) a new SCell (with the same physical cell ID and frequency) with an updated TAG ID. The new SCell with the updated TAG ID may initially be inactive subsequent to being assigned the updated TAG ID. The eNB may activate the updated new SCell and start scheduling packets on the activated SCell. In an example implementation, it may not be possible to change the TAG associated with an SCell, but rather, the SCell may need to be removed and a new SCell may need to be added with another TAG. For example, if there is a need to move an SCell from an sTAG to a pTAG, at least one RRC message, (for example, at least one RRC reconfiguration message), may be send to the UE to reconfigure TAG configurations by releasing the SCell and then configuring the SCell as a part of the pTAG. When an SCell is added/configured without a TAG index, the SCell may be explicitly assigned to the pTAG. The PCell may not change its TA group and may be a member of the pTAG.

The purpose of an RRC connection reconfiguration procedure may be to modify an RRC connection, (for example, to establish, modify and/or release RBs, to perform handover, to setup, modify, and/or release measurements, to add, modify, and/or release SCells). If the received RRC Connection Reconfiguration message includes the sCell-ToReleaseList, the UE may perform an SCell release. If the received RRC Connection Reconfiguration message includes the sCellToAddModList, the UE may perform SCell additions or modification.

In LTE Release-10 and Release-11 CA, a PUCCH may only be transmitted on the PCell (PSCell) to an eNB. In LTE-Release 12 and earlier, a UE may transmit PUCCH information on one cell (PCell or PSCell) to a given eNB.

As the number of CA capable UEs and also the number of aggregated carriers increase, the number of PUCCHs and also the PUCCH payload size may increase. Accommodating the PUCCH transmissions on the PCell may lead to a high PUCCH load on the PCell. A PUCCH on an SCell may be introduced to offload the PUCCH resource from the PCell. More than one PUCCH may be configured for example, a PUCCH on a PCell and another PUCCH on an SCell. In the example embodiments, one, two or more cells may be configured with PUCCH resources for transmitting CSI/ACK/NACK to a base station. Cells may be grouped into multiple PUCCH groups, and one or more cell within a group may be configured with a PUCCH. In an example configuration, one SCell may belong to one PUCCH group. SCells with a configured PUCCH transmitted to a base station may be called a PUCCH SCell, and a cell group with a common PUCCH resource transmitted to the same base station may be called a PUCCH group.

In an example embodiment, a MAC entity may have a configurable timer timeAlignmentTimer per TAG. The time-AlignmentTimer may be used to control how long the MAC entity considers the Serving Cells belonging to the associated TAG to be uplink time aligned. The MAC entity may, when a Timing Advance Command MAC control element is received, apply the Timing Advance Command for the indicated TAG; start or restart the timeAlignmentTimer associated with the indicated TAG. The MAC entity may, when a Timing Advance Command is received in a Random Access Response message for a serving cell belonging to a TAG and/or if the Random Access Preamble was not selected by the MAC entity, apply the Timing Advance Command for this TAG and start or restart the timeAlignmentTimer associated with this TAG. Otherwise, if the timeAlignmentTimer associated with this TAG is not running, the Timing Advance Command for this TAG may be applied and the timeAlignmentTimer associated with this TAG started. When the contention resolution is considered not successful, a timeAlignmentTimer associated with this TAG may be stopped. Otherwise, the MAC entity may ignore the received Timing Advance Command.

In example embodiments, a timer is running once it is started, until it is stopped or until it expires; otherwise it may not be running. A timer can be started if it is not running or restarted if it is running. For example, a timer may be started or restarted from its initial value.

Example embodiments of the disclosure may enable operation of multi-carrier communications. Other example embodiments may comprise a non-transitory tangible computer readable media comprising instructions executable by one or more processors to cause operation of multi-carrier communications. Yet other example embodiments may comprise an article of manufacture that comprises a non-transitory tangible computer readable machine-accessible medium having instructions encoded thereon for enabling programmable hardware to cause a device (e.g. wireless communicator, UE, base station, etc.) to enable operation of multi-carrier communications. The device may include processors, memory, interfaces, and/or the like. Other example embodiments may comprise communication networks comprising devices such as base stations, wireless devices (or user equipment: UE), servers, switches, antennas, and/or the like.

The amount of data traffic carried over cellular networks is expected to increase for many years to come. The number of users/devices is increasing and each user/device accesses an increasing number and variety of services, e.g. video delivery, large files, images. This may require not only high capacity in the network, but also provisioning very high data rates to meet customers' expectations on interactivity and responsiveness. More spectrum may therefore be needed for cellular operators to meet the increasing demand. Considering user expectations of high data rates along with seamless mobility, it may be beneficial that more spectrum be made available for deploying macro cells as well as small cells for cellular systems.

Striving to meet the market demands, there has been increasing interest from operators in deploying some complementary access utilizing unlicensed spectrum to meet the traffic growth. This is exemplified by the large number of operator-deployed Wi-Fi networks and the 3GPP standardization of LTE/WLAN interworking solutions. This interest indicates that unlicensed spectrum, when present, may be an effective complement to licensed spectrum for cellular operators to help addressing the traffic explosion in some scenarios, such as hotspot areas. LAA may offer an alternative for operators to make use of unlicensed spectrum while managing one radio network, thus offering new possibilities for optimizing the network's efficiency.

In an example embodiment, Listen-before-talk (clear channel assessment) may be implemented for transmission in an LAA cell. In a listen-before-talk (LBT) procedure, equipment may apply a clear channel assessment (CCA) check before using the channel. For example, the CCA may utilize at least energy detection to determine the presence or absence of other signals on a channel in order to determine if a channel is occupied or clear, respectively. For example, European and Japanese regulations mandate the usage of LBT in the unlicensed bands. Apart from regulatory requirements, carrier sensing via LBT may be one way for fair sharing of the unlicensed spectrum.

In an example embodiment, discontinuous transmission on an unlicensed carrier with limited maximum transmission duration may be enabled. Some of these functions may be supported by one or more signals to be transmitted from the beginning of a discontinuous LAA downlink transmission. Channel reservation may be enabled by the transmission of signals, by an LAA node, after gaining channel access via a successful LBT operation, so that other nodes that receive the transmitted signal with energy above a certain threshold sense the channel to be occupied. Functions that may need to be supported by one or more signals for LAA operation with discontinuous downlink transmission may include one or more of the following: detection of the LAA downlink transmission (including cell identification) by UEs, time & frequency synchronization of UEs, and/or the like.

In an example embodiment, a DL LAA design may employ subframe boundary alignment according to LTE-A carrier aggregation timing relationships across serving cells aggregated by CA. This may not imply that the eNB transmissions can start only at the subframe boundary. LAA may support transmitting PDSCH when not all OFDM symbols are available for transmission in a subframe according to LBT. Delivery of necessary control information for the PDSCH may also be supported.

An LBT procedure may be employed for fair and friendly coexistence of LAA with other operators and technologies operating in an unlicensed spectrum. LBT procedures on a node attempting to transmit on a carrier in an unlicensed spectrum may require the node to perform a clear channel assessment to determine if the channel is free for use. An LBT procedure may involve at least energy detection to determine if the channel is being used. For example, regulatory requirements in some regions, for example, in Europe, may specify an energy detection threshold such that if a node receives energy greater than this threshold, the node assumes that the channel is not free. While nodes may follow such regulatory requirements, a node may optionally use a lower threshold for energy detection than that specified by regulatory requirements. In an example, LAA may employ a mechanism to adaptively change the energy detection threshold. For example, LAA may employ a mechanism to adaptively lower the energy detection threshold from an upper bound. Adaptation mechanism(s) may not preclude static or semi-static setting of the threshold. In an example a Category 4 LBT mechanism or other type of LBT mechanisms may be implemented.

Various example LBT mechanisms may be implemented. In an example, for some signals, in some implementation scenarios, in some situations, and/or in some frequencies, no LBT procedure may performed by the transmitting entity. In an example, Category 2 (for example, LBT without random back-off) may be implemented. The duration of time that the channel is sensed to be idle before the transmitting entity transmits may be deterministic. In an example, Category 3 (for example, LBT with random back-off with a contention window of fixed size) may be implemented. The LBT procedure may have the following procedure as one of its components. The transmitting entity may draw a random number N within a contention window. The size of the contention window may be specified by the minimum and maximum value of N. The size of the contention window may be fixed. The random number N may be employed in the LBT procedure to determine the duration of time that the channel is sensed to be idle before the transmitting entity transmits on the channel. In an example, Category 4 (for example, LBT with random back-off with a contention window of variable size) may be implemented. The transmitting entity may draw a random number N within a contention window. The size of the contention window may be specified by a minimum and maximum value of N. The transmitting entity may vary the size of the contention window when drawing the random number N. The random number N may be employed in the LBT procedure to determine the duration of time that the channel is sensed to be idle before the transmitting entity transmits on the channel.

LAA may employ uplink LBT at the UE. The UL LBT scheme may be different from the DL LBT scheme (for example, by using different LBT mechanisms or parameters), since the LAA UL may be based on scheduled access which affects a UE's channel contention opportunities. Other considerations motivating a different UL LBT scheme include, but are not limited to, multiplexing of multiple UEs in a single subframe.

In an example, a DL transmission burst may be a continuous transmission from a DL transmitting node with no transmission immediately before or after from the same node on the same CC. A UL transmission burst from a UE perspective may be a continuous transmission from a UE with no transmission immediately before or after from the same UE on the same CC. In an example, a UL transmission burst may be defined from a UE perspective. In an example, a UL transmission burst may be defined from an eNB perspective. In an example, in case of an eNB operating DL+UL LAA over the same unlicensed carrier, DL transmission burst(s) and UL transmission burst(s) on LAA may be scheduled in a TDM manner over the same unlicensed carrier. For example, an instant in time may be part of a DL transmission burst or an UL transmission burst.

Figure 10:
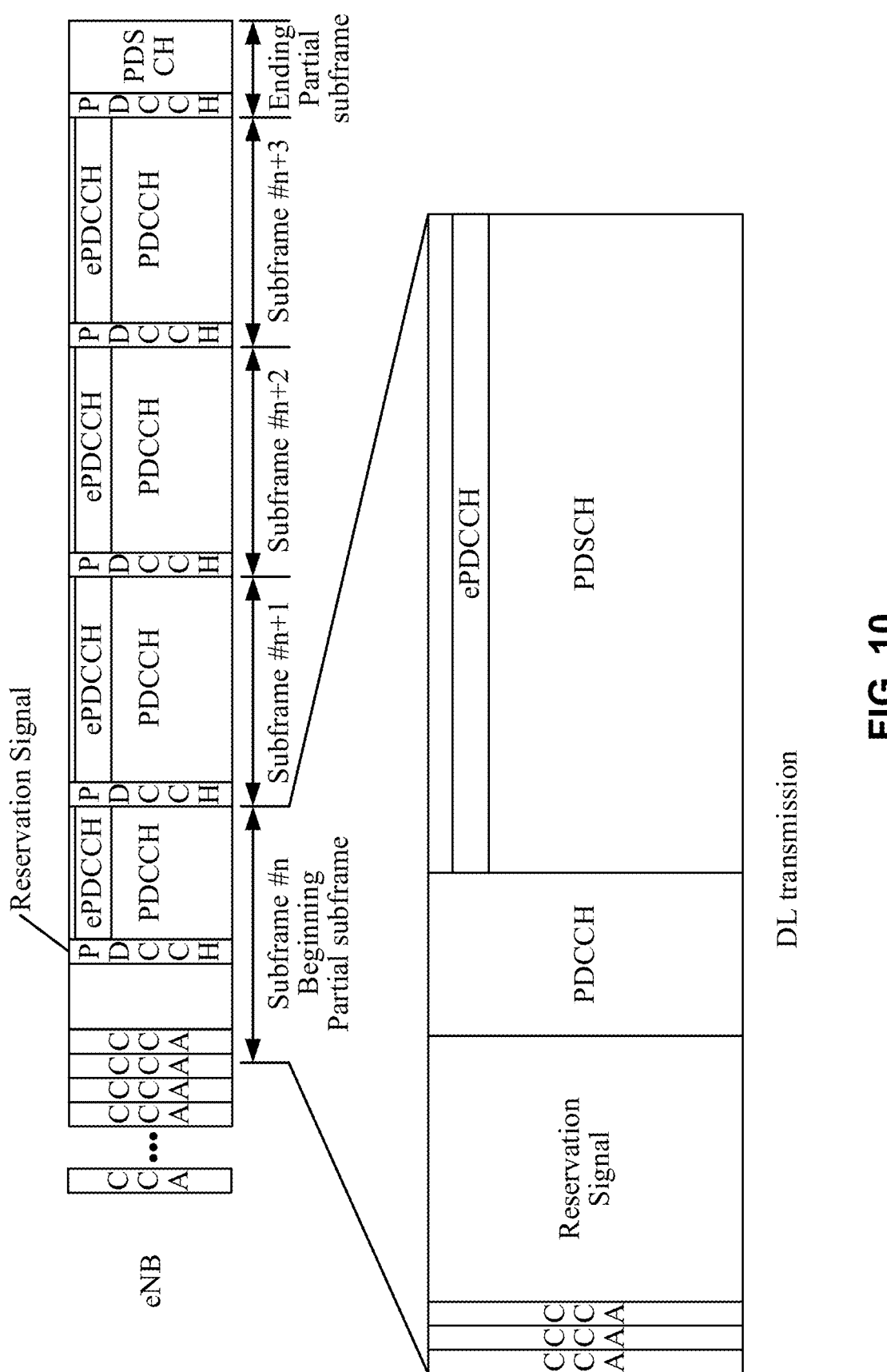
FIG. 10 is an example diagram depicting a downlink burst as per an aspect of an embodiment of the present disclosure.

In an example embodiment, in an unlicensed cell, a downlink burst may be started in a subframe. When an eNB accesses the channel, the CNB may transmit for a duration of one or more subframes. The duration may depend on a maximum configured burst duration in an eNB, the data available for transmission, and/or eNB scheduling algorithm. FIG. 10 shows an example downlink burst in an unlicensed (e.g. licensed assisted access) cell. The maximum configured burst duration in the example embodiment may be configured in the eNB. An eNB may transmit the maximum configured burst duration to a UE employing an RRC configuration message.

The wireless device may receive from a base station at least one message (for example, an RRC) comprising configuration parameters of a plurality of cells. The plurality of cells may comprise at least one cell of a first type (e.g. license cell) and at least one cell of a second type (e.g. unlicensed cell, an LAA cell). The configuration parameters of a cell may, for example, comprise configuration parameters for physical channels, (for example, a ePDCCH, PDSCH, PUSCH, PUCCH and/or the like). The wireless device may determine transmission powers for one or more uplink channels. The wireless device may transmit uplink signals via at least one uplink channel based on the determined transmission powers.

In an example embodiment, LTE transmission time may include frames, and a frame may include many subframes. The size of various time domain fields in the time domain may be expressed as a number of time units $T_s=1/(15000\times 2048)$ seconds. Downlink, uplink and sidelink transmissions may be organized into radio frames with $T_f=307200\times T_s=10$ ms duration.

In an example LTE implementation, at least three radio frame structures may be supported: Type 1, applicable to FDD, Type 2, applicable to TDD, Type 3, applicable to LAA secondary cell operation. LAA secondary cell operation applies to frame structure type 3.

Transmissions in multiple cells may be aggregated where one or more secondary cells may be used in addition to the primary cell. In case of multi-cell aggregation, different frame structures may be used in the different serving cells.

Frame structure type 1 may be applicable to both full duplex and half duplex FDD. A radio frame is $T_f=307200\cdot T_s=10$ ms long and may comprise 20 slots of length $T_{slot}=15360\cdot T_s=0.5$ ms, numbered from 0 to 19. A subframe may include two consecutive slots where subframe i comprises of slots 2i and 2i+1.

For FDD, 10 subframes are available for downlink transmission and 10 subframes are available for uplink transmissions in a 10 ms interval. Uplink and downlink transmissions are separated in the frequency domain. In half-duplex FDD operation, the UE may not transmit and receive at the same time while there may not be such restrictions in full-duplex FDD.

Frame structure type 2 may be applicable to TDD. A radio frame of length $T_f=307200\cdot T_s=10$ ms may comprise of two half-frames of length $153600\cdot T_s 5$ ms. A half-frame frame may comprise five subframes of length $30720\cdot T_s=1$ ms. A subframe i may comprise two slots, 2i and 2i+1, of length $T_{slot}=15360\cdot T_s=0.5$ ms The uplink-downlink configuration in a cell may vary between frames and controls in which subframes uplink or downlink transmissions may take place in the current frame. The uplink-downlink configuration in the current frame is obtained via control signaling.

An example subframe in a radio frame, "may be a downlink subframe reserved for downlink transmissions, may be an uplink subframe reserved for uplink transmissions or may be a special subframe with the three fields DwPTS, GP and UpPTS. The length of DwPTS and UpPTS are subject to the total length of DwPTS, GP and UpPTS being equal to $30720\cdot T_s=1$ ms Uplink-downlink configurations with both 5 ms and 10 ms downlink-to-uplink switch-point periodicity may be supported. In case of 5 ms downlink-to-uplink switch-point periodicity, the special subframe may exist in both half-frames. In case of 10 ms downlink-to-uplink switch-point periodicity, the special subframe may exist in the first half-frame.

Subframes 0 and 5 and DwPTS may be reserved for downlink transmission. UpPTS and the subframe immediately following the special subframe may be reserved for uplink transmission.

In an example, in case multiple cells are aggregated, the UE may assume that the guard period of the special subframe in the cells using frame structure Type 2 have an overlap of at least $1456\cdot T_s$.

In an example, in case multiple cells with different uplink-downlink configurations in the current radio frame are aggregated and the UE is not capable of simultaneous reception and transmission in the aggregated cells, the following constraints may apply. if the subframe in the primary cell is a downlink subframe, the UE may not transmit any signal or channel on a secondary cell in the same subframe. If the subframe in the primary cell is an uplink subframe, the UE may not be expected to receive any downlink transmissions on a secondary cell in the same subframe. If the subframe in the primary cell is a special subframe and the same subframe in a secondary cell is a downlink subframe, the UE may not be expected to receive PDSCH/EPDCCH/PMCH/PRS transmissions in the secondary cell in the same subframe, and the UE may not be expected to receive any other signals on the secondary cell in OFDM symbols that overlaps with the guard period or UpPTS in the primary cell.

Frame structure type 3 may be applicable to LAA secondary cell operation with normal cyclic prefix. A radio frame is $T_f$=307200·$T_s$=10 ms long and comprises of 20 slots of length $T_{slot}$=15360·$T_s$=0.5 ms, numbered from 0 to 19. A subframe may comprise as two consecutive slots where subframe i comprises slots 2i and 2i+1.

The 10 subframes within a radio frame are available for downlink transmissions. Downlink transmissions occupy one or more consecutive subframes, starting anywhere within a subframe and ending with the last subframe either fully occupied or following one of the DwPTS durations. Subframes may be available for uplink transmission when LAA uplink is supported.

Some example embodiments may be implemented in stand-alone unlicensed operation when a UE communications with an eNB via a plurality of unlicensed cells. Some example embodiments may be implemented in dual-connectivity configuration when a UE is connected to two eNBs via a plurality of licensed and/or unlicensed cells.

In an example, when configured with dual connectivity (DC), a UE may be simultaneously connected to two eNBs: e.g., a master eNB (MeNB) and a secondary eNB (SeNB). The MeNB and SeNB may be connected via an X2 interface.

In an example, E-UTRAN may support Dual Connectivity (DC) operation. A UE in RRC_CONNECTED equipped with multiple Rx/Tx may be configured to utilize radio resources provided by two distinct schedulers, located in two eNBs connected via a non-ideal backhaul over the X2 interface. The overall E-UTRAN architecture may be applicable for DC as well. eNBs involved in DC for a certain UE may assume two different roles: an eNB may either act as an MeNB or as an SeNB. In DC a UE may be connected to one MeNB and one SeNB.

Figure 11:
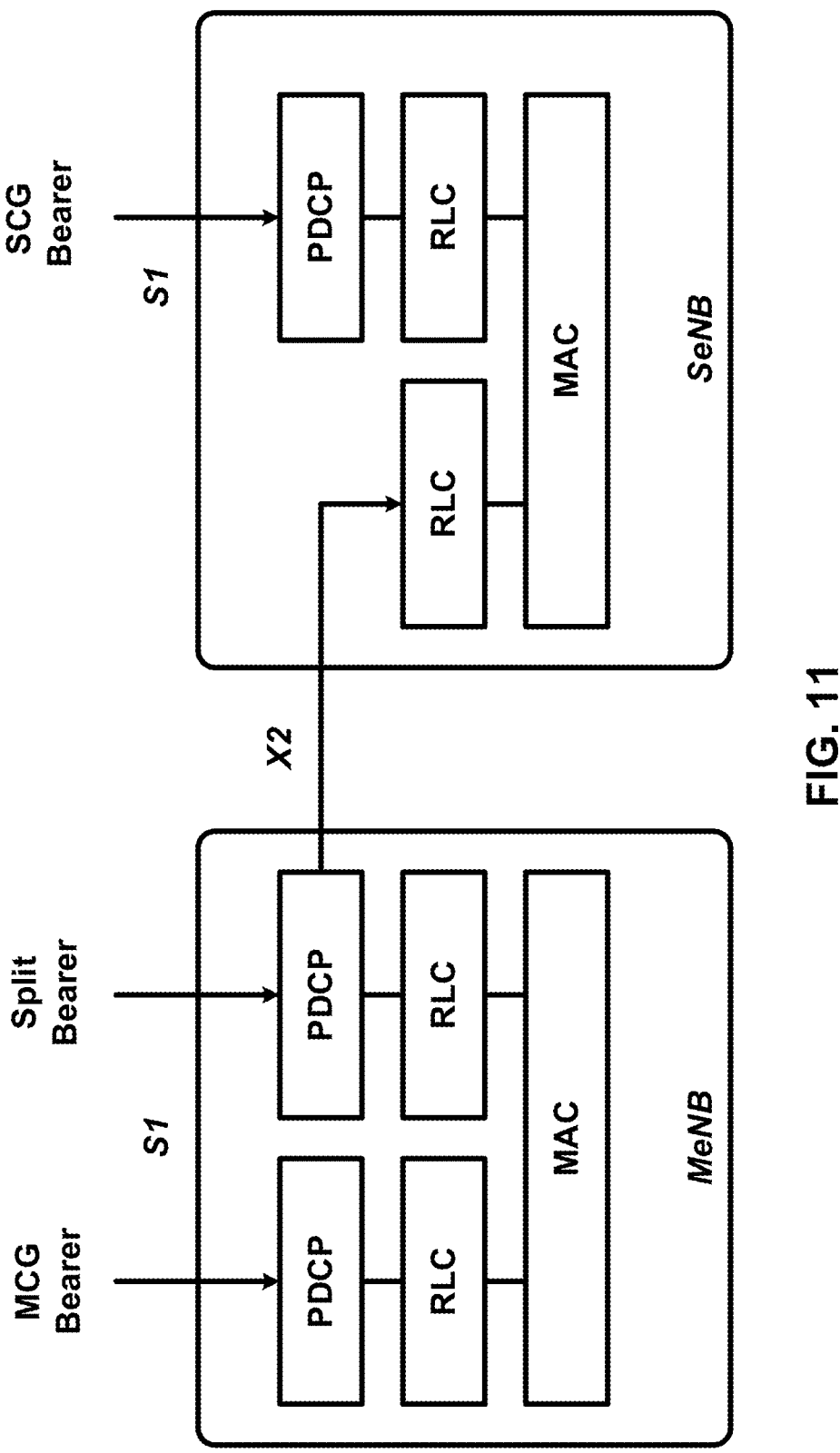
FIG. 11 is an example dual connectivity architecture with different bearer types as per an aspect of an embodiment of the present disclosure.

In an example, in DC, the radio protocol architecture that a particular bearer uses may depend on how the bearer is setup. In an example, three bearer types may exist: MCG bearer, SCG bearer and split bearer. Example bearer types are shown in FIG. 11. In an example, RRC may be located in MeNB and SRBs may be configured as MCG bearer type. In an example, SRBs may use the radio resources of the MeNB. In an example, at least one bearer may be configured to use radio resources provided by the SeNB.

In an example, inter-eNB control plane signaling for DC may be performed by means of X2 interface signaling. Control plane signaling towards the MME may be performed by means of S1 interface signaling. In an example, there may be one S1-MME connection per DC UE between the MeNB and the MME. An eNB may handle UEs independently, e.g., provide the PCell to some UEs while providing SCell(s) for SCG to others. An eNB involved in DC for a certain UE may control its radio resources and may be primarily responsible for allocating radio resources of its cells. Respective coordination between MeNB and SeNB may be performed by means of X2 interface signaling.

In an example, for dual connectivity two different user plane architectures may be allowed. In an example first architecture, the S1-U may terminate in the MeNB and the user plane data may be transferred from MeNB to SeNB, e.g., using the X2-U. In an example, second architecture, the S1-U may terminate in the SeNB.

In an example, different bearer options may be configured with different user plane architectures. U-plane connectivity may depend on the bearer option configured. In an example, for MCG bearers, the S1-U connection for the corresponding bearer(s) to the S-GW may be terminated in the MeNB. The SeNB may not be involved in the transport of user plane data for this type of bearer(s) over the Uu. In an example, for split bearers, the S1-U connection to the S-GW may be terminated in the MeNB. PDCP data may be transferred between the MeNB and the SeNB via X2-U. The SeNB and MeNB may be involved in transmitting data of this bearer type over the Uu. In an example, for SCG bearers, the SeNB may be directly connected with the S-GW via S1-U. The MeNB may not be involved in the transport of user plane data for this type of bearer(s) over the Uu. In an example, if only MCG and split bearers are configured, there may be no S1-U termination in the SeNB.

Figure 12:
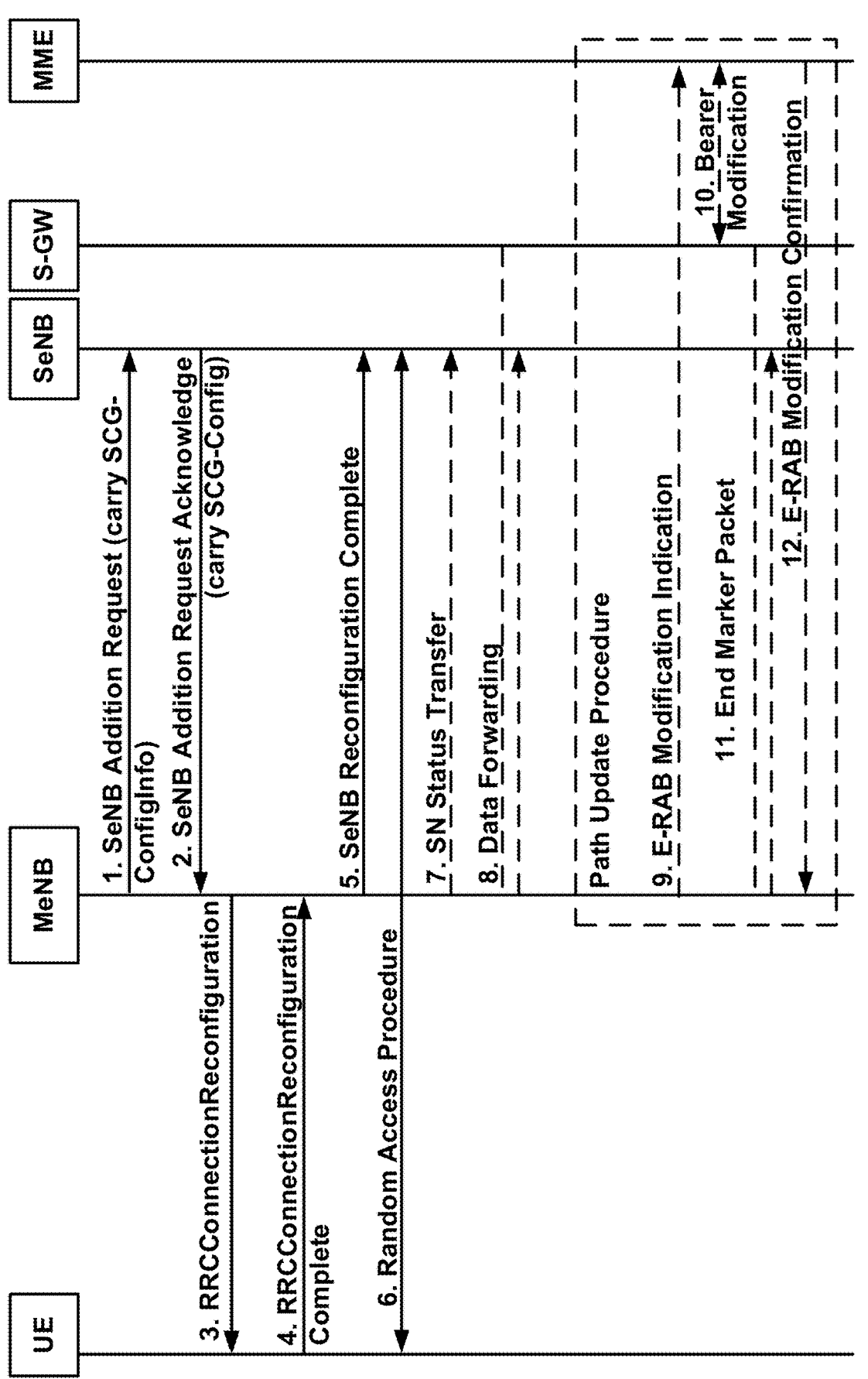
FIG. 12 is an example SeNB Addition procedure as per an aspect of an embodiment of the present disclosure.

In an example, the SeNB Addition procedure may be initiated by the MeNB. The SeNB addition procedure may be used to establish a UE context at the SeNB in order to provide radio resources from the SeNB to the UE. In an example, this procedure may be used to add at least the first cell (e.g., PSCell) of the SCG. FIG. 12 shows an example SeNB Addition procedure.

In an example, the MeNB may decide to request the SeNB to allocate radio resources for a specific E-RAB, indicating E-RAB characteristics (e.g., E-RAB parameters, TNL address information corresponding to bearer type). In an example, the MeNB may indicate within SCG-ConfigInfo the MCG configuration and the UE capabilities for UE capability coordination to be used as basis for the reconfiguration by the SeNB. In an example, the MeNB may not include SCG configuration. In an example, the MeNB may provide the latest measurement results for the SCG cell(s) requested to be added. In an example, the SeNB may reject the request.

In an example, for the split bearer option the MeNB may either decide to request resources from the SeNB of such an amount, that the QoS for the respective E-RAB is guaranteed by the exact sum of resources provided by the MeNB and the SeNB together, or even more. In an example, the MeNBs decision may be reflected by the E-RAB parameters signaled to the SeNB, which may differ from E-RAB parameters received over S1.

In an example, for a specific E-RAB, the MeNB may request the direct establishment of an SCG or a Split bearer, e.g., without first having to establish an MCG bearer.

In an example, if the RRM entity in the SeNB is able to admit the resource request, it may allocate respective radio resources and, dependent on the bearer option, respective transport network resources. In an example, the SeNB may triggers Random Access so that synchronization of the SeNB radio resource configuration may be performed. The SeNB may provide the new radio resource of SCG in SCG-Config to the MeNB. In an example, for SCG bearers, the SeNB may provide the new radio resource of the SCG together with S1 DL TNL address information for the respective E-RAB and security algorithm, for split bearers together with X2 DL TNL address information. In case of split bearers, transmission of user plane data may then take place. In an example, in case of SCG bearers, data forwarding and the SN Status Transfer may then take place.

In an example, if the MeNB endorses the new configuration, the MeNB may send the RRCConnectionReconfiguration message to the UE including the new radio resource configuration of SCG according to the SCG-Config.

In an example, the UE may apply the new configuration and may reply with RRCConnectionReconfigurationComplete message. In an example, in case the UE is unable to comply with (e.g., part of) the configuration included in the RRCConnectionReconfiguration message, it may perform the reconfiguration failure procedure.

In an example, the MeNB may inform the SeNB that the UE has completed the reconfiguration procedure successfully.

In an example, the UE may perform synchronization towards the PSCell of the SeNB. The order the UE sends the RRCConnectionReconfigurationComplete message and performs the Random Access procedure towards the SCG may be based on UE implementation. In an example, the successful RA procedure towards the SCG may not be required for a successful completion of the RRC Connection Reconfiguration procedure.

In an example, in case of SCG bearers, and dependent on the bearer characteristics of the respective E-RAB, the MeNB may take actions to minimize service interruption due to activation of dual connectivity (e.g., Data forwarding, SN Status Transfer). In an example, for SCG bearers, the update of the UP path towards the EPC may be performed.

In an example, the SeNB Modification procedure may be initiated either by the MeNB or by the SeNB and may be used to modify, establish or release bearer contexts, to transfer bearer contexts to and from the SeNB or to modify other properties of the UE context within the same SeNB. The SeNB modification procedure may not necessarily need to involve signaling towards the UE.

Figure 13:
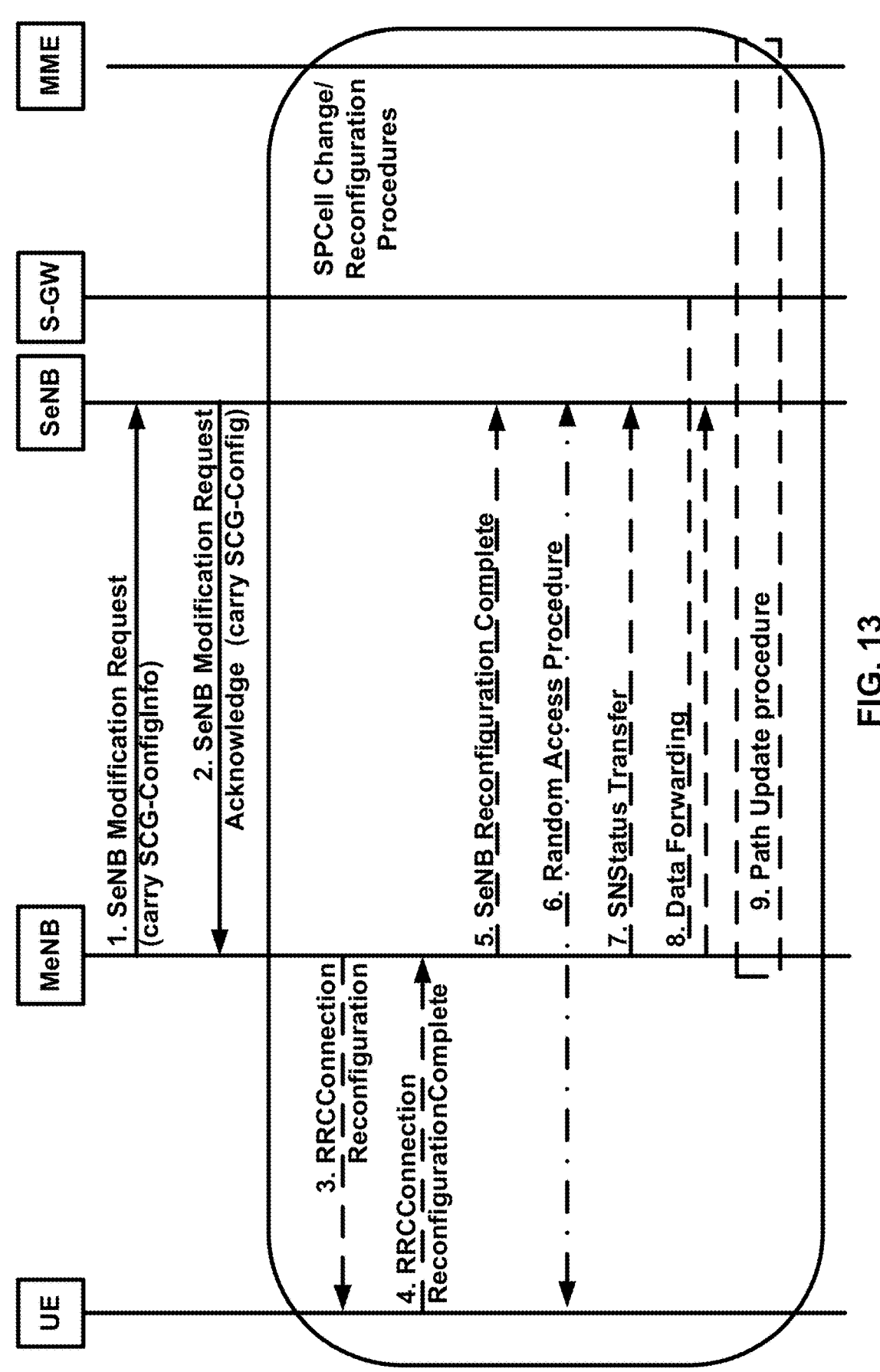
FIG. 13 is an example MeNB initiated SeNB Modification procedure as per an aspect of an embodiment of the present disclosure.

In an example, the MeNB may use the MeNB initiated SeNB Modification procedure to initiate configuration changes of the SCG within the same SeNB, e.g. the addition or release of SCG SCells, the addition, modification or release of SCG bearer(s) and the SCG part of split bearer(s) and to trigger PSCell change involving PSCell release. The SeNB may reject the request. In an example, SeNB may not reject the request if it concerns the release of SCG cells, of SCG bearer(s) or the SCG part of split bearer(s). FIG. 13 shows an example signaling flow for a MeNB initiated SeNB Modification procedure.

In an example, the MeNB may send an SeNB Modification Request message, which may contain bearer context related or other UE context related information, data forwarding address information (for example, if applicable) and SCG-ConfigInfo IE which may contain the MCG configuration and the entire UE capabilities for UE capability coordination that may be used as basis for the reconfiguration by the SeNB. In an example, in case of SCG SCell addition request, the MeNB may provide the latest measurement results for the SCG cell(s) requested to be added and SCG serving cell(s). In an example, in case of SCG Change, SCG Change Indication may be included.

In an example, the MeNB may request the establishment or release of SCG or Split bearer while not reconfiguration to MCG bearer, which may be performed without SCG change. In an example, the SeNB may respond with the SeNB Modification Request Acknowledge message, which may contain radio configuration information within SCG-Config message and data forwarding address information (in an example, if applicable). In an example, the SeNB may not initiate an SCG change. In an example, the SCG-Config message may indicate an SCG Change if the MeNB included the SCG Change Indication in the SeNB Modification Request message (as, in an example, an SCG change initiated by the SeNB may subsequently require an SCG counter from the MeNB). In an example, in case of SCG Change, for E-RABs configured with the split bearer option for which no bearer type change is performed, the SeNB may provide a new DL GTP TEID to the MeNB. In an example, the MeNB may continue sending DL PDCP PDUs to the SeNB with the previous DL GTP TEID until, in an example, it performs PDCP re-establishment or PDCP data recovery, and use the new DL GTP TEID starting with the PDCP re-establishment or data recovery.

In an example, the MeNB may initiate the RRC connection reconfiguration procedure. The UE may apply the new configuration and replies with RRCConnectionReconfigurationComplete. In an example, in case the UE may not comply with (e.g., part of) the configuration included in the RRCConnectionReconfiguration message, it may perform the reconfiguration failure procedure. In an example, upon successful completion of the reconfiguration, the success of the procedure may be indicated in the SeNB Reconfiguration Complete message. In an example, if instructed, the UE may perform synchronization towards the PSCell of the SeNB. In an example, the UE may perform UL transmission after having applied the new configuration. In an example, if applicable, data forwarding between MeNB and the SeNB may take place (FIG. 13 depicts an example case where a bearer context is transferred from the MeNB to the SeNB). In an example, if applicable, a path update may be performed.

Figure 14:
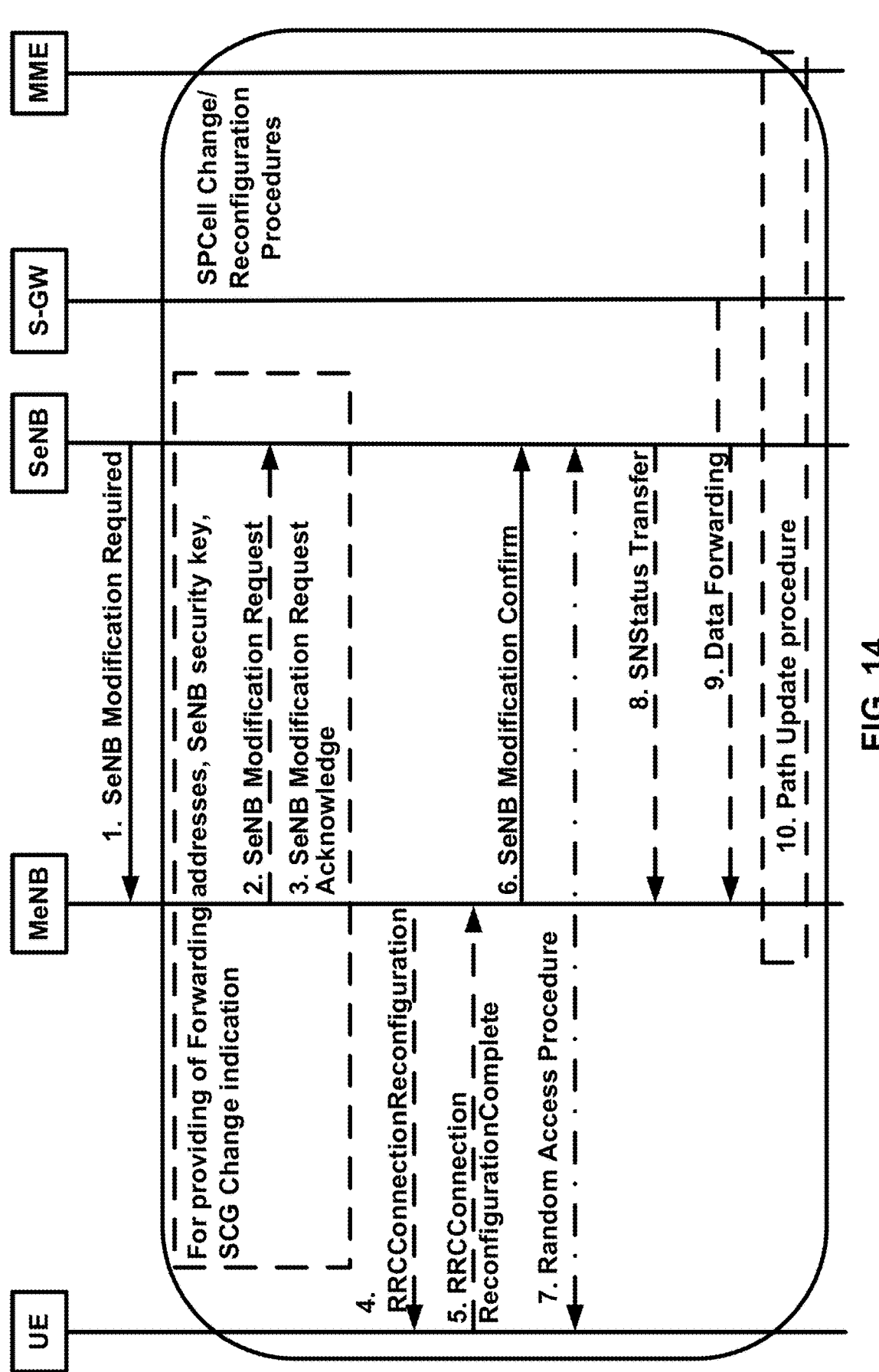
FIG. 14 is an example SeNB initiated SeNB Modification procedure as per an aspect of an embodiment of the present disclosure.

In an example, the SeNB may initiate and use the SeNB initiated SeNB Modification procedure to perform configuration changes of the SCG within the same SeNB, e.g. to trigger the release of SCG SCell(s) (in an example, SCG SCell(s) other than PSCell), SCG bearer(s) and the SCG part of split bearer(s) (e.g., upon which the MeNB may release the bearer or reconfigure it to an MCG bearer), and to trigger PSCell change. In an example, the MeNB may not reject the release request of SCG SCells (in an example, SCG SCell(s) other than PSCell), SCG bearer and/or the SCG part of split bearer. In an example, the SeNB may not initiate an SCG SCell addition except for the case of S1 update of an SCG SCell. FIG. 14 shows an example signaling flow for an SeNB initiated SeNB Modification procedure.

In an example, the SeNB may send the SeNB Modification Required message, which may contain bearer context related, other UE context related information and SCG-Config message which may contain the new radio resource configuration of SCG. For bearer release or modification a corresponding E-RAB list may be included in the SeNB Modification Required message. In an example, in case of SCG Change, SCG Change Indication together with SCG-Config may be included. In an example, in case of release of bearer served by SeNB, SCG-Config may not be included. In an example, the SeNB may decide whether the Random Access procedure is required, e.g., SCG change.

In an example, if data forwarding and/or SeNB security key change needs to be applied, the MeNB may trigger the preparation of the MeNB initiated SeNB Modification procedure and provides forwarding address and/or a new SeNB security key information within the SeNB Modification Request message, respectively. In an example, if the SeNB requested to release a bearer, and the MeNB decides to reconfigure it to an MCG bearer, the MeNB may provide the SCG Change Indication within the SeNB Modification Request message and the SeNB may provide respective RRC information in the SCG-Configuration within the SeNB Modification Request Acknowledgement message.

In an example, when the SeNB Modification Required message contains SCG-Config, the following MeNB initiated SeNB Modification procedure triggered by the MeNB may not be used for anything that would require a new SCG configuration (as, in an example, SCG-Config may not be subsequently signaled by the SeNB).

In an example, if only SeNB security key (e.g., without SCG Change Indication) is provided, the MeNB may not need to wait for MeNB initiated SeNB Modification (e.g., SeNB Modification Request message from MeNB) to initiate the RRC connection reconfiguration procedure.

In an example, if MeNB accepts the SeNB request, the MeNB may send the RRCConnectionReconfiguration message to the UE including the new radio resource configuration of SCG according to the SCG-Config.

Figure 5:
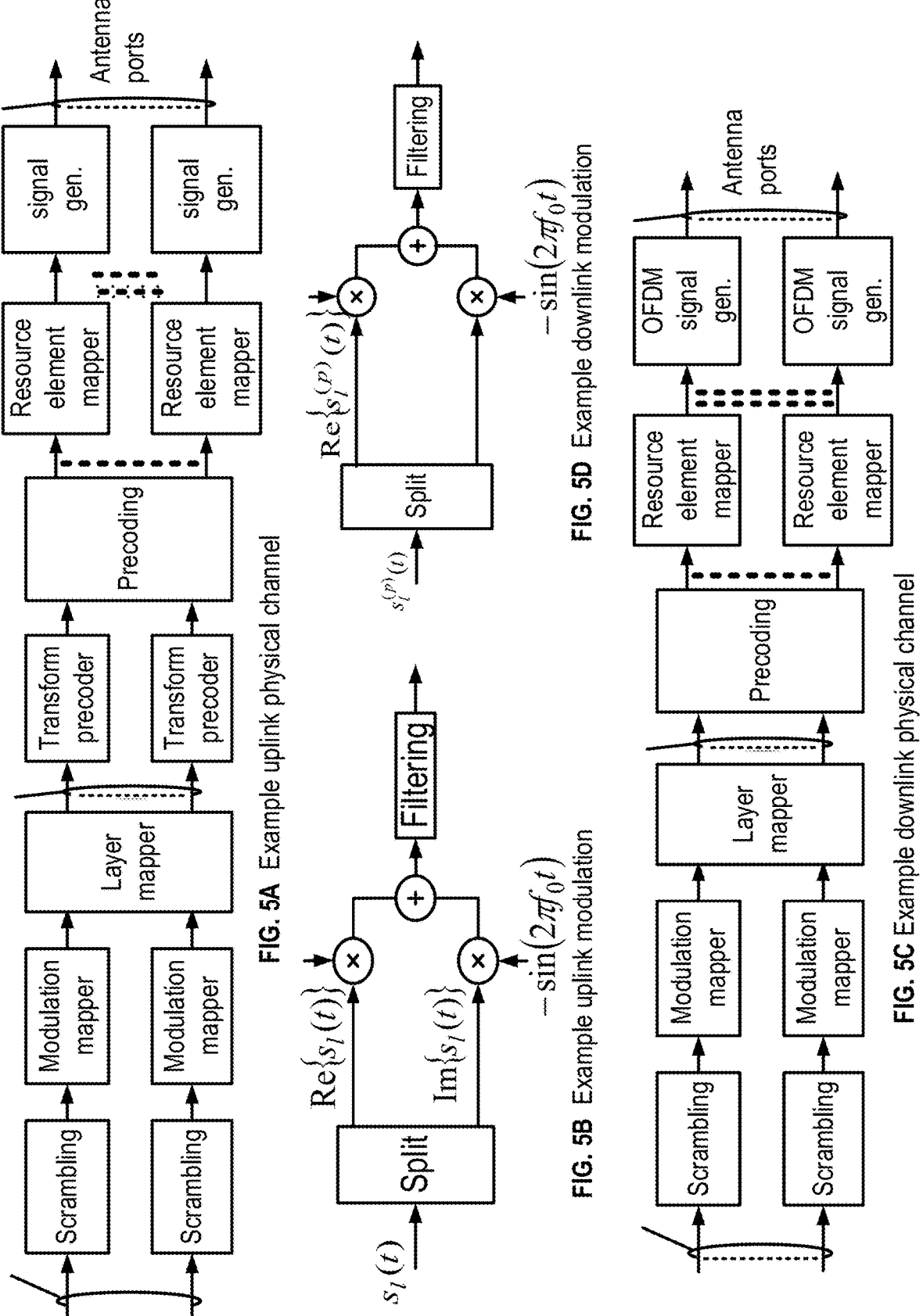
FIG. 5A, FIG. 5B, FIG. 5C and FIG. 5D are example diagrams for uplink and downlink signal transmission as per an aspect of an embodiment of the present disclosure.

In an example, the UE may apply the new configuration and may reply the RRCConnectionReconfigurationCommay perform the reconfiguration failure procedure. In an example, upon successful completion of the reconfiguration, the success of the procedure related to SCG-Config may be indicated in the SeNB Modification Confirm message. In an example, if instructed, the UE may perform synchronization towards the PSCell of the SeNB. Otherwise, the UE may perform UL transmission after having applied the new configuration. In an example, if applicable, data forwarding between MeNB and the SeNB may takes place (FIG. 5 depicts an example case where a bearer context may be transferred from the SeNB to the MeNB). In an example, if applicable, a path update is performed.

In an example, the IE SCG-ConfigInfo may be used by MeNB to request the SeNB to perform certain actions e.g. to establish, modify or release an SCG, and it may include additional information e.g. to assist the SeNB with assigning the SCG configuration. In an example, the direction of this message may be from Master eNB to the secondary eNB. An example, SCG-ConfigInfo message may as follows:

```
SCG-ConfigInfo-r12 ::= SEQUENCE { criticalExtensions CHOICE { c1 CHOICE{ scg-
ConfigInfo-r12 SCG-ConfigInfo-r12-IEs, spare7 NULL, spare6 NULL, spare5 NULL,
spare4 NULL, spare3 NULL, spare2 NULL, spare1 NULL }, criticalExtensionsFuture
SEQUENCE { }}}
SCG-ConfigInfo-r12-IEs ::= SEQUENCE { radioResourceConfigDedMCG-r12
RadioResourceConfigDedicated OPTIONAL, sCellToAddModListMCG-r12
SCellToAddModList-r10 OPTIONAL, measGapConfig-r12 MeasGapConfig OPTIONAL,
powerCoordinationInfo-r12 PowerCoordinationInfo-r12 OPTIONAL, scg-RadioConfig-
r12 SCG-ConfigPartSCG-r12 OPTIONAL, eutra-CapabilityInfo-r12 OCTET STRING
(CONTAINING UECapabilityInformation) OPTIONAL, scg-ConfigRestrictInfo-r12
SCG-ConfigRestrictInfo-r12 OPTIONAL, mbmsInterestIndication-r12 OCTET STRING
(CONTAINING MBMSInterestIndication-r11) OPTIONAL, measResultServCellListSCG-
r12 MeasResultServCellListSCG-r12 OPTIONAL, drb-ToAddModListSCG-r12 DRB-
InfoListSCG-r12 OPTIONAL, drb-ToReleaseListSCG-r12 DRB-ToReleaseList
OPTIONAL, sCellToAddModListSCG-r12 SCellToAddModListSCG-r12 OPTIONAL,
sCellToReleaseListSCG-r12 SCellToReleaseList-r10 OPTIONAL, p-Max-r12 P-Max
OPTIONAL, nonCriticalExtension SCG-ConfigInfo-v1310-IEs OPTIONAL}
SCG-ConfigInfo-v1310-IEs ::= SEQUENCE { measResultSSTD-r13 MeasResultSSTD-
r13 OPTIONAL, sCellToAddModListMCG-Ext-r13 SCellToAddModListExt-r13
OPTIONAL, measResultServCellListSCG-Ext-r13 MeasResultServCellListSCG-Ext-r13
OPTIONAL, sCellToAddModListSCG-Ext-r13 SCellToAddModListSCG-Ext-r13
OPTIONAL, sCellToReleaseListSCG-Ext-r13 SCellToReleaseListExt-r13 OPTIONAL,
nonCriticalExtension SEQUENCE { } OPTIONAL }
DRB-InfoListSCG-r12 ::= SEQUENCE (SIZE (1..maxDRB)) OF DRB-InfoSCG-r12
DRB-InfoSCG-r12 ::= SEQUENCE { eps-BearerIdentity-r12 INTEGER (0..15)
OPTIONAL, -- Cond DRB-Setup drb-Identity-r12 DRB-Identity, drb-Type-r12
ENUMERATED {split, scg} OPTIONAL, -- Cond DRB-Setup ...}
SCellToAddModListSCG-r12 ::= SEQUENCE (SIZE (1..maxSCell-r10)) OF Cell-
ToAddMod-r12
SCellToAddModListSCG-Ext-r13 ::= SEQUENCE (SIZE (1..maxSCell-r13)) OF Cell-
ToAddMod-r12
Cell-ToAddMod-r12 ::= SEQUENCE { sCellIndex-r12 SCellIndex-r10,
cellIdentification-r12 SEQUENCE { physCellId-r12 PhysCellId, dl-CarrierFreq-r12
ARFCN-ValueEUTRA-r9 } OPTIONAL, -- Cond SCellAdd measResultCellToAdd-r12
SEQUENCE { rsrpResult-r12 RSRP-Range, rsrqResult-r12 RSRQ-Range } OPTIONAL, -
- Cond SCellAdd2 ..., [[ sCellIndex-r13 SCellIndex-r13 OPTIONAL,
measResultCellToAdd-v1310 SEQUENCE { rs-sinr-Result-r13 RS-SINR-Range-r13 }
OPTIONAL -- Cond SCellAdd2 ]] }
MeasResultServCellListSCG-r12 ::= SEQUENCE (SIZE (1..maxServCell-r10)) OF
MeasResultServCellSCG-r12
MeasResultServCellListSCG-Ext-r13 ::= SEQUENCE (SIZE (1..maxServCell-r13)) OF
MeasResultServCellSCG-r12
MeasResultServCellSCG-r12 ::= SEQUENCE { servCellId-r12 ServCellIndex-r10,
measResultSCell-r12 SEQUENCE { rsrpResultSCell-r12 RSRP-Range, rsrqResultSCell-
r12 RSRQ-Range }, ..., [[ servCellId-r13 ServCellIndex-r13 OPTIONAL,
measResultSCell-v1310 SEQUENCE { rs-sinr-ResultSCell-r13 RS-SINR-Range-r13 }
OPTIONAL ]] }
SCG-ConfigRestrictInfo-r12 ::= SEQUENCE { maxSCH-TB-BitsDL-r12 INTEGER
(1..100), maxSCH-TB-BitsUL-r12 INTEGER (1..100) }
``` plete message. In an example, in case the UE may not comply with (in an example, part of) the configuration included in the RRCConnectionReconfiguration message, it In an example, drb-ToAddModListSCG may include DRBs the SeNB is requested to establish or modify (e.g., DRB type change). In an example, drb-ToReleaseListSCG may include DRBs the SeNB is requested to release. In an example, maxSCH-TB-BitsXL may indicate the maximum DL-SCH/UL-SCH TB bits that may be scheduled in a TTI. In an example, maxSCH-TB-BitsXL may be specified as a percentage of the value defined for the applicable UE category. In an example, measGapConfig may include the current measurement gap configuration. In an example, measResultSSTD may include measurement results of UE SFN and Subframe Timing Difference between the PCell and the PSCell. In an example, measResultServCellListSCG may include measurement results of SCG (serving) cells. In an example, radioResourceConfigDedMCG may include the current dedicated MCG radio resource configuration. In an example, if sCellIndex-r13 is present, sCellIndex-r12 may be ignored. In an example, sCellToAddModListMCG, sCellToAddModListMCG-Ext may include the current MCG SCell configuration. In an example, the field sCell-ToAddModListMCG may be used to add the first 4 SCells with sCellIndex-r10 while sCellToAddModListMCG-Ext may be used to add the rest. In an example, sCellToAdd-ModListSCG, sCellToAddModListSCG-Ext may include SCG cells the SeNB is requested to establish. In an example, the measurement results may be provided for these cells. In an example, the field sCellToAddModListSCG may be used to add the first 4 SCells with sCellIndex-r12 while sCell-ToAddModListSCG-Ext may be used to add the rest. In an example, sCellToReleaseListSCG, sCellToReleaseList-SCG-Ext may include SCG cells the SeNB is requested to release. In an example, scg-RadioConfig may include the current dedicated SCG configuration. In an example, scg-ConfigRestrictInfo may include fields for which MeNB may explicitly indicate the restriction to be observed by SeNB. In an example, if servCellId-r13 is present, servCellId-r12 may be ignored. In an example, p-Max may be a cell specific value e.g. as broadcast by PCell. In an example, the field DRB-Setup may be present in case DRB establishment is requested; otherwise the field may not be present. In an example, the field SCellAdd may be present in case SCG cell establishment is requested; otherwise the field may not be present. In an example, the field SCellAdd2 may be present in case SCG cell establishment is requested; otherwise the field may not be present.

Figure 15:
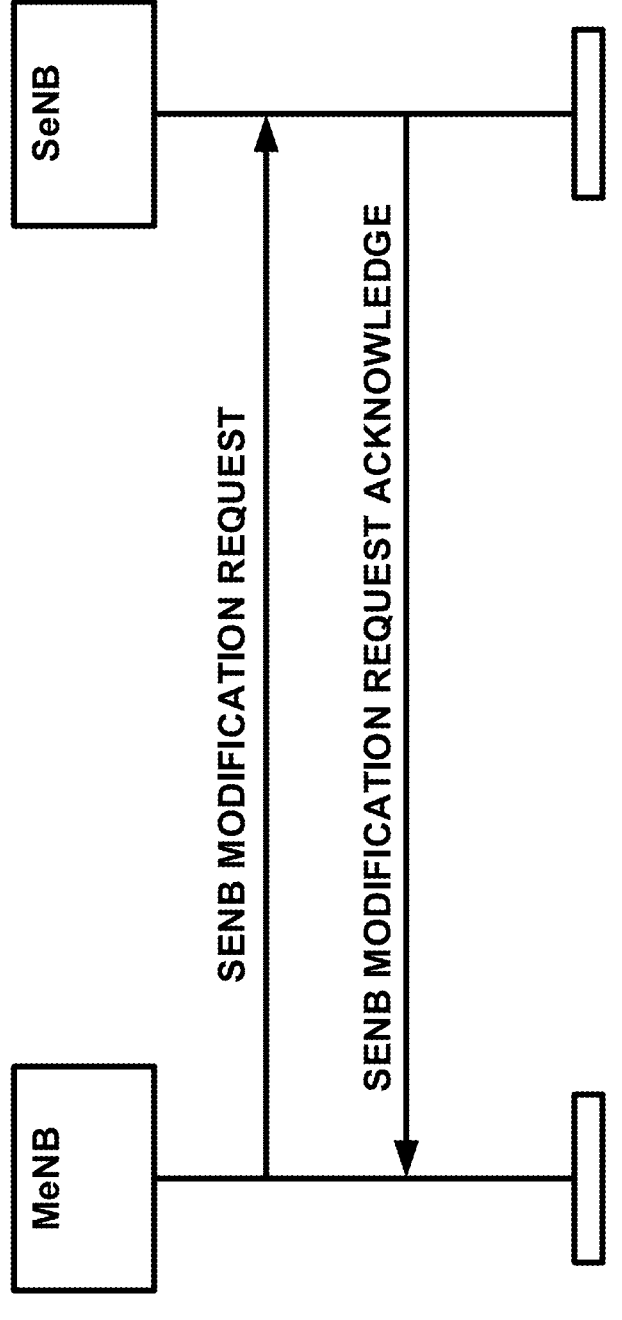
FIG. 15 is an example MeNB initiated SeNB Modification with successful operation as per an aspect of an embodiment of the present disclosure.

In an example, the IE SCG-Config may be used to transfer the SCG radio configuration generated by the SeNB. In an example, the direction of this message may be from Secondary eNB to master eNB. An example SCG-Config message may be as follows:

the procedure may use UE-associated signaling. An example procedure is shown in FIG. 15.

In an example, the MeNB may initiate the procedure by sending the SENB MODIFICATION REQUEST message to the SeNB. In an example, when the MeNB sends the SENB MODIFICATION REQUEST message, it may start the timer $T_{DCprep}$.

In an example, the SENB MODIFICATION REQUEST message may comprise E-RABs to be added within the E-RABs To Be Added Item IE; E-RABs to be modified within the E-RABs To Be Modified Item IE; E-RABs to be released within the E-RABs To Be Released Item IE; and the SeNB UE Aggregate Maximum Bit Rate IE within the UE Context Information IE. The SENB MODIFICATION REQUEST message may comprise the MeNB to SeNB Container IE; the SCG Change Indication IE and the CSG Membership Status IE. In an example, if the SENB MODI-FICATION REQUEST message contains the Serving PLMN IE, the SeNB may use it for RRM purposes. In an example, if the SeNB UE Aggregate Maximum Bit Rate IE is included in the SENB MODIFICATION REQUEST message, the SeNB may: replace the previously provided SeNB UE Aggregate Maximum Bit Rate by the received SeNB UE Aggregate Maximum Bit Rate in the UE context; use the received SeNB UE Aggregate Maximum Bit Rate for non-GBR Bearers for the concerned UE. In an example, the allocation of resources according to the values of the Allo-cation and Retention Priority IE included in the E-RAB Level QoS Parameters IE may follow the principles for the E-RAB Setup procedure. In an example, if at least one of the requested modifications is admitted by the SeNB, the SeNB may modify the related part of the UE context accordingly and send the SENB MODIFICATION REQUEST ACKNOWLEDGE message back to the MeNB. In an example, the SeNB may include the E-RABs for which resources have been either added or modified or released at the SeNB either in the E-RABs Admitted To Be Added List IE or the E-RABs Admitted To Be Modified List IE or the E-RABs Admitted To Be Released List IE. In an example, the SeNB may include the E-RABs that have not been admitted in the E-RABs Not Admitted List IE with an appropriate cause value.

In an example, for an E-RAB configured with the SCG bearer option, the SeNB may, if included, choose the cipher-ing algorithm based on the information in the UE Security

```
SCG-Config-r12 ::= SEQUENCE { criticalExtensions CHOICE { c1 CHOICE{ scg-
Config-r12 SCG-Config-r12-IEs, spare7 NULL, spare6 NULL, spare5 NULL, spare4
NULL, spare3 NULL, spare2 NULL, spare1 NULL}, criticalExtensionsFuture
SEQUENCE { }}}
SCG-Config-r12-IEs ::= SEQUENCE {scg-RadioConfig-r12 SCG-ConfigPartSCG-r12
OPTIONAL, nonCriticalExtension SEQUENCE { } OPTIONAL}
```

In an example, scg-RadioConfig-r12 may include the change of the dedicated SCG configuration and, upon addi-tion of an SCG cell, the common SCG configuration. In an example, the SeNB may include a new SCG cell in response to a request from MeNB, but may include release of an SCG cell release or release of the SCG part of an SCG/Split DRB without prior request from MeNB. In an example, the SeNB may not use this field to initiate release of the SCG.

In an example, an MeNB initiated SeNB Modification procedure may be used to enable an MeNB to request an SeNB to modify the UE context at the SeNB. In an example, Capabilities IE and locally configured priority list of AS encryption algorithms and apply the key indicated in the SeNB Security Key IE.

In an example, for an E-RAB configured with the SCG bearer option, if applicable, the MeNB may propose to apply forwarding of downlink data by including the DL Forward-ing IE within the E-RABs To Be Added Item IE of the SENB MODIFICATION REQUEST message. For each E-RAB that it has decided to admit, the SeNB may include the DL Forwarding GTP Tunnel Endpoint IE within the E-RABs Admitted To Be Added Item IE of the SENB MODIFICA- TION REQUEST ACKNOWLEDGE message to indicate that it accepts the proposed forwarding of downlink data for this bearer. In an example, the MeNB may also provide for an applicable E-RAB to be released the DL Forwarding GTP Tunnel Endpoint IE and the UL Forwarding GTP Tunnel Endpoint IE within the E-RABs To Be Released Item IE of the SENB MODIFICATION REQUEST message.

In an example, for an E-RAB configured with the SCG bearer option, if applicable, the SeNB may include for each bearer in the E-RABs Admitted To Be Added List IE in the SENB MODIFICATION REQUEST ACKNOWLEDGE message the UL Forwarding GTP Tunnel Endpoint IE to indicate that it requests data forwarding of uplink packets to be performed for that bearer.

In an example, for an E-RAB configured with the SCG bearer option, if the Correlation ID IE for the concerned E-RAB is received by the SeNB, the SeNB may use this information for LIPA operation for the concerned E-RAB. In an example, for an E-RAB configured with the SCG bearer option, the SIPTO Correlation ID IE for the concerned E-RAB is received by the SeNB, the SeNB may use this information for SIPTO@LN operation for the concerned E-RAB. In an example, for an E-RAB configured with the split bearer option to be modified, the SENB MODIFICA-TION REQUEST message may include the SCG Change Indication IE and the MeNB GTP Tunnel Endpoint IE in the E-RABs To Be Modified Item IE. In an example, for an E-RAB configured with the split bearer option to be modi-fied (released), if applicable, the MeNB may provide for an applicable E-RAB to be released the DL Forwarding GTP Tunnel Endpoint IE within the E-RABs To Be Released Item IE of the SENB MODIFICATION REQUEST message.

In an example, if the E-RAB level QoS parameter IE is included in the SENB MODIFICATION REQUEST mes-sage for an E-RAB to be modified the SeNB may allocate respective resources and provide corresponding radio con-figuration information within the SeNB to MeNB Container IE.

In an example, if the SENB MODIFICATION REQUEST message contains for an E-RAB to be modified which is configured with the SCG bearer option the S1 UL GTP Tunnel Endpoint IE the SeNB may use it as the new UL S1-U address. In an example, if the SENB MODIFICATION REQUEST message contains for an E-RAB to be modified which is configured with the split bearer option the MeNB GTP Tunnel Endpoint IE the SeNB may use it as the new UL X2-U address.

In an example, for an E-RAB to be modified which is configured with the SCG bearer option the SeNB may include in the SENB MODIFICATION REQUEST ACKNOWLEDGE message the S1 DL GTP Tunnel End-point IE. In an example, for an E-RAB to be modified which is configured with the split bearer option the SeNB may include in the SENB MODIFICATION REQUEST ACKNOWLEDGE message the SeNB GTP Tunnel End-point IE.

In an example, the SCG Change Indication IE may be included in the SENB MODIFICATION REQUEST mes-sage. In an example, the CSG Membership Status IE may be included in the SENB MODIFICATION REQUEST mes-sage. In an example, upon reception of the SENB MODI-FICATION REQUEST ACKNOWLEDGE message the MeNB may stop the timer TDCprep. In an example, if the SENB MODIFICATION REQUEST ACKNOWLEDGE message has included the SeNB to MeNB Container IE the MeNB may then be defined to have a Prepared SeNB Modification for that X2 UE-associated signaling.

In an example, when the SeNB supporting L-GW function for LIPA operation releases radio and control plane related resources associated to the LIPA bearer, it may also request using intra-node signaling the collocated L-GW to release the LIPA PDN connection as defined.

In an example, if the SeNB admits a modification of the UE context requiring the MeNB to report about the success of the RRC connection reconfiguration procedure, the SeNB may start the timer $T_{DCoverall}$ when sending the SENB MODIFICATION REQUEST ACKNOWLEDGE message to the MeNB. The reception of the SENB RECONFIGU-RATION COMPLETE message may stop the timer $T_{DCoverall}$.

Figure 16:
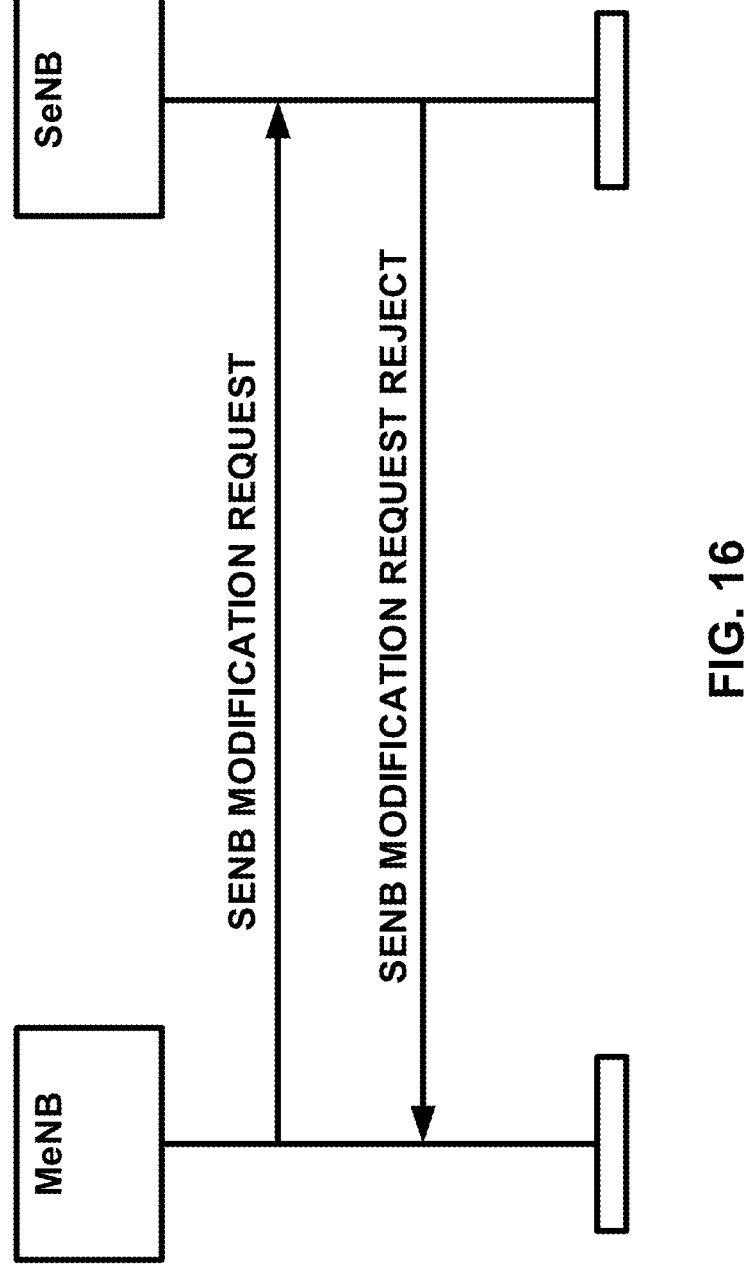
FIG. 16 is an example MeNB initiated SeNB Modification with unsuccessful operation as per an aspect of an embodiment of the present disclosure.

In an example, if the SeNB does not admit any modifi-cation requested by the MeNB, or a failure occurs during the MeNB initiated SeNB Modification Preparation, the SeNB may send the SENB MODIFICATION REQUEST REJECT message to the MeNB. The message may contain the Cause IE with an appropriate value. An example procedure is shown in FIG. 16.

In an example, if the SeNB receives a SENB MODIFI-CATION REQUEST message containing the MeNB to SeNB Container IE that does not include required informa-tion, the SeNB may send the SENB MODIFICATION REQUEST REJECT message to the MeNB. In an example, if the SeNB receives a SENB MODIFICATION REQUEST message containing multiple E-RAB ID IEs (e.g., in the E-RABs To Be Added List IE and/or the E-RABs To Be Modified List IE) set to the same value, the SeNB may not admit the action requested for the corresponding E-RABs. In an example, if the SeNB receives an SENB MODIFICA-TION REQUEST message containing multiple E-RAB ID IEs (e.g., in the E-RAB To Be Released List IE) set to the same value, the SeNB may initiate the release of one corresponding E-RAB and ignore the duplication of the instances of the selected corresponding E-RABs.

In an example, if the SeNB receives a SENB MODIFI-CATION REQUEST message containing an E-RAB Level QoS Parameters IE which contains a QCI IE indicating a GBR bearer, and which does not contain the GBR QOS Information IE, the SeNB may not admit the corresponding E-RAB. In an example, if the supported algorithms for encryption defined in the Encryption Algorithms IE in the UE Security Capabilities IE in the UE Context Information IE, plus the mandated support of EEA0 in all UEs, do not match an algorithm defined in the configured list of allowed encryption algorithms in the SeNB, the SeNB may reject the procedure using the SENB MODIFICATION REQUEST REJECT message.

In an example, if the timer $T_{DCprep}$ expires before the MeNB has received the SENB MODIFICATION REQUEST ACKNOWLEDGE message, the MeNB may regard the MeNB initiated SeNB Modification Preparation procedure as being failed and may release the UE Context at the SeNB. In an example, if the SeNB receives a SENB MODIFICATION REQUEST message containing both the Correlation ID and the SIPTO Correlation ID IEs for the same E-RAB, the SeNB may consider the establishment of the corresponding E-RAB as failed.

In an example, if the timer $T_{DCoverall}$ expires before the SeNB has received the SENB RECONFIGURATION COMPLETE or the SENB RELEASE REQUEST message, the SeNB may regard the requested modification RRC connection reconfiguration as being not applied by the UE and may trigger the SeNB initiated SeNB Release proce-dure. In an example, if the MeNB, after having initiated the MeNB initiated SeNB Modification procedure, receives the SENB MODIFICATION REQUIRED message, the MeNB may refuse the SeNB initiated SeNB Modification procedure with an appropriate cause value in the Cause IE. In an example, if the MeNB has a Prepared SeNB Modification and receives the SENB MODIFICATION REQUIRED message, the MeNB may respond with the SENB MODIFICATION REFUSE message to the SeNB with an appropriate cause value in the Cause IE.

Figure 17:
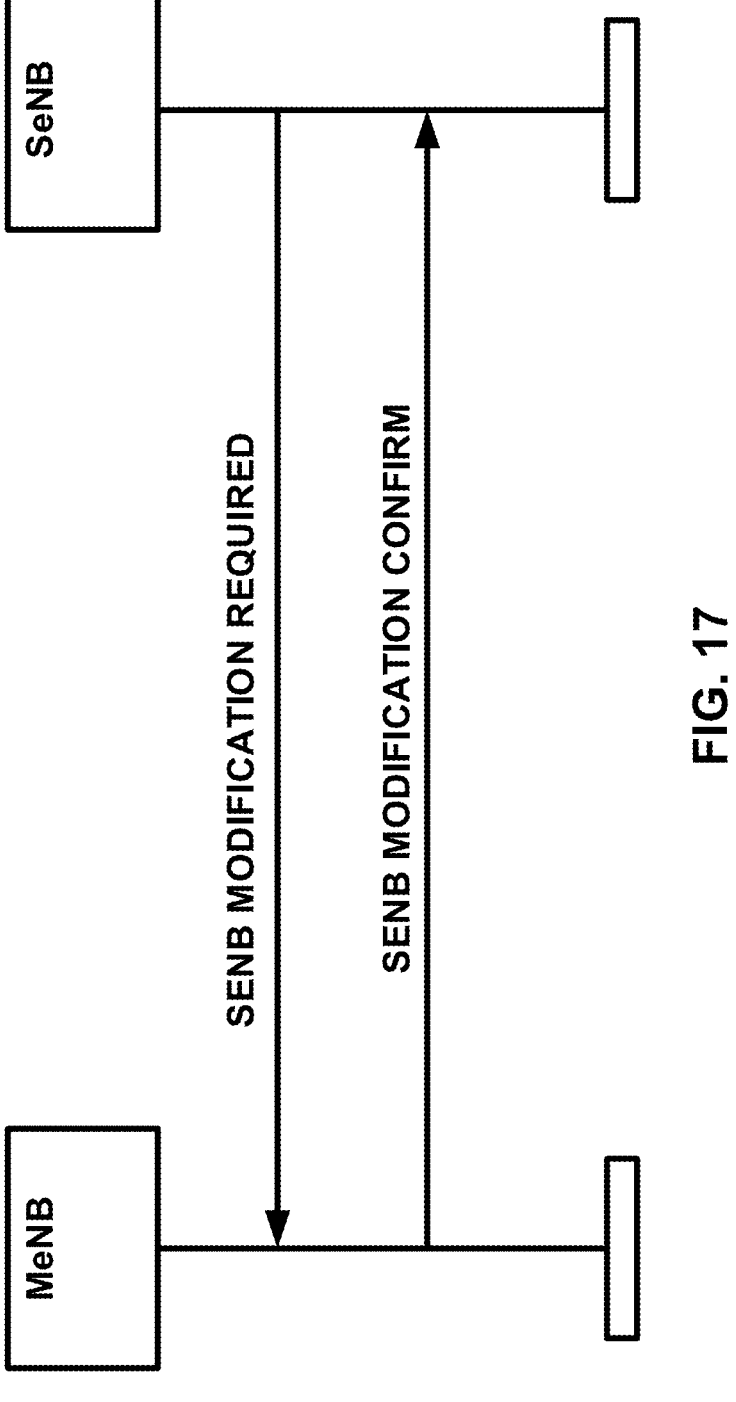
FIG. 17 is an example SeNB initiated SeNB Modification with successful operation as per an aspect of an embodiment of the present disclosure.

In an example, the SeNB initiated SeNB Modification procedure may be used by the SeNB to modify the UE context in the SeNB. In an example, the procedure may use UE-associated signaling. In an example, the SeNB may initiate the procedure by sending the SENB MODIFICATION REQUIRED message to the MeNB. When the SeNB sends the SENB MODIFICATION REQUIRED message, it may start the timer $T_{DCoverall}$. An example is shown in FIG. 17.

In an example, the SENB MODIFICATION REQUIRED message may contain: the SeNB to MeNB Container IE; E-RABs to be released within the E-RABs To Be Released Item IE; the SCG Change Indication IE. In an example, the MeNB may receive a SENB MODIFICATION REQUIRED message containing the SCG Change Indication IE. In an example, if the MeNB is able to perform the modifications requested by the SeNB, the MeNB may send the SENB MODIFICATION CONFIRM message to the SeNB. The SENB MODIFICATION CONFIRM message may contain the MeNB to SeNB Container IE. In an example, upon reception of the SENB MODIFICATION CONFIRM message the SeNB may stop the timer $T_{DCoverall}$. In an example, if applicable, the SeNB may receive, after having initiated the SeNB initiated SeNB Modification procedure, the SENB MODIFICATION REQUEST message including the DL Forwarding GTP Tunnel Endpoint IE and the UL Forwarding GTP Tunnel Endpoint IE within the E-RABs To Be Released List IE. In an example, if applicable, the SeNB may receive, after having initiated the SeNB initiated SeNB Modification procedure, the SENB MODIFICATION REQUEST message including the SeNB Security Key IE within the UE Context Information IE.

In an example, if the SeNB has initiated the SeNB initiated SeNB Modification procedure with the SENB MODIFICATION REQUIRED message including the E-RABs To Be Released Item IE, it may receive the SENB MODIFICATION REQUEST message including the SCG Change Indication IE, upon which the SeNB may provide respective information in the SeNB to MeNB Container IE within the SENB MODIFICATION REQUEST ACKNOWLEDGMENT message.

Figure 18:
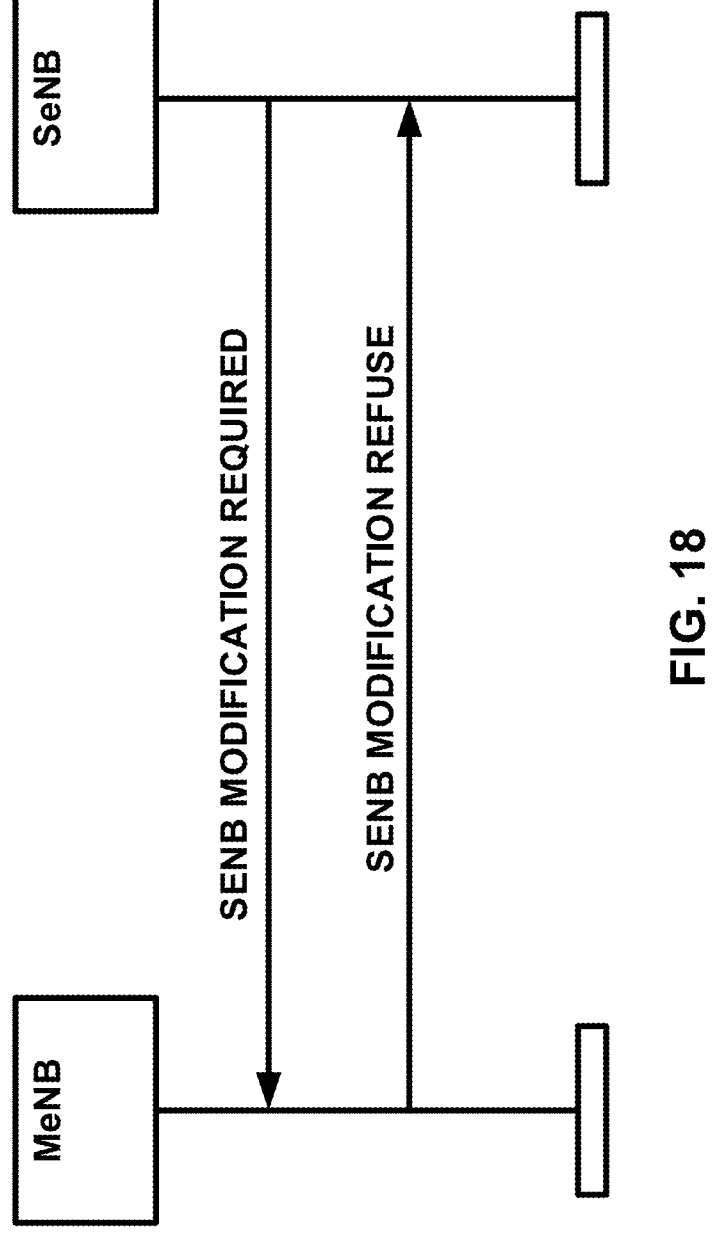
FIG. 18 is an example SeNB initiated SeNB Modification with unsuccessful operation as per an aspect of an embodiment of the present disclosure.

In an example, in case the request modification cannot be performed successfully the MeNB may respond with the SENB MODIFICATION REFUSE message to the SeNB with an appropriate cause value in the Cause IE. An example procedure is shown in FIG. 18.

In an example, the MeNB may provide configuration information in the MeNB to SeNB Container IE. In an example, if the timer $T_{DCoverall}$ expires before the SeNB has received the SENB MODIFICATION CONFIRM or the SENB MODIFICATION REFUSE message, the SeNB may regard the requested modification as failed and may take further actions like triggering the SeNB initiated SeNB Release procedure to release all SeNB resources allocated for the UE. In an example, if the MeNB is aware that the SeNB didn't receive the latest configuration information concerning the MCG, the MeNB may respond with the SENB MODIFICATION REFUSE message to the SeNB with an appropriate cause value in the Cause IE. In an example, if the value received in the E-RAB ID IE of any of the E-RABs To Be Released Items IE is not known at the MeNB, the MeNB may regard the procedure as failed and may take appropriate actions like triggering the MeNB initiated SeNB Release procedure.

In an example, if the SeNB, after having initiated the SeNB initiated SeNB Modification procedure, receives the SENB MODIFICATION REQUEST message including other IEs than an applicable SeNB Security Key IE and/or applicable forwarding addresses and/or the SCG Change Indication IE the SeNB may: regard the SeNB initiated SeNB Modification Procedure as being failed, stop the $T_{DCoverall}$, which was started to supervise the SeNB initiated SeNB Modification procedure, be prepared to receive the SENB MODIFICATION REFUSE message from the MeNB and continue with the MeNB initiated SeNB Modification Preparation procedure.

In an example, the SENB MODIFICATION REQUEST message may be sent by the MeNB to the SeNB to request the preparation to modify SeNB resources for a specific UE. In an example, the direction of those message may be from the MeNB to the SeNB.

In an example, the SENB MODIFICATION REQUEST REJECT message may be sent by the SeNB to inform the MeNB that the MeNB initiated SeNB Modification Preparation has failed. In an example, the direction of this message may be from the SeNB to the MeNB.

In an example, the SENB MODIFICATION REQUIRED message may be sent by the SeNB to the MeNB to request the modification of SeNB resources for a specific UE. In an example, the direction of this message may be from the SeNB to the MeNB.

In an example, the SENB MODIFICATION CONFORM message may be sent by the MeNB to inform the SeNB about the successful modification. In an example, the direction of this message may be from the MeNB to the SeNB.

In an example, the SENB MODIFICATION REFUSE message may be sent by the MeNB to inform the SeNB that the SeNB initiated SeNB Modification has failed. In an example, the direction of this message may be from the MeNB to the SeNB.

In an example, the purpose of the cause information element may be to indicate the reason for a particular event for the whole protocol.

In an example, the meaning of the different cause values may be described in the following table. In an example, the "not supported" cause values may indicate that the concerned capability is missing. In an example, the "not available" cause values may indicate that the concerned capability is present and insufficient resources were available to perform the requested action.

In an example, the RRCConnectionReconfiguration message may be a command to modify an RRC connection. In an example, it may convey information for measurement configuration, mobility control, radio resource configuration (including RBs, MAC main configuration and physical channel configuration) including associated dedicated NAS information and security configuration. In an example, the signaling radio bearer used for this message may be SRB1. In an example, the RLC-SAP mode may be AM. In an example, the corresponding Logical channel may be DCCH. In an example, the direction of this message may be E-UTRAN to UE. An example RRCConnectionReconfiguration message may be as follows:

RRCConnectionReconfiguration ::= SEQUENCE { rrc-TransactionIdentifier RRC-
TransactionIdentifier, criticalExtensions CHOICE { c1
CHOICE} rrcConnectionReconfiguration-r8 RRCConnectionReconfiguration-r8-IEs,
spare7 NULL, spare6 NULL, spare5 NULL, spare4 NULL, spare3 NULL, spare2 NULL,
spare1 NULL }, criticalExtensionsFuture SEQUENCE { } }}
RRCConnectionReconfiguration-r8-IEs ::= SEQUENCE { measConfig MeasConfig
OPTIONAL, -- Need ON mobility ControlInfo MobilityControlInfo OPTIONAL, -- Cond
HO dedicatedInfoNASList SEQUENCE (SIZE(1..maxDRB)) OF DedicatedInfoNAS
OPTIONAL, -- Cond nonHO radioResourceConfigDedicated
RadioResourceConfigDedicated OPTIONAL, -- Cond HO-toEUTRA securityConfigHO
SecurityConfigHO OPTIONAL, -- Cond HO nonCriticalExtension
RRCConnectionReconfiguration-v890-IEs OPTIONAL}
RRCConnectionReconfiguration-v890-IEs ::= SEQUENCE { lateNonCriticalExtension
OCTET STRING (CONTAINING RRCConnectionReconfiguration-v8m0-IEs)
OPTIONAL, nonCriticalExtension RRCConnectionReconfiguration-v920-IEs
OPTIONAL}
-- Late non-critical extensions: RRCConnectionReconfiguration-v8m0-IEs ::=
SEQUENCE { -- Following field is only for pre REL-10 late non-critical extensions
lateNonCriticalExtension OCTET STRING OPTIONAL, nonCriticalExtension
RRCConnectionReconfiguration-v10i0-IEs OPTIONAL}
RRCConnectionReconfiguration-v10i0-IEs ::= SEQUENCE
{ antennaInfoDedicatedPCell-v10i0 AntennaInfoDedicated-v10i0 OPTIONAL, -- Need
ON -- Following field is only for late non-critical extensions from REL-10
nonCriticalExtension SEQUENCE { } OPTIONAL}
-- Regular non-critical extensions: RRCConnectionReconfiguration-v920-IEs :: =
SEQUENCE { otherConfig-r9 OtherConfig-r9 OPTIONAL, -- Need ON fullConfig-r9
ENUMERATED {true} OPTIONAL, -- Cond HO-Reestab nonCriticalExtension
RRCConnectionReconfiguration-v1020-IEs OPTIONAL}
RRCConnectionReconfiguration-v1020-IEs ::= SEQUENCE { sCellToReleaseList-r10
SCellToReleaseList-r10 OPTIONAL, -- Need ON sCellToAddModList-r10
SCellToAddModList-r10 OPTIONAL, -- Need ON nonCriticalExtension
RRCConnectionReconfiguration-v1130-IEs OPTIONAL}
RRCConnectionReconfiguration-v1130-IEs ::= SEQUENCE
{ systemInformationBlockType1Dedicated-r11 OCTET STRING (CONTAINING
SystemInformationBlockType1) OPTIONAL, -- Need ON nonCriticalExtension
RRCConnectionReconfiguration-v1250-IEs OPTIONAL}
RRCConnectionReconfiguration-v1250-IEs ::= SEQUENCE { wlan-OffloadInfo-r12
CHOICE { release NULL, setup SEQUENCE { wlan-OffloadConfigDedicated-r12
WLAN-OffloadConfig-r12, t350-r12 ENUMERATED {min5, min10, min20, min30,
min60, min120, min180, spare1} OPTIONAL -- Need OR}} OPTIONAL, -- Need ON
scg-Configuration-r12 SCG-Configuration-r12 OPTIONAL, -- Cond nonFullConfig sl-
SyncTxControl-r12 SL-SyncTxControl-r12 OPTIONAL, -- Need ON sl-DiscConfig-r12
SL-DiscConfig-r12 OPTIONAL, -- Need ON sl-CommConfig-r12 SL-CommConfig-r12
OPTIONAL, -- Need ON nonCriticalExtension RRCConnectionReconfiguration-v1310-
IEs OPTIONAL)
RRCConnectionReconfiguration-v1310-IEs ::= SEQUENCE { sCellToReleaseListExt-
r13 SCellToReleaseListExt-r13 OPTIONAL, -- Need ON sCellToAddModListExt-r13
SCellToAddModListExt-r13 OPTIONAL, -- Need ON lwa-Configuration-r13 LWA-
Configuration-r13 OPTIONAL, -- Need ON lwip-Configuration-r13 LWIP-
Configuration-r13 OPTIONAL, -- Need ON rclwi-Configuration-r13 RCLWI-
Configuration-r13 OPTIONAL, -- Need ON nonCriticalExtension SEQUENCE { }
OPTIONAL}
SL-SyncTxControl-r12 ::= SEQUENCE { networkControlledSyncTx-r12 ENUMERATED
{on, off} OPTIONAL -- Need OP}
PSCellToAddMod-r12 ::= SEQUENCE { sCellIndex-r12 SCellIndex-r10,
cellIdentification-r12 SEQUENCE { physCellId-r12 PhysCellId, dl-CarrierFreq-r12
ARFCN-ValueEUTRA-r9 } OPTIONAL, -- Cond SCellAdd
radioResourceConfigCommonPSCell-r12 RadioResourceConfigCommonPSCell-r12
OPTIONAL, -- Cond SCellAdd radioResourceConfigDedicatedPSCell-r12
RadioResourceConfigDedicatedPSCell-r12 OPTIONAL, -- Cond SCellAdd2 ...,
[[ antennaInfoDedicatedPSCell-v1280 AntennaInfoDedicated-v10i0 OPTIONAL -- Need
ON]], [[ sCellIndex-r13 SCellIndex-r13 OPTIONAL -- Need ON ]]}
PowerCoordinationInfo-r12 ::= SEQUENCE { p-MeNB-r12 INTEGER (1..16), p-SeNB-
r12 INTEGER (1..16), powerControlMode-r12 INTEGER (1..2)}
SCellToAddModList-r10 ::= SEQUENCE (SIZE (1..maxSCell-r10)) OF
SCellToAddMod-r10 SCellToAddModListExt-r13 ::= SEQUENCE (SIZE (1..maxSCell-
r13)) OF CellToAddModExt-r13 SCellToAddMod-r10 ::= SEQUENCE { sCellIndex-r10
SCellIndex-r10, cellIdentification-r10 SEQUENCE { physCellId-r10 PhysCellId, dl-
CarrierFreq-r10 ARFCN-ValueEUTRA } OPTIONAL, -- Cond SCellAdd
radioResourceConfigCommonSCell-r10 RadioResourceConfigCommonSCell-r10
OPTIONAL, -- Cond SCellAdd radioResourceConfigDedicatedSCell-r10
RadioResourceConfigDedicatedSCell-r10 OPTIONAL, -- Cond SCellAdd2 ..., [[ dl-
CarrierFreq-v1090 ARFCN-ValueEUTRA-v9e0 OPTIONAL -- Cond EARFCN-max]],
[[ antennaInfoDedicatedSCell-v10i0 AntennaInfoDedicated-v10i0 OPTIONAL -- Need
ON ]]}
SCellToAddModExt-r13 ::= SEQUENCE { sCellIndex-r13 SCellIndex-r13,
cellIdentification-r13 SEQUENCE { physCellId-r13 PhysCellId, dl-CarrierFreq-r13
ARFCN-ValueEUTRA-r9 } OPTIONAL, -- Cond SCellAdd
radioResourceConfigCommonSCell-r13 RadioResourceConfigCommonSCell-r10
OPTIONAL, -- Cond SCellAdd radioResourceConfigDedicatedSCell-r13
RadioResourceConfigDedicatedSCell-r10 OPTIONAL, -- Cond SCellAdd2

```
antennaInfoDedicatedSCell-r13 AntennaInfoDedicated-v10i0 OPTIONAL -- Need ON}
SCellToReleaseList-r10 ::= SEQUENCE (SIZE (1..maxSCell-r10)) OF SCellIndex-r10
SCellToReleaseListExt-r13 ::= SEQUENCE (SIZE (1..maxSCell-r13)) OF SCellIndex-
r13 SCG-Configuration-r12 ::= CHOICE { release NULL, setup SEQUENCE { scg-
ConfigPartMCG-r12 SEQUENCE { scg-Counter-r12 INTEGER (0.. 65535) OPTIONAL,
-- Need ON powerCoordinationInfo-r12 PowerCoordinationInfo-r12 OPTIONAL, --
Need ON ... } OPTIONAL, -- Need ON scg-ConfigPartSCG-r12 SCG-ConfigPartSCG-
r12 OPTIONAL -- Need ON }}
SCG-ConfigPartSCG-r12 ::= SEQUENCE { radioResourceConfigDedicatedSCG-r12
RadioResourceConfigDedicatedSCG-r12 OPTIONAL, -- Need ON
sCellToReleaseListSCG-r12 SCellToReleaseList-r10 OPTIONAL, -- Need ON
pSCellToAddMod-r12 PSCellToAddMod-r12 OPTIONAL, -- Need ON
sCellToAddModListSCG-r12 SCellToAddModList-r10 OPTIONAL, -- Need ON
mobilityControlInfoSCG-r12 MobilityControlInfoSCG-r12 OPTIONAL, -- Need ON...,
[[ sCellToReleaseListSCG-Ext-r13 SCellToReleaseListExt-r13 OPTIONAL, -- Need ON
sCellToAddModListSCG-Ext-r13 SCellToAddModListExt-r13 OPTIONAL -- Need
ON ]]}
SecurityConfigHO ::= SEQUENCE { handoverType CHOICE { intraLTE SEQUENCE
{ securityAlgorithmConfig SecurityAlgorithmConfig OPTIONAL, -- Cond fullConfig
keyChangeIndicator BOOLEAN, nextHopChainingCount NextHopChainingCount },
interRAT SEQUENCE { securityAlgorithmConfig SecurityAlgorithmConfig, nas-
SecurityParamToEUTRA OCTET STRING (SIZE(6)) }}, ...}
```

In an example, the dedicatedInfoNASList field may be used to transfer UE specific NAS layer information between the network and the UE. The RRC layer may be transparent for each PDU in the list. In an example, the field fullConfig may indicate the full configuration option is applicable for the RRC Connection Reconfiguration message. In an example, the value of keyChangeIndicator may be true in an intra-cell handover when a KeNB key is derived from a KASME key taken into use through the latest successful NAS SMC procedure for KeNB re-keying. The value of false may be used in an intra-LTE handover when the new KeNB key is obtained from the current KeNB key or from the NH.

In an example, the lwa-Configuration field may be used to provide parameters for LWA configuration. In an example, E-UTRAN may not simultaneously configure LWA and DC for a UE. In an example, the lwip-Configuration field may be used to provide parameters for LWIP configuration. In an example, the nas-securityParamToEUTRA field may be used to transfer UE specific NAS layer information between the network and the UE. In an example, the RRC layer may be transparent for this field, although it may affect activation of AS-security after inter-RAT handover to E-UTRA. In an example, the field networkControlledSyncTx may indicate whether the UE may transmit synchronization information (in an example, become synchronization source). The value On may indicate the UE to transmit synchronization information. The value Off may indicate the UE to not transmit such information. In an example, the parameter p-MeNB may indicate the guaranteed power for the MeNB. In an example, the parameter powerControlMode may indicate the power control mode used in DC. The value 1 may correspond to DC power control mode 1 and the value 2 may indicate DC power control mode 2. In an example, the parameter p-SeNB may indicate the guaranteed power for the SeNB. In an example, rclwi-Configuration may be the WLAN traffic steering command. In an example, in case of DC, the SCellIndex may be unique within the scope of the UE e.g., an SCG cell may not use the same value as used for an MCG cell. In an example, for, if sCellIndex-r13 is present the UE may ignore sCellIndex-r12. sCellIndex-r13 in sCell-ToAddModListExt-r13 may not have same values as sCel-lIndex-r10 in sCellToAddModList-r10. In an example, the fields sCellToAddModList, sCellToAddModListExt may indicate the SCell to be added or modified. Field sCellToAddModList may be used to add the first 4 SCells with sCellIndex-r10. sCellToAddModListExt may be used to add the rest. In an example, the fields sCellToAddModListSCG, sCellToAddModListSCG-Ext may indicate the SCG cell to be added or modified. The field may be used for SCG cells other than the PSCell (which is added/modified by field pSCellToAddMod). The field sCellToAddModListSCG may be used to add the first 4 SCells with sCellIndex-r10 The field sCellToAddModListSCG-Ext may be used to add the rest. In an example, the fields sCellToReleaseListSCG, sCellToReleaseListSCG-Ext may indicate the SCG cell to be released. The field may also be used to release the PSCell e.g. upon change of PSCell, upon system information change for the PSCell. In an example, seg-Counter may be a counter used upon initial configuration of SCG security as well as upon refresh of S-KeNB. E-UTRAN may include the field upon SCG change when one or more SCG DRBs are configured. Otherwise E-UTRAN may not include the field. In an example, the value minN of t350 may correspond to N minutes of Timer T350. In an example, the field EARFCN-max may be present if dl-CarrierFreq-r10 is included and set to maxEARFCN. Otherwise the field may not be present. In an example, the field fullConfig may be present for handover within E-UTRA when the fullConfig is included; otherwise it may be optionally present, may need OP. In an example, the field HO may be present in case of handover within E-UTRA or to E-UTRA; otherwise the field may not be present. In an example, the field HO-Reestab may be present, may need ON, in case of handover within E-UTRA or upon the first reconfiguration after RRC connection re-establishment; otherwise the field may not be present. In an example, the field HO-toEUTRA may be present in case of handover to E-UTRA or for reconfigurations when fullConfig is included; otherwise the field may be optionally present, may need ON. In an example, the field nonFullConfig may not be present when the fullConfig is included or in case of handover to E-UTRA; otherwise it may be optional present, may need ON. In an example, the field nonHO may be present upon SCell addition; otherwise it may not be present. In an example, the field SCellAdd2 may be present upon SCell addition; otherwise it may be optionally present, may need ON.

In an example, the RRCConnectionReconfigurationComplete message may be used to confirm the successful completion of an RRC connection reconfiguration. In an example, the Signaling radio bearer used for this message may be SRB1. In an example, the RLC-SAP may be AM mode. In an example, the corresponding logical channel may be DCCH. In an example, the direction of message may be from UE to E-UTRAN. An example: RRCConnectionRe-configurationComplete message may be as follows:

```
RRCConnectionReconfigurationComplete ::= SEQUENCE { rrc-TransactionIdentifier
RRC-TransactionIdentifier, criticalExtensions CHOICE
{ rrcConnectionReconfigurationComplete-r8 RRCConnectionReconfigurationComplete-
r8-IEs, criticalExtensionsFuture SEQUENCE } }}
RRCConnectionReconfigurationComplete-r8-IEs ::= SEQUENCE
{ nonCriticalExtension RRCConnectionReconfigurationComplete-v8a0-IEs OPTIONAL}
RRCConnectionReconfigurationComplete-v8a0-IEs ::= SEQUENCE
{ lateNonCriticalExtension OCTET STRING OPTIONAL, nonCriticalExtension
RRCConnectionReconfigurationComplete-v1020-IEs OPTIONAL}
RRCConnectionReconfigurationComplete-v1020-IEs ::= SEQUENCE { rlf-
InfoAvailable-r10 ENUMERATED {true} OPTIONAL, logMeasAvailable-r10
ENUMERATED {true} OPTIONAL, nonCriticalExtension
RRCConnectionReconfigurationComplete-v1130-IEs OPTIONAL}
RRCConnectionReconfigurationComplete-v1130-IEs ::= SEQUENCE
{ connEstFailInfoAvailable-r11 ENUMERATED {true} OPTIONAL,
nonCriticalExtension RRCConnectionReconfigurationComplete-v1250-IEs OPTIONAL}
RRCConnectionReconfigurationComplete-v1250-IEs ::= SEQUENCE
{ logMeasAvailableMBSFN-r12 ENUMERATED {true} OPTIONAL,
nonCriticalExtension SEQUENCE { } OPTIONAL}
```

In an example, SCG change may be a synchronous SCG reconfiguration procedure (e.g., involving random access to the PSCell) including reset/re-establishment of layer 2 and, if SCG DRBs are configured, refresh of security. The procedure may be used in a number of different scenarios e.g. SCG establishment, PSCell change, Key refresh, change of DRB type. The UE may perform the SCG change related actions upon receiving an RRCConnectionReconfiguration message including mobilityControlInfoSCG.

In an example, an SCG may be established, reconfigured or released by using an RRCConnectionReconfiguration message with or without the mobilityControlInfo. In an example, in case Random Access to the PSCell is required upon SCG reconfiguration, E-UTRAN may employ the SCG change procedure (e.g., an RRCConnectionReconfiguration message including the mobilityControlInfoSCG). The PSCell may be changed using the SCG change procedure and by release and addition of the PSCell.

In an example, the network may trigger the handover procedure e.g. based on radio conditions, load. In an example, to facilitate this, the network may configure the UE to perform measurement reporting (possibly including the configuration of measurement gaps). In an example, the network may also initiate handover blindly, e.g., without having received measurement reports from the UE.

In an example, before sending the handover message to the UE, the source eNB may prepare one or more target cells. The source eNB may select the target PCell. The source eNB may provide the target eNB with a list of best cells on each frequency for which measurement information is available, in order of decreasing RSRP. The source eNB may include available measurement information for the cells provided in the list. The target eNB may decide which SCells are configured for use after handover, which may include cells other than the ones indicated by the source eNB. In an example, if an SCG is configured, handover may involve either SCG release or SCG change. In an example, in case the UE was configured with DC, the target eNB may indicate in the handover message whether the UE may release the entire SCG configuration. Upon connection re-establishment, the UE may release the entire SCG configuration except for the DRB configuration, while E-UTRAN in the first reconfiguration message following the re-establishment may release the DRB(s) or reconfigure the DRB(s) to MCG DRB(s).

In an example, if T307 expires, any dedicated preamble, if provided within the rach-ConfigDedicatedSCG, is not available for use by the UE anymore. In an example, if T307 expires, the UE may initiate the SCG failure information procedure.

Figure 19:
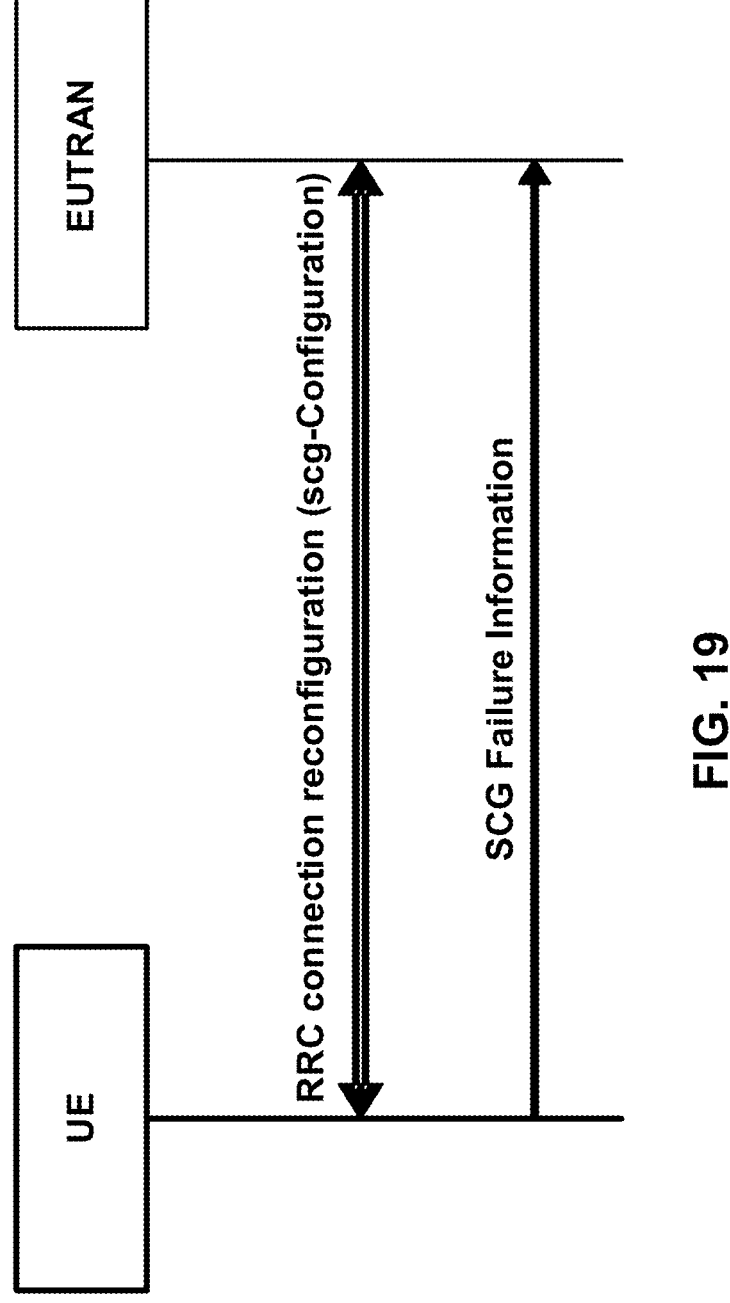
FIG. 19 is an example procedure for transmission of SCG failure information as per an aspect of an embodiment of the present disclosure.

An example SCG failure information is shown in FIG. 19. In an example, the purpose of this procedure is to inform E-UTRAN about an SCG failure the UE has experienced, e.g., SCG radio link failure, SCG change failure. In an example, a UE may initiate the procedure to report SCG failures when SCG transmission is not suspended and when one of the following conditions is met: upon detecting radio link failure for the SCG; or upon SCG change failure; or upon stopping uplink transmission towards the PSCell due to exceeding the maximum uplink transmission timing difference when powerControlMode is configured to 1. In an example, upon initiating the procedure, the UE may: suspend all SCG DRBs and suspend SCG transmission for split DRBs; reset SCG-MAC; stop T307. The UE may initiate transmission of the SCGFailureInformation message. In an example, the UE may set the contents of the SCGFailure-Information message as follows: if the UE initiates transmission of the SCGFailureInformation message to provide SCG radio link failure information: include failureType and set it to the trigger for detecting SCG radio link failure; else if the UE initiates transmission of the SCGFailureInforma-tion message to provide SCG change failure information: include failureType and set it to seg-ChangeFailure; else if the UE initiates transmission of the SCGFailureInformation message due to exceeding maximum uplink transmission timing difference: include failureType and set it to max UL-TimingDiff; set the measResultServFreqList to include for each SCG cell that is configured, if any, within meas-ResultSCell the quantities of the concerned SCell, if available; for each SCG serving frequency included in measRe-sultServFreqList, include within measResultBestNeighCell the physCellId and the quantities of the best non-serving cell, based on RSRP, on the concerned serving frequency; set the measResultNeighCells to include the best measured cells on non-serving E-UTRA frequencies, ordered such that the best cell is listed first, and based on measurements collected up to the moment the UE detected the failure, and set its fields as follows; if the UE was configured to perform measurements for one or more non-serving EUTRA frequencies and measurement results are available, include the measResultListEUTRA; for each neighbor cell included, include the optional fields that are available. In an example, the measured quantities are filtered by the L3 filter as configured in the mobility measurement configuration. The measurements may be based on the time domain measurement resource restriction, if configured.

In an example, the UE may submit the SCGFailureInformation message to lower layers for transmission. In an example, the SCGFailureInformation message may be used to provide information regarding failures detected by the UE. In an example, the signaling radio bearer used for this message may be SRB1. In an example, the RLC-SAP mode for this message may be AM (acknowledgement mode). In example, the corresponding logical channel may be DCCH. In an example, the direction of message may be from the UE to E-UTRAN. An example SCGFailureInformation message is as follows:

```
SCGFailureInformation-r12 ::= SEQUENCE { criticalExtensions CHOICE { c1
CHOICE { scgFailureInformation-r12 SCGFailureInformation-r12-IEs, spare3 NULL,
spare2 NULL, spare1 NULL }, criticalExtensionsFuture SEQUENCE { } }}
SCGFailureInformation-r12-IEs ::= SEQUENCE { failureReportSCG-r12
FailureReportSCG-r12 OPTIONAL, nonCriticalExtension SCGFailureInformation-
v1310-IEs OPTIONAL}
SCGFailureInformation-v1310-IEs ::= SEQUENCE { lateNonCriticalExtension OCTET
STRING OPTIONAL, nonCriticalExtension SEQUENCE { } OPTIONAL}
FailureReportSCG-r12 ::= SEQUENCE { failureType-r12 ENUMERATED {t313-
Expiry, randomAccessProblem, rlc-MaxNumRetx, scg-ChangeFailure },
measResultServFreqList-r12 MeasResultServFreqList-r10 OPTIONAL,
measResultNeighCells-r12 MeasResultList2EUTRA-r9 OPTIONAL, ..., [[ failureType-
v1290 ENUMERATED {maxUL-TimingDiff-v1290} OPTIONAL ]],
[[ measResultServFreqListExt-r13 MeasResultServFreqListExt-r13 OPTIONAL ]]}
```

In an example, except for handover or releasing SPS for MCG, E-UTRAN may not reconfigure sps-Config for MCG when there is a configured downlink assignment or a configured uplink grant for MCG. In an example, except for SCG change or releasing SPS for SCG, E-UTRAN may not reconfigure sps-Config for SCG when there is a configured downlink assignment or a configured uplink grant for SCG.

In an example, the RRC timer T307 may start at reception of RRCConnectionReconfiguration message including MobilityControlInfoSCG. In an example, the RRC timer T307 may stop upon successful completion of random access on the PSCell, upon initiating re-establishment and upon SCG release. In an example, at the expiry of the RRC timer T307, the UE may inform E-UTRAN about the SCG change failure by initiating the SCG failure information procedure.

Figure 20:
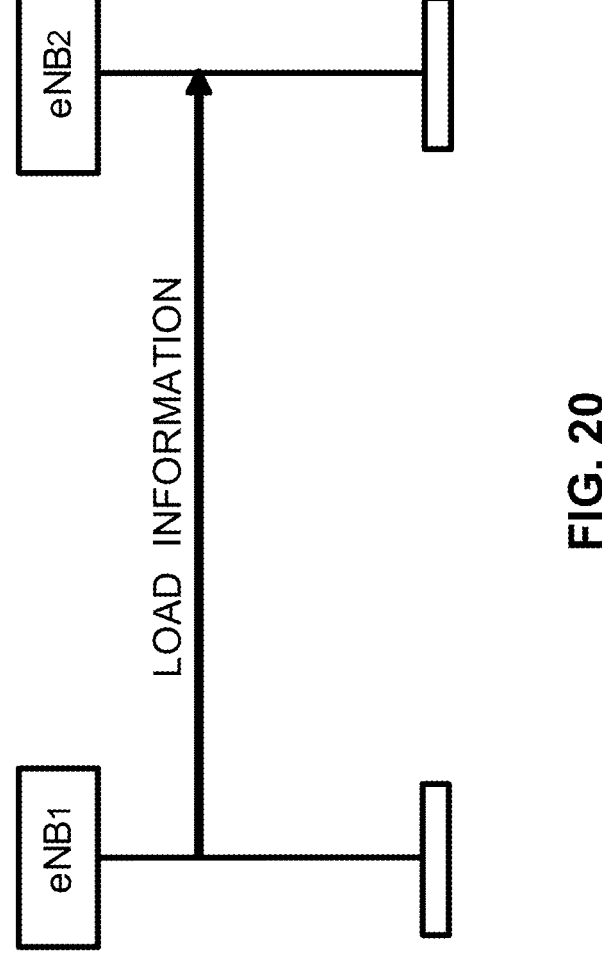
FIG. 20 is an example load indication procedure as per an aspect of an embodiment of the present disclosure.

In an example, the purpose of the Load Indication procedure may be used to transfer load and interference coordination information between eNBs controlling intra-frequency neighboring cells, and additionally between eNBs controlling inter-frequency neighboring cells for TDD. In an example, the procedure may use non UE-associated signaling. An example, procedure is shown in FIG. 20.

In an example, an eNB1 may initiate the procedure by sending LOAD INFORMATION message to a peer eNB2. In an example, if the UL Interference Overload Indication IE is received in the LOAD INFORMATION message, it may indicate the interference level experienced by the indicated cell on all resource blocks, per PRB. In an example, if the Extended UL Interference Overload Info IE is received in the LOAD INFORMATION message, the UL Interference Overload Indication IE may indicate the interference level experienced by the indicated cell ignoring the UL subframe (s) represented as value "1" in the Associated Subframes IE. The receiving eNB may take such information into account when setting its scheduling policy and may consider the received UL Interference Overload Indication IE value valid until reception of a new LOAD INFORMATION message carrying an update of the same IE.

In an example, if the UL High Interference Indication IE is received in the LOAD INFORMATION message, it may indicate, per PRB, the occurrence of high interference sensitivity, as seen from the sending eNB. The receiving eNB may try to avoid scheduling cell edge UEs in its cells for the concerned PRBs. The Target Cell ID IE received within the UL High Interference Information IE group in the LOAD INFORMATION message may indicate the cell for which the corresponding UL High Interference Indication is meant. The receiving eNB may consider the value of the UL High Interference Information IE group valid until reception of a new LOAD INFORMATION message carrying an update.

In an example, if the Relative Narrowband Tx Power (RNTP) IE is received in the LOAD INFORMATION message, it may indicate, per PRB or per subframe per PRB (Enhanced RNTP), whether downlink transmission power is lower than the value indicated by the RNTP Threshold IE. In an example, if the Enhanced RNTP IE is included in the Relative Narrowband Tx Power (RNTP) IE, it may additionally indicate whether the downlink transmission power is lower than the value specified by the RNTP High Power Threshold IE. The receiving eNB may take such information into account when setting its scheduling policy and may consider the received Relative Narrowband Tx Power (RNTP) IE value valid until reception of a new LOAD INFORMATION message carrying an update. If the Enhanced RNTP IE included in the Relative Narrowband Tx Power (RNTP) IE is present, the receiving CNB may consider the received Enhanced RNTP IE value valid starting from the subframe indicated by the Start SFN IE and Start Subframe Number IE, if present.

In an example, if the ABS Information IE is included in the LOAD INFORMATION message, the ABS Pattern Info IE may indicate the subframes designated as almost blank subframes by the sending eNB for the purpose of interference coordination. The receiving eNB may take such information into consideration when scheduling UEs.

In an example, the receiving eNB may use the Measurement Subset IE received in the LOAD INFORMATION message, for the configuration of specific measurements towards the UE. In an example, the receiving eNB may consider the received information as immediately applicable. The receiving eNB may consider the value of the ABS Information IE valid until reception of a new LOAD INFORMATION message carrying an update.

In an example, if an ABS indicated in the ABS pattern info IE coincides with a MBSFN subframe, the receiving eNB may consider that the subframe is designated as almost blank subframe by the sending eNB. In an example, if the Invoke Indication IE is included in the LOAD INFORMATION message, it may indicate which type of information the sending eNB would like the receiving eNB to send back. The receiving eNB may take such request into account.

In an example, if the Invoke Indication IE is set to "ABS Information", it may indicate the sending eNB would like the receiving eNB to initiate the Load Indication procedure, with the LOAD INFORMATION message containing the ABS Information IE indicating non-zero ABS patterns in the relevant cells. If the Invoke Indication IE is set to "Start NAICS Information", it may indicate the sending eNB would like the receiving eNB to initiate the Load Indication procedure with the LOAD INFORMATION message containing the Dynamic DL transmission information IE. The first time the Dynamic DL transmission information IE may be signaled after receiving the Invoke Indication IE set to "Start NAICS Information", all the NAICS parameters in the NAICS Information IE may be included. If the Invoke Indication IE is set to "Stop NAICS Information", it may indicate the sending eNB does not need NAICS information and therefore the receiving eNB may stop signaling NAICS parameters for the concerned cell.

In an example, if the NAICS Information IE is set to "NAICS Active", the receiving eNB may use it for the configuration of DL interference mitigation assistance information towards the UE. Information included in the NAICS Information IE may replace corresponding NAICS information existing at the receiver. If the NAICS Information IE is set to "NAICS Inactive", the receiving eNB may consider the existing NAICS information as invalid.

In an example, if the Intended UL-DL Configuration IE is included in the LOAD INFORMATION message, it may indicate the UL-DL configuration intended to be used by the indicated cell. The receiving eNB may take such information into account when setting its scheduling policy and may consider the received Intended UL-DL Configuration IE value valid until reception of a new LOAD INFORMATION message carrying an update of the same IE.

In an example, if the Extended UL Interference Overload Info IE is received in the LOAD INFORMATION message, the Extended UL Interference Overload Indication IE may indicate the interference level experienced by the indicated cell on all resource blocks, per PRB, in the UL subframe(s) which is represented as value "1" in the Associated Subframes IE. The receiving eNB may take such information into account when setting its scheduling policy and may consider the received Extended UL Interference Overload Info IE value valid until reception of a new LOAD INFORMATION message carrying an update of the same IE.

In an example, if the CoMP Information IE is received in the LOAD INFORMATION message, the receiving eNB may take the IE into account for RRM. The receiving eNB may consider the CoMP Information IE valid starting in the subframe indicated by the Start SFN IE and Start Subframe Number IE, if present. If the Start SFN IE and Start Subframe Number IE are not present, then the receiving eNB may consider the CoMP Information IE as immediately valid. The receiving eNB may consider the CoMP Information IE valid until an update of the same IE, received in a new LOAD INFORMATION message, is considered valid.

In an example, DC deployment scenarios may cover both time-synchronized and time-asynchronous networks, and/or cases with frequency- and time-division duplex (FDD and TDD), and/or allow the use of carrier aggregation (CA) at a layer. In an example, Multiple carriers may be deployed at both macro and small cell layers.

Radio link monitoring (RLM) is a procedure in LTE. It may be used to monitor the radio link conditions so that appropriate actions may be taken if a radio link failure (RLF) occurs. With DC, a UE may perform RLM on two cells: one in the MCG (e.g., the primary cell, PCell) and one in the SCG (e.g., the primary secondary cell, PSCell). In an example, upon detection of an RLF in the SeNB, the UE may not trigger the RRC connection re-establishment procedure because the RRC connection toward the MeNB may still be maintained even if the radio link to the SeNB fails.

In an example, network-controlled UE-assisted mobility and cell management may apply to DC. In an example, the RRC may reside in the MeNB and the MeNB may maintain the UE RRM measurement configuration and may act according to the received measurement reports. In an example, as in CA, the UE may be configured to perform measurements from its serving and surrounding cells. In an example, RRM measurements with DC may be largely unaffected compared to CA, except for modifications to RRM measurement events A3 (neighbor becomes offset better than PCell) and A5 (PCell becomes worse than threshold #1 and neighbor becomes better than threshold #2). With DC, the PScell may also be used for those events.

In an example, LAA cells may be used in dual connectivity configuration. In an example, SeNB may be configured with both licensed and LAA cells. In an example, SeNB may be configured with LAA only cells.

In an example, when an SeNB is deployed and configured with both licensed and LAA carriers, the PSCell may be configured from licensed cells. In an example, PSCell may be configured on a licensed or LAA cell. For LAA cells, the channel availability for downlink and uplink transmission may be subject to regulatory requirements such as maximum channel occupancy and listen before talk (LBT). When network is highly loaded, the LAA carrier which may be configured as PSCell may experience long periods of unavailability and that may impact system performance.

The unlicensed/LAA cells may have unpredictable performance due to sharing the spectrum with other cellular and/or non-cellular radio transmissions. In a dual connectivity architecture, LAA cells may be configured for communication of a wireless device with a secondary base station. The wireless device and the secondary base station may need to perform LBT procedure before transmitting on LAA cells. The LAA cells may need to be reconfigured (e.g., reconfiguration of LBT parameters, etc.) based on channel conditions, the success or failure rate of LBT, LBT statistics and/or other criteria. In an example, an LAA cell may be configured as a PSCell for the wireless device. The PSCell carriers important control information or may be used for contention-based random access. Proper operation of the PSCell is critical for performance of the wireless device. The reconfiguration and/or change of the PSCell may be needed for proper operation of the wireless device. The legacy procedures for wireless device reporting of information related to channel conditions and/or procedure success/failure on LAA cells and the actions by the primary base station in response to receiving this information need to be enhanced to improve the performance of dual connectivity when LAA cells are configured. Example embodiments, enhance the performance of dual connectivity (for example, throughput) by minimizing the negative performance impacts due to unlicensed nature of operation of the LAA cells.

In an example embodiment, a UE configured with dual connectivity may report statistics/indications regarding PSCell during a configured period, the statistics may be related to events such as LBT success, LBT failure, loading, HARQ ACK/NACK statistics, NACK reception, procedure failure due to unsuccessful LBT, e.g., random access failure due to LBT (e.g., excessive preamble transmission failure due to LBT, excessive RAR transmission failure due to LBT (e.g., indicated to the UE by SeNB), excessive Msg3 transmission failure due to LBT, excessive Msg4 transmission failure due to LBT (e.g., indicated to the UE by SeNB), etc.), PUCCH/UCI transmission failure due to LBT, etc., to the MeNB. In an example, the UE configured with dual connectivity may report the statistics/indications or a relevant subset of statistics/indications (e.g., LBT success and/or failure rate, excessive LBT failure indication, HARQ ACK/NACK information, excessive NACK reception, loading, etc.) for the LAA cells belonging to the SCG and/or its configured/active LAA cells to the MeNB. The reported statistics/indications may indicate the number of one or more events during a configured period. Example statistics and events are provided.

Excessive events may imply that the number of events is above a configured threshold for the one or more events, e.g., during a configured period. In an example, the UE may receive an RRC message comprising configuration parameters indicating the period and/or the threshold for one or more events. In an example, the indication may provide one or more counter value indicating a number of one or more events and/or event types.

In an example, excessive events may imply a configured number or percentage of events during the past configured transmissions and/or transmission attempts. The number UE may receive a RRC message comprising configuration parameters indicating the number and/or percentage values.

In an example, the statistics/indications that the UE reports to the MeNB may be included in an RRC message (e.g., the SCGFailureInformation RRC message). In an example, the Failure Type field in the RRC message may indicate LBT failure if a transmission fails due to LBT. In an example, the Failure Type field in the RRC message may indicate excessive LBT failure if a threshold number of consecutive LBT failures take place. In an example, the threshold value may be configured. In an example, the threshold value may be configured with RRC. In an example, the FailureType field in the RRC message may indicate excessive LBT failure if at least P attempts (or P percentage) of the last L LBT attempts fail. In an example, the P and L values may be configured for the UE. In an example, the P and the L values may be RRC configured.

In an example, a failure type in an RRC message may indicate unsuccessful completion of a procedure due to LBT. In an example, a failure type in the RRC message may indicate a random access failure due to LBT and/or excessive LBT. In an example, a failure type in the RRC message may indicate excessive preamble transmission failure due to LBT. In an example, a failure type in the RRC message may indicate excessive RAR transmission failure due to LBT (e.g., indicated to the UE by SeNB). In an example, a failure type in the RRC message may indicate excessive Msg3 transmission failure due to LBT. In an example, a failure type in the RRC message may indicate excessive Msg4 transmission failure due to LBT (e.g., indicated to the UE by the SeNB).

In an example, a failure type in the RRC message may indicate PUCCH and/or UCI transmission failure and/or excessive failure due to LBT. In an example, a failure type in the RRC message may indicate HARQ ACK/NACK transmission failure and/or excessive failure due to LBT. In an example, other statistics/indications (e.g., loading, HARQ ACK/NACK information, excessive NACK reception, etc.) may be reported to the MeNB using RRC.

In an example embodiment, UE may transmit an RRC message other than SCGFailureInformation or use other fields to send the statistics/indications for LAA cells and/or PSCell to the MeNB. In an example embodiment, MeNB may start the MeNB initiated SeNB Modification procedure using the information in the SCGFailureInformation message or the RRC message containing the UE report. In an example, MeNB may trigger PSCell change using the MeNB initiated SeNB Modification procedure.

In an example, MeNB may indicate the cause of SeNB modification in a cause field of the SENB MODIFICATION REQUEST message. In an example, the cause may indicate one or more of the example reasons for SCG configuration change as described in the specification. In an example, the cause may indicate SCG configuration change due to excessive LBT in one or more cells of the SCG. In an example, the cause may indicate SCG configuration change due to unsuccessful completion of a procedure due to excessive LBT in one or more cells of the SCG. In an example, the cause may indicate PSCell change due to excessive LBT in current PSCell. In an example, cause may indicate PSCell change due to random access failure due to excessive LBT. In an example, cause may indicate PSCell change due to unsuccessful completion of a procedure due to excessive LBT. In an example, the cause may indicate an issue related to an LAA cell.

In an example, a method may be used that comprises: receiving by a wireless device, configuration parameters of a plurality of cells. The plurality of cells may comprise a primary cell group and a secondary cell group (SCG). The SCG may comprise one or more licensed assisted access (LAA) cells. The method may comprise transmitting, by the wireless device to a master base station (MeNB), at least one first message comprising one or more information elements. The one or more information elements may comprise one or more indications related to at least one of success or failure of listen-before-talk (LBT) on at least one of the one or more LAA cells. The method may comprise transmitting, by the MeNB to the SeNB, at least one second message to modify at least a configuration parameter of the at least one of the one or more LAA cells. In an example, the one or more LAA cells may comprise a primary secondary cell (PSCell). In an example, the at least one message may comprise SCGFailureIndication RRC message. In an example, the at least one LAA cell may comprise the PSCell. In an example, the at least one second message may be configured to cause a PSCell change in the SCG. In an example, the one or more indications may comprise one or more indications related to one or more unsuccessful completion of a procedure due to LBT. In an example, the one or more indications may comprise one or more indications related to random access failure. In an example, the one or more indications may comprise one or more indications related to uplink control information (UCI) transmission failure. In an example, the one or more indications may comprise one or more indications related to excessive LBT. In an example, the at least one second message may comprise a cause field that indicates the reason to modify at least a configuration parameter of the at least one of the one or more LAA cells is due to LBT in one or more cells of the SCG.

In an example embodiment, a UE configured with dual connectivity may report (e.g. in a MAC and/or RRC message) statistics/indications regarding PSCell, such as LBT success and/or failure rate, excessive LBT failure, loading, HARQ ACK/NACK information, procedure failure due to unsuccessful LBT, e.g., random access failure due to LBT (e.g., excessive preamble transmission failure due to LBT, excessive Msg3 transmission failure due to LBT, etc.), PUCCH/UCI transmission failure due to LBT, etc., to the SeNB. In an example, the UE configured with dual connectivity may report the statistics/indications or a relevant subset of statistics/indications (e.g., LBT success and/or failure rate, excessive LBT failure indication, HARQ ACK/NACK information, loading, etc.) for the LAA cells belonging to the SCG and/or its configured/active LAA cells to the SeNB.

In an example, the statistics/indications that the UE reports to the SeNB may be included in an RRC message. In an example, a FailureType field in the RRC message may indicate LBT failure if a transmission fails due to LBT. In an example, the FailureType field in the RRC message may indicate excessive LBT failure if a threshold number of consecutive LBT failures take place. In an example, the threshold value may be configured. In an example, the threshold value may be configured with RRC. In an example, the Failure Type field in the RRC message may indicate excessive LBT failure if at least P attempts (or P percentage) of the last L LBT attempts fail. In an example, the P and L values may be configured for the UE. In an example, the P and the L values may be RRC configured.

In an example, a failure type in the RRC message may indicate a procedure failure due to LBT. In an example, a failure type in the RRC message may indicate a random access failure due to LBT and/or excessive LBT. In an example, a failure type in the RRC message may indicate excessive preamble transmission failure due to LBT. In an example, a failure type in the RRC message may indicate excessive Msg3 transmission failure due to LBT.

In an example, a failure type in the RRC message may indicate PUCCH and/or UCI transmission failure and/or excessive failure due to LBT. In an example, a failure type in the RRC message may indicate HARQ ACK/NACK transmission failure and/or excessive failure due to LBT. In an example, other statistics/indications (e.g., loading, HARQ ACK/NACK information, etc.) may be reported to the SeNB using RRC.

In an example, the UE may transmit the failure type and/or the statistics/indications to the SeNB using a MAC CE. In an example, the UE may report other statistics (e.g., loading, HARQ ACK/NACK information, excessive LBT, etc.) to the SeNB using RRC or MAC CE.

In an example embodiment, SeNB may start the SeNB initiated SeNB Modification procedure using the statistics/indications and/or failure type information reported by the UE. In an example, the SeNB may consider the statistics/indications reported by the UE of the PSCell and/or other LAA cells and its own measurements and/or statistics before starting the SeNB initiated SeNB Modification procedure. In an example, the SeNB may indicate the failure type (e.g., failure due to excessive LBT, procedure (e.g., random access, UCI transmission, etc.) failure due to LBT, etc.) in the SENB MODIFICATION REQUIRED X2 message. In an example, the SeNB may indicate the failure type and/or the cause for SeNB modification (e.g., failure due to excessive LBT, procedure failure due to LBT, etc.) in the cause field of SENB MODIFICATION REQUIRED X2 message. In an example, SeNB may trigger PSCell change using the SeNB initiated SeNB Modification procedure.

In an example, SeNB may indicate the cause of SeNB modification in a cause field of the SENB MODIFICATION REQUIRED message. In an example, the cause may indicate one or more of the example reasons for SCG configuration change as described in the specification. In an example, the cause may indicate SCG configuration change due to excessive LBT in one or more cells of the SCG. In an example, the cause may indicate SCG configuration change due to unsuccessful completion of a procedure due to excessive LBT in one or more cells of the SCG. In an example, the cause may indicate PSCell change due to excessive LBT in current PSCell. In an example, cause may indicate PSCell change due to random access failure due to excessive LBT. In an example, cause may indicate PSCell change due to unsuccessful completion of a procedure due to excessive LBT. In an example, the cause may indicate an issue related to an LAA cell.

In an example, a method may be used that comprises: receiving by a wireless device, configuration parameters of a plurality of cells. The plurality of cells may comprise a primary cell group and a secondary cell group (SCG). The SCG may comprise one or more licensed assisted access (LAA) cells. The method may comprise transmitting by the wireless device to a secondary base station (SeNB), at least one first message comprising one or more information elements related to transmissions on one or more cells of the one or more LAA cell. The method may comprise transmitting, by the SeNB to an MeNB, at least one second message to modify at least a configuration parameter of at least one of the one or more LAA cells. In an example, the one or more LAA cells may comprise a primary secondary cell (PSCell). In an example, the at least one first message may comprise an RRC message. In an example, the at least one first message may comprise a MAC control element (MAC CE). In an example, the at least one second message may be configured to cause a PSCell change in the SCG. In an example, the one or more information elements may comprise one or more indications related to at least one of success or failure of listen-before-talk (LBT) on at least one cell of the one or more LAA cell. In an example, the one or more indications may comprise one or more indications related to one or more procedure failure due to LBT. In an example, the one or more procedure failure may comprise random access failure. In an example, the one or more procedure failure may comprise uplink control information (UCI) transmission failure. In an example, the one or more indications may comprise one or more indications related to excessive LBT. In an example, the at least one second message may comprise a cause field that may indicate the reason to modify at least a configuration parameter of the at least one of the one or more LAA cells is due to LBT in one or more cells of the SCG.

In an example embodiment, the SeNB may report the statistics of PSCell, such as LBT success and/or failure rate, excessive LBT failure, loading, HARQ ACK/NACK information, excessive NACK reception, procedure failure due to unsuccessful LBT, e.g., random access failure due to LBT (e.g., excessive preamble transmission failure due to LBT, excessive RAR transmission failure due to LBT, excessive Msg3 transmission failure due to LBT, excessive Msg4 transmission failure due to LBT, etc.), PUCCH/UCI transmission failure due to LBT, etc., to the MeNB. In an example, the SeNB may report the statistics or a relevant subset of statistics (e.g., LBT success and/or failure rate, excessive LBT failure indication, HARQ ACK/NACK information, loading, etc.) for the LAA cells belonging to the SCG to the MeNB. In an example, the SeNB may receive the statistics of the PSCell and/or other LAA cells from the UE and may include both UL and DL statistics in its report to the MeNB. In an example, the SeNB may report the statistics to the MeNB using a X2 message. In an example, the SeNB may include the statistics in the SENB MODIFICATION REQUIRED message and report them to the MeNB. In an example, another X2 message (e.g., LOAD INFORMA-TION, RESOURCE STATUS UPDATE, etc.) may be used to report the statistics to the MeNB. In an example, MeNB may consider the statistics in the SeNB report and may initiate an MeNB initiated SeNB Modification procedure. In an example, MeNB may consider the statistics in the SeNB report and may initiate an MeNB initiated SeNB Modifica-tion procedure and trigger PSCell change.

In an example, a method may be used that comprises: receiving by a wireless device, configuration parameters of a plurality of cells. The plurality of cells may comprise a primary cell group and a secondary cell group (SCG). The SCG may comprise one or more licensed assisted access (LAA) cells. The method may comprise transmitting, by a secondary base station (SeNB) to a primary base station (MeNB), at least one first message comprising one or more information elements, the one or more information elements comprising one or more indications related to at least one of success or failure of listen-before-talk (LBT) on at least one of the one or more LAA cells. The method may comprise transmitting, by the MeNB to the SeNB, at least one second message to modify at least a configuration parameter of at least one of the one or more LAA cells. In an example, the one or more LAA cells comprises a primary secondary cell (PSCell). In an example, the at least one first message comprises a SeNB modification required message. In an example, the at least one first message comprises a load information message. In an example, the at least one first message comprises a resource status update message. In an example, the at least one second message is configured to cause a PSCell change in the SCG. In an example, the one or more indications comprises one or more indications related to one or more unsuccessful completion of a proce-dure due to LBT. In an example, the one or more indications comprises one or more indications related to random access failure. In an example, the one or more indications com-prises one or more indications related to uplink control information (UCI) transmission failure. In an example, the one or more indications comprises one or more indications related to excessive LBT.

Figure 21:
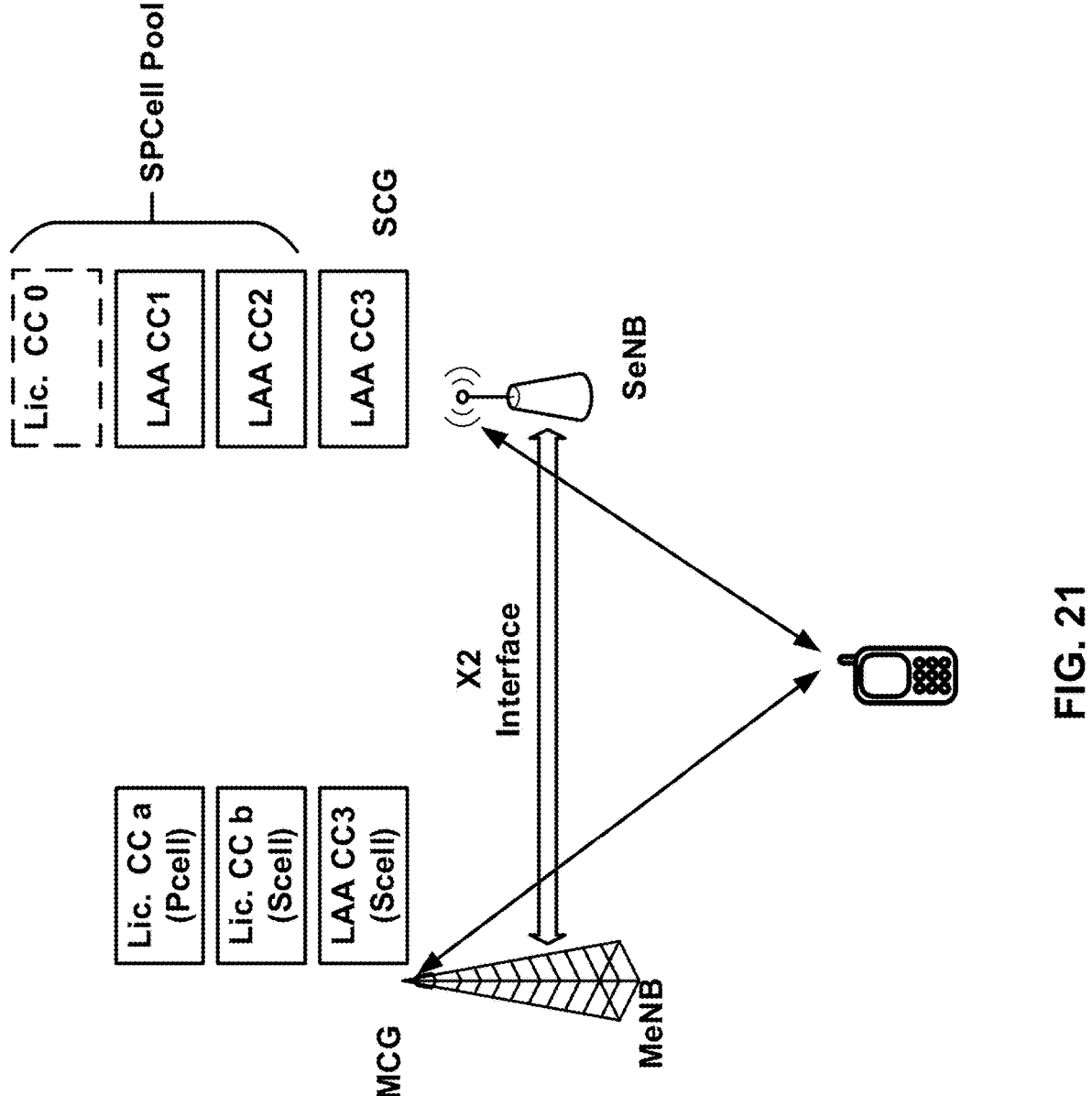
FIG. 21 is an example dual connectivity architecture with LAA cells as per an aspect of an embodiment of the present disclosure.

In an example embodiment, for a UE configured with dual connectivity, a PSCell pool may be configured as a set of candidate cells from which the PSCell may be selected. In an example, the PSCell pool may comprise LAA cells. In an example, the PSCell pool may comprise licensed cells and LAA cells (e.g., see an example in FIG. 21).

In an example, the MeNB may configure the PSCell pool for a UE when the MeNB configures dual connectivity for the UE (e.g., using RRCConnectionReconfiguration RRC message). In an example, when the MeNB starts the SeNB addition procedure, the PSCell pool may be included in the SCG-Config information element and transmitted by the SeNB to the MeNB (e.g., using SENB ADDITION REQUEST ACKNOWLEDGE message) and the MeNB may configure the PSCell pool for the UE using the RRC-ConnectionReconfiguration RRC message. In an example, the PSCell pool may be configured by including the list of PSCell candidates in the PSCellToAddMod information element. In an example, another information element may be used to configure the PSCell pool. In an example, the information element configuring the PSCell pool may be included in SCG-ConfigPartSCG information element. In an example, the set of candidate cells in the PSCell pool may be configured by including one or more of sCellIndex, physCellId, dl-CarrierFreq or other identifiers for cells in the PSCell pool.

In an example, the MeNB may configure/reconfigure the PSCell pool for the UE (e.g., using RRCConnectionRecon-figuration RRC message) considering assistance information from the UE and/or SeNB. In an example, the assistance information may be in form of measurement report and/or radio link failure report and/or statistics (LBT success and/or failure rate, excessive LBT failure, loading, HARQ ACK/NACK information, excessive NACK reception, procedure failure due to unsuccessful LBT, e.g., random access failure due to LBT (e.g., excessive preamble transmission failure due to LBT, excessive RAR transmission failure due to LBT, excessive Msg3 transmission failure due to LBT, excessive Msg4 transmission failure due to LBT, etc.), PUCCH/UCI transmission failure due to LBT, etc.) of cells in the PSCell pool and/or other cells. In an example, the SeNB may determine the updated PSCell pool and may indicate the updated the PSCell pool (e.g., by including in the SCG-Config information element). In an example, the SeNB may indicate the updated PSCell pool (e.g., by including in the SCG-Config information element) with SeNB initiated SeNB modification procedure using SENB MODIFICA-TION REQUIRED message. In an example, SeNB may include an updated PSCell pool in the SCG-Config infor-mation element and transmit to the MeNB using SENB MODIFICATION REQUEST ACKNOWLEDGE message when MeNB starts MeNB initiated SeNB Modification procedure.

In an example, a single PSCell may be configured by the MeNB when the dual connectivity is configured for a UE and the PSCell pool may be later configured/reconfigured by the MeNB considering, for example, the assistance infor-mation from the SeNB and/or the UE.

In an example, a single PSCell may be configured by the MeNB when the dual connectivity is configured for a UE and the PSCell pool may be later configured by the SeNB, considering the assistance information from the UE and/or its own measurements/statistics. In an example, the SeNB may indicate the PSCell pool to the MeNB and/or the UE after it determines the PSCell pool.

In an example, the PSCell pool may be set through O&M and may be common across the UEs. In an example, when PSCell pool is configured for a UE, the PSCell pool may be signaled to the MeNB and/or SeNB if MeNB/SeNB do not have the PSCell pool information. In an example, the PSCell pool may be cell-specific and may common for UEs within a cell. In an example, the PSCell pool may be included in the radioResourceConfigCommonPSCell information element. In an example, a cell within the PSCell pool may have its dedicated RRC configuration.

In an example, the RRC configuration may be common across cells within a PSCell pool. In an example, the PSCell pool may be UE-specific.

In an example, a method may be used that comprises: transmitting by a master base station (MeNB) to a secondary base station (SeNB), at least one first message comprising a request for modification of a secondary cell group (SCG). The method may comprise transmitting by the SeNB to the MeNB at least one second message comprising an acknowl-edgement of the request, the at least one second message comprising an information element, the information element comprising configuration parameters of a primary secondary cell (PSCell) pool, the PSCell pool comprising candidate cells for a PSCell. The method may comprise receiving by a wireless device, a radio resource configuration (RRC) message comprising the PSCell pool.

In an example, a method may be used that comprises: transmitting by a secondary base station (SeNB) to a master base station (MeNB), at least one first message comprising an information element, the information element may comprise configuration parameters of a primary secondary cell (PSCell) pool, the PSCell pool may comprise candidate cells for a PSCell. The method may comprise receiving by a wireless device, a radio resource configuration (RRC) message comprising the PSCell pool.

Figure 22:
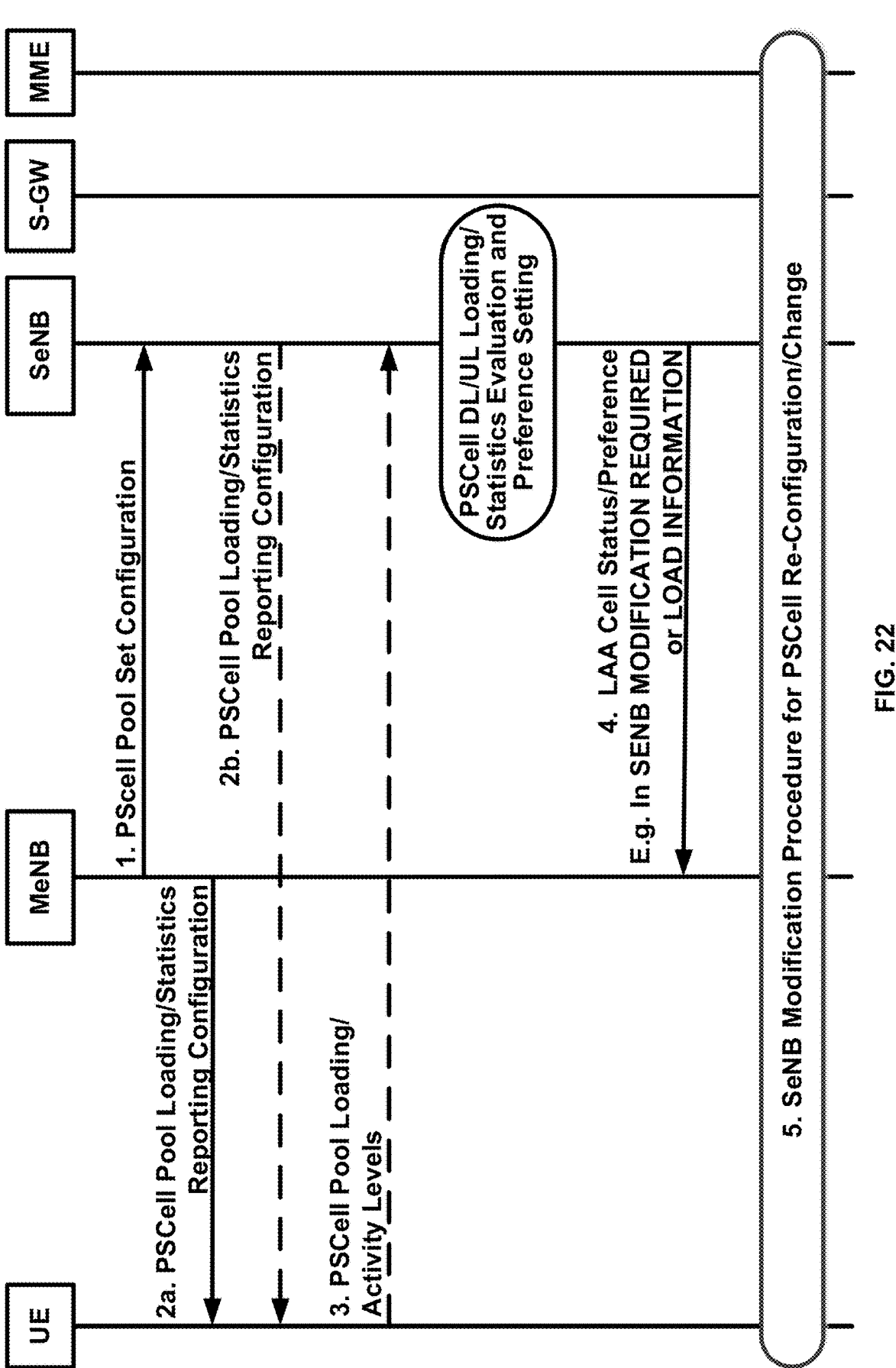
FIG. 22 is an example PSCell change procedure as per an aspect of an embodiment of the present disclosure.

In an example embodiment, the SeNB may report to the MeNB the statistics/measurements of cells within the PSCell pool and/or its preference of cell(s) within the PSCell pool as the PSCell and/or the sorted preference of cells within the PSCell pool as the PSCell. An example, procedure is shown in FIG. 22. The preference may be set based on statistics or measurements on LAA cells and/or other cells within the PSCell pool such as LBT success and/or failure rate, load-ing, HARQ ACK/NACK information, procedure failure due to unsuccessful LBT, e.g., random access failure due to LBT (e.g., excessive preamble transmission failure due to LBT, excessive RAR transmission failure due to LBT, excessive Msg3 transmission failure due to LBT, excessive Msg4 transmission failure due to LBT, etc.), PUCCH/UCI trans-mission failure due to LBT, etc.

In an example, SeNB may consider the LBT failure/success rate in downlink, UE measurements on signal levels and/or LBT failure/success rate in uplink, the radio link failure report, procedure failure and the cause (e.g., failed LBT) or other parameters together, or individually, to deter-mine a sorted list of preferred cells and report to MeNB. In an example the MeNB or SeNB may direct the UE to make measurement and report assisting data to evaluate the LAA cell or licensed cells to be used as PSCell. In an example, a UE configured for such measurements, may collect and report its measurement to MeNB and/or SeNB. In an example, the reports may be configured as periodic and/or event triggered reporting.

In an example embodiment, the SeNB may inform the MeNB of the statistics and/or preference of its different LAA cells and/or licensed cells, e.g. from the PSCell pool, and the MeNB may determine the best cell to configure as PSCell. In an example, the UE may send its feedback reports to the SeNB. In an example the SeNB may combine the feedback from UE with its own assessment of different cells within PSCell pool before sending to MeNB for decision and execution of PSCell change procedure. In an example, the SeNB report to the MeNB may be using a X2 message. In an example, the X2 message may be the SENB MODIFI-CATION REQUIRED message. In an example, the X2 message may be LOAD INFORMATION. In an example, the X2 message may be RESOURCE STATUS UPDATE message. Other example X2 messages may be used.

In an example, a method be used that comprises: receiving by a wireless device, at least one first message, comprising configuration parameters of a plurality of cells, the plurality of cells comprising a primary cell group and a secondary cell group (SCG), the SCG comprising one or more licensed assisted access (LAA) cells, the at least one first message comprising configuration parameters of a primary secondary cell (PSCell) pool, the PSCell pool comprising the candidate cells for PSCell. The method may comprise transmitting, by a secondary base station (SeNB) to a master base station (MeNB), at least one second message comprising a sorted preference of cells within the PSCell pool as the PSCell. The method may comprise transmitting by the MeNB to the SeNB, at least one third message to modify at least a configuration parameter of the at least one of the one or more LAA cells. In an example, the sorted preference of cells may comprise the preferred cell as PSCell. In an example, the at least one message comprises an SeNB modification required message. In an example, the at least one message comprises a load information message. In an example, the at least one message comprises a resource status update message.

In an example embodiment, for a UE configured with dual connectivity, a PSCell pool may be configured as a set of candidate cells from which the PSCell may be selected. In an example, the PSCell pool may comprise LAA cells. In an example, the PSCell pool may comprise licensed cells and LAA cells (e.g., see an example in FIG. 21).

In an example, the MeNB may configure the PSCell pool for a UE when the MeNB configures dual connectivity for the UE (e.g., using RRCConnectionReconfiguration RRC message). In an example, when the MeNB starts the SeNB addition procedure, the PSCell pool may be included in the SCG-Config information element and transmitted by the SeNB to the MeNB (e.g., using SENB ADDITION REQUEST ACKNOWLEDGE message) and the MeNB may configure the PSCell pool for the UE using the RRC-ConnectionReconfiguration RRC message. In an example, the PSCell pool may be configured by including the list of PSCell candidates in the PSCellToAddMod information element. In an example, another information element may be used to configure the PSCell pool. In an example, the information element configuring the PSCell pool may be included in SCG-ConfigPartSCG information element. In an example, the set of candidate cells in the PSCell pool may be configured by including one or more of sCellIndex, physCellId, dl-CarrierFreq or other identifiers for cells in the PSCell pool.

In an example, the MeNB may configure/reconfigure the PSCell pool for the UE (e.g., using RRCConnectionRecon-figuration RRC message) considering assistance information from the UE and/or SeNB. In an example, the assistance information may be in form of measurement report and/or radio link failure report and/or statistics (LBT success and/or failure rate, excessive LBT failure, loading, HARQ ACK/NACK information, excessive NACK reception, procedure failure due to unsuccessful LBT, e.g., random access failure due to LBT (e.g., excessive preamble transmission failure due to LBT, excessive RAR transmission failure due to LBT, excessive Msg3 transmission failure due to LBT, excessive Msg4 transmission failure due to LBT, etc.), PUCCH/UCI transmission failure due to LBT, etc.) of cells in the PSCell pool and/or other cells. In an example, the SeNB may determine the updated PSCell pool and may indicate the updated the PSCell pool (e.g., by including in the SCG-Config information element). In an example, the SeNB may indicate the updated PSCell pool (e.g., by including in the SCG-Config information element) with SeNB initiated SeNB modification procedure using SENB MODIFICA-TION REQUIRED message. In an example, SeNB may include an updated PSCell pool in the SCG-Config infor-mation element and transmit to the MeNB using SENB MODIFICATION REQUEST ACKNOWLEDGE message when MeNB starts MeNB initiated SeNB Modification procedure.

In an example, a single PSCell may be configured by the MeNB when the dual connectivity is configured for a UE and the PSCell pool may be later configured/reconfigured by the MeNB considering, for example, the assistance information from the SeNB and/or the UE.

In an example, a single PSCell may be configured by the MeNB when the dual connectivity is configured for a UE and the PSCell pool may be later configured by the SeNB, considering the assistance information from the UE and/or its own measurements/statistics. In an example, the SeNB may indicate the PSCell pool to the MeNB and/or the UE after it determines the PSCell pool.

In an example, the PSCell pool may be set through O&M and may be common across the UEs. In an example, when PSCell pool is configured for a UE, the PSCell pool may be signaled to the MeNB and/or SeNB if MeNB/SeNB do not have the PSCell pool information. In an example, the PSCell pool may be cell-specific and may common for UEs within a cell. In an example, the PSCell pool may be included in the radioResourceConfigCommonPSCell information element. In an example, a cell within the PSCell pool may have its dedicated RRC configuration. In an example, the RRC configuration may be common across cells within a PSCell pool. In an example, the PSCell pool may be UE-specific.

Figure 23:
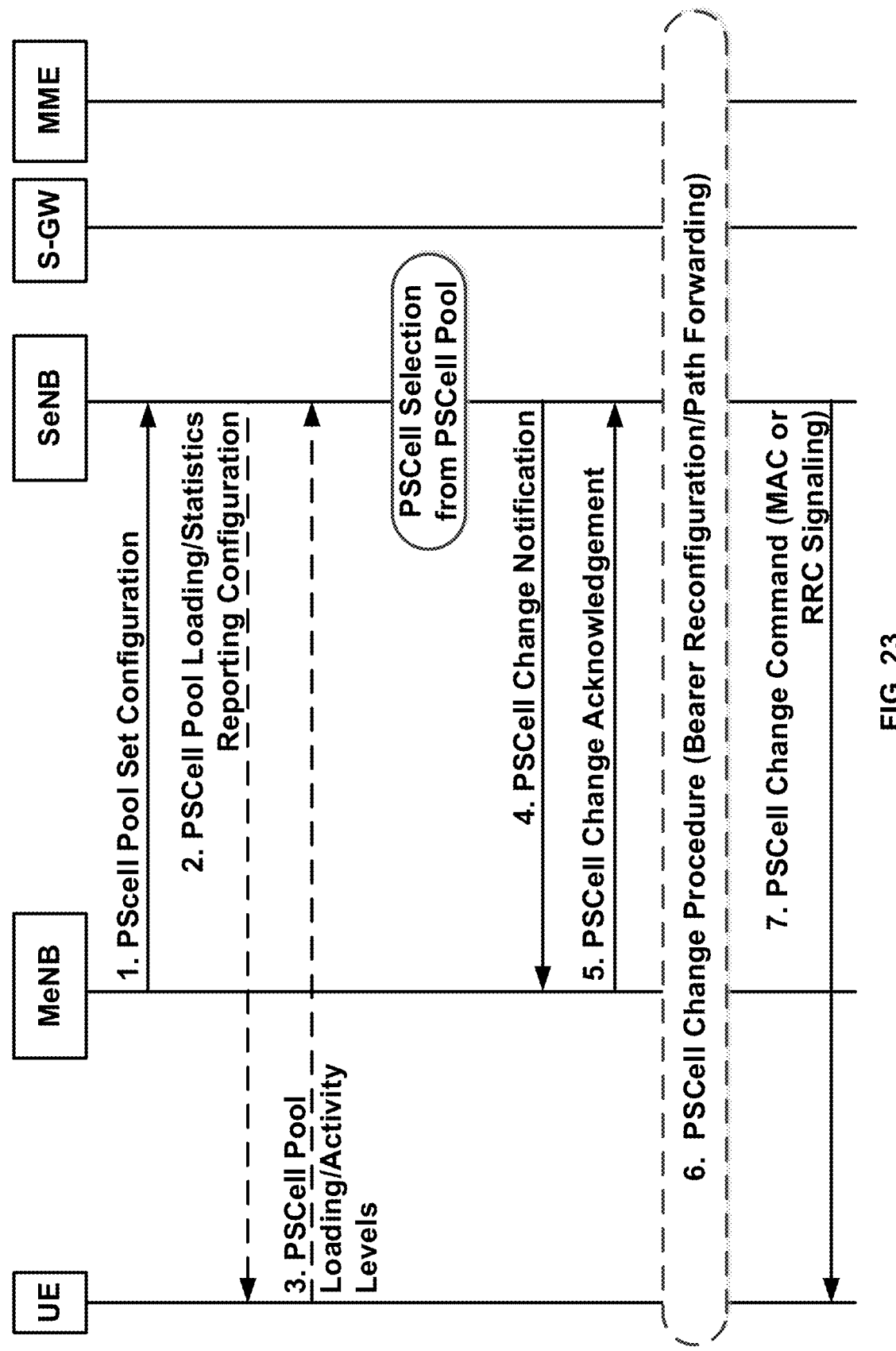
FIG. 23 is an example PSCell change procedure as per an aspect of an embodiment of the present disclosure.

In an example embodiment, the SeNB may select and/or change the PSCell within the PSCell pool. An example procedure is shown in FIG. 23. The selection/change of PSCell by the SeNB may be based on statistics or measurements on LAA cells and/or other cells within the PSCell pool such as LBT success and/or failure rate, loading, HARQ ACK/NACK information, procedure failure due to unsuccessful LBT, e.g., random access failure due to LBT (e.g., excessive preamble transmission failure due to LBT, excessive RAR transmission failure due to LBT, excessive Msg3 transmission failure due to LBT, excessive Msg4 transmission failure due to LBT, etc.), PUCCH/UCI transmission failure due to LBT, etc. In an example, the UE may provide SeNB with assistance information such as signal measurement, LBT success/failure rate, HARQ ACK/NACK, loading, procedure failure for example due to LBT, etc. of cells in the PSCell pool and/or other cells to help SeNB select a PSCell from the PSCell Pool for UE. In an example, SeNB may consider the UE assistance information and/or its own measurements/statistics to select or change the PSCell. In an example, the SeNB may select or change the PSCell from the PSCell Pool and inform UE of such change. In an example, SeNB may inform MeNB about such change of PScell, e.g. via an X2 message. In an example, the UE may inform MeNB of a change in the PSCell within the PSCell Pool (e.g., with an RRC message or a MAC CE). In an example, the SeNB may inform the UE of selected PSCell from the pool using a MAC CE. In an example, the selected PSCell may be subject to preconfigured parameters set by M/SeNB. In an example, the SeNB may use RRC signaling to inform the UE of the PSCell change.

In an example, change of PSCell may involve signaling with MME and SGW. In an example, only bearer reconfiguration signaling with MME and SGW may be performed while other RRC configurations may be maintained from last PSCell. In an example, RRC level configurations as well as S1-MME and S1-U configurations may be maintained when another PSCell within PSCell Pool is selected. In this case the physical layer changes of LAA cell due to PSCell change by SeNB may be transparent to CN.

In an example embodiment, for a UE configured with dual connectivity, a PSCell pool may be configured as a set of candidate cells from which the PSCell may be selected. In an example, the PSCell pool may comprise LAA cells. In an example, the PSCell pool may comprise licensed cells and LAA cells.

In an example, the MeNB may configure the PSCell pool for a UE when the MeNB configures dual connectivity for the UE (e.g., using RRCConnectionReconfiguration RRC message). In an example, when the MeNB starts the SeNB addition procedure, the PSCell pool may be included in the SCG-Config information element and transmitted by the SeNB to the MeNB (e.g., using SENB ADDITION REQUEST ACKNOWLEDGE message) and the MeNB may configure the PSCell pool for the UE using the RRCConnectionReconfiguration RRC message. In an example, the PSCell pool may be configured by including the list of PSCell candidates in the PSCellToAddMod information element. In an example, another information element may be used to configure the PSCell pool. In an example, the information element configuring the PSCell pool may be included in SCG-ConfigPartSCG information element. In an example, the set of candidate cells in the PSCell pool may be configured by including one or more of sCellIndex, physCellId, dl-CarrierFreq or other identifiers for cells in the PSCell pool.

In an example, the MeNB may configure/reconfigure the PSCell pool for the UE (e.g., using RRCConnectionReconfiguration RRC message) considering assistance information from the UE and/or SeNB. In an example, the assistance information may be in form of measurement report and/or radio link failure report and/or statistics (LBT success and/or failure rate, excessive LBT failure, loading, HARQ ACK/NACK information, excessive NACK reception, procedure failure due to unsuccessful LBT, e.g., random access failure due to LBT (e.g., excessive preamble transmission failure due to LBT, excessive RAR transmission failure due to LBT, excessive Msg3 transmission failure due to LBT, excessive Msg4 transmission failure due to LBT, etc.), PUCCH/UCI transmission failure due to LBT, etc.) of cells in the PSCell pool and/or other cells. In an example, the SeNB may determine the updated PSCell pool and may indicate the updated the PSCell pool (e.g., by including in the SCG-Config information element). In an example, the SeNB may indicate the updated PSCell pool (e.g., by including in the SCG-Config information element) with SeNB initiated SeNB modification procedure using SENB MODIFICATION REQUIRED message. In an example, SeNB may include an updated PSCell pool in the SCG-Config information element and transmit to the MeNB using SENB MODIFICATION REQUEST ACKNOWLEDGE message when MeNB starts MeNB initiated SeNB Modification procedure.

In an example, a single PSCell may be configured by the MeNB when the dual connectivity is configured for a UE and the PSCell pool may be later configured/reconfigured by the MeNB considering, for example, the assistance information from the SeNB and/or the UE. In an example, a single PSCell may be configured by the MeNB when the dual connectivity is configured for a UE and the PSCell pool may be later configured by the SeNB, considering the assistance information from the UE and/or its own measurements/statistics. In an example, the SeNB may indicate the PSCell pool to the MeNB and/or the UE after it determines the PSCell pool.

In an example, the PSCell pool may be set through operation and maintenance (O&M) and may be common across the UEs. In an example, when PSCell pool is configured for a UE, the PSCell pool may be signaled to the MeNB and/or SeNB if MeNB/SeNB do not have the PSCell pool information. In an example, the PSCell pool may be cell-specific and may common for UEs within a cell. In an example, the PSCell pool may be included in the radioRe-sourceConfigCommonPSCell information element. In an example, a cell within the PSCell pool may have its dedi-cated RRC configuration.

In an example, the RRC configuration may be common across cells within a PSCell pool. In an example, the PSCell pool may be UE-specific. In an example embodiment, the UE may select and/or change the PSCell from the PSCell pool based on rules set by SeNB and/or MeNB. In an example, the UE may select and/or change the PSCell based on its measurements on and statistics of cells within the PSCell pool and/or other signals (e.g., LBT success/failure rate, loading, HARQ ACK/NACK, procedure failure for example due to LBT, etc.). In an example, the UE may signal its choice of PSCell to the SeNb and/or MeNB. In an example the UE may indicate its choice to the MeNB and/or SeNB with an RRC signaling or MAC CE.

According to various embodiments, a device (such as, for example, a wireless device, an off-network wireless device, a base station, and/or the like), may comprise, for example, one or more processors and memory. The memory may store instructions that, when executed by the one or more processors, cause the device to perform a series of actions. Embodiments of example actions are illustrated in the accompanying figures and specification. Features from various embodiments may be combined to create yet further embodiments.

FIG. 24 is an example flow diagram as per an aspect of an embodiment of the present disclosure. At 2410, a first base station may transmit configuration parameters of a plurality of cells to a wireless device. The configuration parameters may comprise: a first cell group comprising a first plurality of cells for communication with the first base station; and a second cell group comprising a second plurality of cells for communication with a second base station. The second cell group may comprise one or more licensed assisted access (LAA) cells. At 2420, the first base station may receive from the wireless device at least one first message comprising a first information element (IE). A value of the first IE may be based on a success or a failure of a listen before talk procedure on at least one first LAA cell of the one or more LAA cells. At 2430, the first base station may transmit to the second base station, in response to receiving the at least one first message, at least one second message indicating modi-fication of at least one configuration parameter of at least one second LAA cell of the one or more LAA cells. At 2440, the first base station may receive, from the second base station, at least one third message confirming the modification of the at least one configuration parameter.

According to an embodiment, the at least one first LAA cell may comprise a primary secondary cell (PSCell). According to an embodiment, the at least one second mes-sage may indicate change of a PSCell. According to an embodiment, the at least one first message may comprise a radio resource control (RRC) message. According to an embodiment, the first IE may indicate one of one or more failure types. According to an embodiment, the one or more failure types may comprise a failure of a procedure due to failure of the listen before talk procedure. According to an embodiment, the at least one second message may indicate the one of one or more failure types. According to an embodiment, the at least one second message may comprise an SeNB Modification Request message. According to an embodiment, the at least one third message may comprise an SeNB Modification Confirm message. According to an embodiment, the at least one first LAA cell may be the same as the at least one second LAA cell.

FIG. 25 is an example flow diagram as per an aspect of an embodiment of the present disclosure. At 2510, a wireless device may receive, by a from a first base station, configu-ration parameters of a plurality of cells comprising: a first cell group and a second cell group. The first cell group may comprise a first plurality of cells for communication with the first base station. The second cell group may comprise a second plurality of cells for communication with a second base station. The second cell group may comprise one or more licensed assisted access (LAA) cells. At 2520, the wireless device may perform at least one listen before talk (LBT) procedure on at least one first LAA cell of the one or more LAA cells. At 2530, the wireless device may transmit to the first base station, at least one first message comprising a first information element (IE). A value of the first IE may be based on a success or a failure of the at least one LBT procedure. At 2540, the wireless device may receive from the first base station, at least one second message indicating modification of at least one configuration parameter of at least one second LAA cell of the one or more LAA cells.

According to an embodiment, the one or more first LAA cells may comprise a primary secondary cell (PSCell). According to an embodiment, the at least one second mes-sage may indicate change of a PSCell. According to an embodiment, the at least one first message may comprise a radio resource control (RRC) message. According to an embodiment, the at least one first message may comprise an SCG Failure Information message. According to an embodi-ment, the first IE may indicate one of one or more failure types. According to an embodiment, the one or more failure types may comprise a failure of a procedure due to failure of at least one LBT procedure. According to an embodiment, the procedure, failed due to failure of the at least one LBT procedure, may comprise a random access procedure. According to an embodiment, the first IE may indicate statistics of an LBT failure on the at least one first LAA cell. According to an embodiment, the first IE may indicate excessive LBT failure on the at least one first LAA cell.

FIG. 26 is an example flow diagram as per an aspect of an embodiment of the present disclosure. At 2610, a first base station may transmit to a wireless device, configuration parameters of a plurality of cells comprising a first cell group and a second cell group. The wireless device may commu-nicate with the first base station employing the first cell group. The wireless device may communicate with a second base station employing the second cell group. The second cell group may comprise one or more licensed assisted access (LAA) cells. At 2620, the first base station may receive from a second base station, at least one first message indicating a request for modification of at least one configu-ration parameter of at least one cell of one or more LAA cells. At 2630, the first base station may transmit to the second base station, in response to receiving the at least one first message, at least one second message indicating modi-fication of the at least one configuration parameter. At 2640, the first base station may receive from the second base station, at least one third message confirming the modifica-tion of the at least one configuration parameter. According to an embodiment, the at least one first message may be in response to receiving at least one message, by the second base station from the wireless device, comprising at least one first information element (IE). A value of the IE may be based on a success or a failure of a listen before talk procedure on at least one first cell of the one or more LAA cells.

FIG. 27 is an example flow diagram as per an aspect of an embodiment of the present disclosure. At 2710, a first base station may transmit to wireless device, one or more messages. The one or more messages may comprise: configuration parameters of a plurality of cells, and configuration parameters of a primary secondary cell (PSCell) pool. The configuration parameters of a plurality of cells may comprise a first cell group and a second cell group. The wireless device may communicate with the first base station employing the first cell group. The wireless device may communicate with a second base station employing the second cell group. The second cell group may comprise one or more licensed assisted access (LAA) cells. The configuration parameters of the PSCell pool may comprise candidate cells for a PSCell. At 2720, the first station may receive from a second base station, at least one first message indicating a preference of one or more cells within the PSCell pool. At 2730, the first base station may transmit to the second base station, in response to receiving the at least one first message, at least one second message indicating modification of the at least one configuration parameter of at least one of the one or more LAA cells. According to an embodiment, the at least one first message may indicate a sorted preference of one or more cells within the PSCell pool.

FIG. 28 is an example flow diagram as per an aspect of an embodiment of the present disclosure. At 2810, a wireless device may receive from a first base station, one or more messages comprising: configuration parameters of a plurality of cells, and configuration parameters of a primary secondary cell (PSCell) pool. The configuration parameters of the plurality of cells may comprise a first cell group and a second cell group. The wireless device may communicate with the first base station employing the first cell group. The wireless device may communicate with a second base station employing the second cell group. The second cell group may comprise one or more licensed assisted access (LAA) cells. The configuration parameters of the PSCell pool may comprise candidate cells for a PSCell. At 2820, the wireless device may receive from the second base station, one or more first messages indicating selection of a first cell from the candidate cells as the PSCell. At 2830, the wireless device may transmit to the first base station, one or more second messages indicating the selection of the first cell.

In this specification, "a" and "an" and similar phrases are to be interpreted as "at least one" and "one or more." In this specification, the term "may" is to be interpreted as "may, for example." In other words, the term "may" is indicative that the phrase following the term "may" is an example of one of a multitude of suitable possibilities that may, or may not, be employed to one or more of the various embodiments. If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}.

In this specification, parameters (Information elements: IEs) may comprise one or more objects, and each of those objects may comprise one or more other objects. For example, if parameter (IE) N comprises parameter (IE) M, and parameter (IE) M comprises parameter (IE) K, and parameter (IE) K comprises parameter (information element) J, then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Many of the elements described in the disclosed embodiments may be implemented as modules. A module is defined here as an isolatable element that performs a defined function and has a defined interface to other elements. The modules described in this disclosure may be implemented in hardware, software in combination with hardware, firmware, wetware (i.e. hardware with a biological element) or a combination thereof, all of which are behaviorally equivalent. For example, modules may be implemented as a software routine written in a computer language configured to be executed by a hardware machine (such as C, C++, Fortran, Java, Basic, MATLAB or the like) or a modeling/simulation program such as Simulink, Stateflow, GNU Octave, or LabVIEW MathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above-mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments. In particular, it should be noted that, for example purposes, the above explanation has focused on the example(s) using LAA communication systems. However, one skilled in the art will recognize that embodiments of the disclosure may also be implemented in a system comprising one or more TDD cells (e.g. frame structure 2 and/or frame structure 1). The disclosed methods and systems may be implemented in wireless or wireline systems. The features of various embodiments presented in this disclosure may be combined. One or many features (method or system) of one embodiment may be implemented in other embodiments. Only a limited number of example combinations are shown to indicate to one skilled in the art the possibility of features that may be combined in various embodiments to create enhanced transmission and reception systems and methods.

In addition, it should be understood that any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112. Claims that do not expressly include the phrase "means for" or "step for" are not to be interpreted under 35 U.S.C. 112.

The invention claimed is:

1. A method comprising:

sending, by a first base station to a wireless device, configuration parameters of:

a first plurality of cells for communication with the first base station; and a second plurality of cells for communication with a second base station, wherein the second plurality of cells comprises one or more cells operating in a shared spectrum;

based on receiving an indication of a failure of a listen before talk (LBT) procedure for at least one first cell of the one or more cells, sending, by the first base station to the second base station, a request for modification of the second plurality of cells for communication with the second base station; and receiving, by the first base station from the second base station and based on the request for modification, an indication of a third plurality of cells for communication with the second base station.

2. The method of claim 1, wherein the at least one first cell comprises a primary secondary cell (PSCell).

3. The method of claim 1, further comprising sending, by the first base station to the second base station, a request for modification of at least one configuration parameter of at least one second cell of the one or more cells, wherein the request for the modification of the at least one configuration parameter of the at least one second cell indicates change of a primary secondary cell (PSCell).

4. The method of claim 1, wherein the indication of the failure of the LBT procedure comprises a radio resource control (RRC) message.

5. The method of claim 1, wherein the indication of the failure of the LBT procedure comprises at least one of:

an indication of a failure type of one or more failure types; or an information element configured to indicate success or failure of the LBT procedure.

6. The method of claim 1, further comprising sending, by the first base station to the second base station, a request for modification of at least one configuration parameter of at least one second cell of the one or more cells, wherein the request for the modification of the at least one configuration parameter of the at least one second cell comprises at least one of:

an indication of a failure type of one or more failure types; or a secondary evolved node B (SeNB) Modification Request message.

7. The method of claim 1, further comprising sending, by the first base station to the second base station, a request for modification of at least one configuration parameter of at least one second cell of the one or more cells, wherein the at least one first cell and the at least one second cell are a same cell.

8. The method of claim 1, wherein the one or more cells comprise at least one of:

a licensed assisted access (LAA) cell;

a cell that uses an unlicensed spectrum for transmission;

a cell that uses an unlicensed spectrum for transmission in accordance with one or more 3GPP standards;

a cell that uses an unlicensed spectrum for transmission in accordance with one or more non-3GPP standards;

a cell that uses an unlicensed spectrum for transmission in accordance with one or more regulatory requirements;

a primary cell;

a secondary cell; or a primary secondary cell.

9. The method of claim 1, wherein the request for modification of the second plurality of cells comprises a request for modification of a primary secondary cell (PSCell) pool.

10. The method of claim 1, wherein the shared spectrum is shared with other radio technologies, and wherein the one or more cells operating in the shared spectrum comprise one or more unlicensed cells.

11. A base station comprising:

one or more processors;

memory storing instructions that, when executed by the one or more processors, cause the base station to:

send, to a wireless device, configuration parameters of:

a first plurality of cells for communication with the base station; and a second plurality of cells for communication with a second base station, wherein the second plurality of cells comprises one or more cells operating in a shared spectrum;

based on receiving an indication of a failure of a listen before talk (LBT) procedure for at least one first cell of the one or more cells, send, to the second base station a request for modification of the second plurality of cells for communication with the second base station; and receive, from the second base station and based on the request for modification, an indication of a third plurality of cells for communication with the second base station.

12. The base station of claim 11, wherein the at least one first cell comprises a primary secondary cell (PSCell).

13. The base station of claim 11, wherein the instructions, when executed by the one or more processors, cause the base station to send, to the second base station, a request for modification of at least one configuration parameter of at least one second cell of the one or more cells, wherein the request for the modification of the at least one configuration parameter of the at least one second cell indicates change of a primary secondary cell (PSCell).

14. The base station of claim 11, wherein the indication of the failure of the LBT procedure comprises a radio resource control (RRC) message.

15. The base station of claim 11, wherein the indication of the failure of the LBT procedure comprises at least one of:

an indication of a failure type of one or more failure types; or an information element configured to indicate success or failure of the LBT procedure.

16. The base station of claim 11, wherein the instructions, when executed by the one or more processors, cause the base station to send, to the second base station, a request for modification of at least one configuration parameter of at least one second cell of the one or more cells, wherein the request for the modification of the at least one configuration parameter of the at least one second cell comprises at least one of:

an indication of a failure type of one or more failure types; or a secondary evolved node B (SeNB) Modification Request message.

17. The base station of claim 11, wherein the instructions, when executed by the one or more processors, cause the base station to send, to the second base station, a request for modification of at least one configuration parameter of at least one second cell of the one or more cells, wherein the at least one first cell and the at least one second cell are a same cell.

18. The base station of claim 11, wherein the one or more cells comprise at least one of:

a licensed assisted access (LAA) cell;

a cell that uses an unlicensed spectrum for transmission;

a cell that uses an unlicensed spectrum for transmission in accordance with one or more 3GPP standards;

a cell that uses an unlicensed spectrum for transmission in accordance with one or more non-3GPP standards;

a cell that uses an unlicensed spectrum for transmission in accordance with one or more regulatory requirements;

a primary cell;

a secondary cell; or a primary secondary cell.

19. The base station of claim 11, wherein the request for modification of the second plurality of cells comprises a request for modification of a primary secondary cell (PS-Cell) pool.

20. The base station of claim 11, wherein the shared spectrum is shared with other radio technologies, and wherein the one or more cells operating in the shared spectrum comprise one or more unlicensed cells.

21. One or more non-transitory computer-readable media storing instructions that, when executed, cause:

sending, to a wireless device, configuration parameters of:

a first plurality of cells for communication with a first base station; and a second plurality of cells for communication with a second base station, wherein the second plurality of cells comprises one or more cells operating in a shared spectrum;

based on receiving an indication of a failure of a listen before talk (LBT) procedure for at least one first cell of the one or more cells, sending, to the second base station, a request for modification of the second plurality of cells for communication with the second base station; and receiving, from the second base station and based on the request for modification, an indication of a third plurality of cells for communication with the second base station.

22. The one or more non-transitory computer-readable media of claim 21, wherein the at least one first cell comprises a primary secondary cell (PSCell).

23. The one or more non-transitory computer-readable media of claim 21, wherein the instructions, when executed, cause sending, to the second base station, a request for modification of at least one configuration parameter of at least one second cell of the one or more cells, wherein the request for the modification of the at least one configuration parameter of the at least one second cell indicates change of a primary secondary cell (PSCell).

24. The one or more non-transitory computer-readable media of claim 21, wherein the indication of the failure of the LBT procedure comprises a radio resource control (RRC) message.

25. The one or more non-transitory computer-readable media of claim 21, wherein the indication of the failure of the LBT procedure comprises at least one of:

an indication of a failure type of one or more failure types; or an information element configured to indicate success or failure of the LBT procedure.

26. The one or more non-transitory computer-readable media of claim 21, wherein the instructions, when executed, cause sending, to the second base station, a request for modification of at least one configuration parameter of at least one second cell of the one or more cells, wherein the request for the modification of the at least one configuration parameter of the at least one second cell comprises at least one of:

an indication of a failure type of one or more failure types; or a secondary evolved node B (SeNB) Modification Request message.

27. The one or more non-transitory computer-readable media of claim 21, wherein the instructions, when executed, cause sending, to the second base station, a request for modification of at least one configuration parameter of at least one second cell of the one or more cells, wherein the at least one first cell and the at least one second cell are a same unlicensed cell.

28. The one or more non-transitory computer-readable media of claim 21, wherein the one or more cells comprise at least one of:

a licensed assisted access (LAA) cell;

a cell that uses an unlicensed spectrum for transmission;

a cell that uses an unlicensed spectrum for transmission in accordance with one or more 3GPP standards;

a cell that uses an unlicensed spectrum for transmission in accordance with one or more non-3GPP standards;

a cell that uses an unlicensed spectrum for transmission in accordance with one or more regulatory requirements;

a primary cell;

a secondary cell; or a primary secondary cell.

29. The one or more non-transitory computer-readable media of claim 21, wherein the request for modification of the second plurality of cells comprises a request for modification of a primary secondary cell (PSCell) pool.

30. The one or more non-transitory computer-readable media of claim 21, wherein the shared spectrum is shared with other radio technologies, and wherein the one or more cells operating in the shared spectrum comprise one or more unlicensed cells.

31. A system comprising:

a first base station and a second base station, wherein the first base station comprises:

one or more first processors; and memory storing first instructions that, when executed by the one or more first processors, cause the first base station to:

send, to a wireless device, configuration parameters of:

a first plurality of cells for communication with the first base station; and a second plurality of cells for communication with the second base station, wherein the second plurality of cells comprises one or more cells operating in a shared spectrum; and based on receiving an indication of a failure of a listen before talk (LBT) procedure for at least one first cell of the one or more cells, send, to the second base station a request for modification of the second plurality of cells for communication with the second base station, and wherein the second base station comprises:

one or more second processors; and memory storing second instructions that, when executed by the one or more second processors, cause the second base station to:

send, to the first base station and based on the request for modification, an indication of a third plurality of cells for communication with the second base station.

32. The system of claim 31, wherein the at least one first cell comprises a primary secondary cell (PSCell).

33. The system of claim 31, wherein the first instructions, when executed by the one or more first processors, cause the first base station to send, to the second base station, a request for modification of at least one configuration parameter of at least one second cell of the one or more cells, wherein the request for the modification of the at least one configuration parameter of the at least one second cell indicates change of a primary secondary cell (PSCell).

34. The system of claim 31, wherein the indication of the failure of the LBT procedure comprises a radio resource control (RRC) message.

35. The system of claim 31, wherein the shared spectrum is shared with other radio technologies, and wherein the one or more cells operating in the shared spectrum comprise one or more unlicensed cells.

* * * * *